(12) United States Patent
Kawata

(10) Patent No.: US 12,252,758 B2
(45) Date of Patent: Mar. 18, 2025

(54) STEEL SHEET AND PRODUCTION METHOD FOR SAME

(71) Applicant: NIPPON STEEL CORPORATION, Tokyo (JP)

(72) Inventor: Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 703 days.

(21) Appl. No.: 17/437,369

(22) PCT Filed: Mar. 5, 2020

(86) PCT No.: PCT/JP2020/009390
§ 371 (c)(1),
(2) Date: Sep. 8, 2021

(87) PCT Pub. No.: WO2020/208979
PCT Pub. Date: Oct. 15, 2020

(65) Prior Publication Data
US 2022/0154302 A1    May 19, 2022

(30) Foreign Application Priority Data

Apr. 11, 2019   (JP) .................................. 2019-075691

(51) Int. Cl.
*C21D 9/46* (2006.01)
*B22D 11/124* (2006.01)
(Continued)

(52) U.S. Cl.
CPC .............. *C21D 9/46* (2013.01); *B22D 11/124* (2013.01); *C21D 8/021* (2013.01); *C21D 8/0226* (2013.01);
(Continued)

(58) Field of Classification Search
CPC ............ C22C 38/001; C21D 2211/003; C21D 2211/005; C21D 2211/008; C21D 8/0226;
(Continued)

(56) References Cited

U.S. PATENT DOCUMENTS

| 2011/0030854 A1 | 2/2011 | Matsuda et al. |
| 2019/0040511 A1 | 2/2019 | Hasegawa et al. |
| 2019/0161823 A1 | 5/2019 | Kohsaka et al. |

FOREIGN PATENT DOCUMENTS

| EP | 2 937 433 A1 | 10/2015 |
| EP | 3042976 A1 | 7/2016 |

(Continued)

*Primary Examiner* — Nicholas A Wang
(74) *Attorney, Agent, or Firm* — Birch, Stewart, Kolasch & Birch, LLP

(57) ABSTRACT

This steel sheet has a predetermined chemical composition, a microstructure contains, in terms of a volume fraction, ferrite: 10% to 75%, martensite: 20% to 90%, retained austenite: 0% to 5%, bainite and bainitic ferrite in total: 0% to 50%, and pearlite: 0% to 5%, a proportion of unrecrystallized ferrite in the ferrite is 0% to 25%, cementite that is contained in the martensite satisfies a predetermined relational expression, a density of transition carbide included in the martensite is $1.0 \times 10^{13}$ pieces/m$^3$ or more, a density of coarse inclusion having an equivalent circle diameter of 10 μm or more is 0.50 pieces/mm$^2$ or less, in a surface parallel to the surface at a position ¼ of the sheet thickness deep from the surface in the sheet thickness direction, a ratio of a maximum value $Hv_{max}$ of Vickers hardness to a minimum value $Hv_{min}$ of the Vickers hardness is 1.40 or less, and an average value of minimum distances between peaks of the Vickers hardness in a distribution map of the Vickers hardness is 1.00 mm or less.

13 Claims, 3 Drawing Sheets

(51) Int. Cl.
  *C21D 8/02* (2006.01)
  *C22C 38/00* (2006.01)
  *C22C 38/02* (2006.01)
  *C22C 38/04* (2006.01)
  *C22C 38/06* (2006.01)
  *C22C 38/42* (2006.01)
  *C22C 38/44* (2006.01)
  *C22C 38/46* (2006.01)
  *C22C 38/48* (2006.01)
  *C22C 38/54* (2006.01)
  *C22C 38/60* (2006.01)
  *C23C 2/06* (2006.01)
  *C23C 2/40* (2006.01)

(52) U.S. Cl.
  CPC ......... *C21D 8/0236* (2013.01); *C21D 8/0263* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/54* (2013.01); *C22C 38/60* (2013.01); *C23C 2/06* (2013.01); *C23C 2/40* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01)

(58) Field of Classification Search
  CPC .. C21D 8/0236; C21D 8/0263; C21D 8/0273; C21D 9/46
  See application file for complete search history.

(56) References Cited

FOREIGN PATENT DOCUMENTS

| | | |
|---|---|---|
| EP | 3 279 362 A1 | 2/2018 |
| JP | 5659929 B2 | 1/2015 |
| WO | WO 2009/096596 A1 | 8/2009 |
| WO | WO 2017/131054 A1 | 8/2017 |
| WO | WO 2018/030503 A1 | 2/2018 |

$$W[mm] = -1.20t^2 + 7.82t + 7.34 \quad (\text{SHEET THICKNESS } t \leq 3.0mm)$$
$$W[mm] = 20.0 \quad (\text{SHEET THICKNESS } t > 3.0mm)$$
※ ROUND OFF TO ONE DECIMAL PLACE

STEEL SHEET AND PRODUCTION METHOD FOR SAME

TECHNICAL FIELD

The present invention relates to a steel sheet and a production method for the same.

Priority is claimed on Japanese Patent Application No. 2019-075691, filed in Japan on Apr. 11, 2019, the content of which is incorporated herein by reference.

BACKGROUND ART

Recently, for automobiles, in order not only to reduce the weights of vehicle bodies to increase gas mileage and reduce the amount of carbon dioxide exhausted but also to absorb impact energy in the event of impact to secure the protection and safety of people on board, a number of high-strength steel sheets have been in use. However, generally, an increase in the strength of a steel sheet deteriorates deformability (ductility, bendability, and the like) and is likely to cause breaking in large-strain regions that are locally generated during impact deformation. Since this fact acts as an obstacle to weight reduction with an increase in strength, a variety of measures have been proposed.

For example, Patent Document 1 discloses a high-strength steel sheet having a tensile strength of 900 MPa or higher capable of satisfying both a high strength and excellent formability. In Patent Document 1, the steel structure contains, in terms of the area ratios, 5% or more and 80% or less of ferrite and 15% or more of auto-tempered martensite, 10% or less of bainite, 5% or less of retained austenite, and 40% or less of martensite as quenched, the average hardness of the auto-tempered martensite is HV≤700, and the average number of iron-based carbide precipitated in auto-tempered martensite per square millimeter of 5 nm or larger and 0.5 μm or smaller is set to $5\times10^4$ particles or more.

In addition, Patent Document 2 discloses a thin steel sheet having a tensile strength of 900 MPa or higher and favorable weldability and also having favorable elongation. The thin steel sheet of Patent Document 2 is disclosed to have a steel structure in which the area ratio of ferrite is 25% or more and 65% or less, the area ratio of martensite containing iron-based carbide precipitated in martensite grains is 35% or more and 75% or less, the total area ratio of crystal structures other than the ferrite and the martensite as residual structures is 20% or less (which may become 0%), the average grain diameters of the ferrite and the martensite are each 5 μm or less, and the total atomic concentration of Si and Mn on the interface between the ferrite and the martensite is 5% or more.

In addition, Patent Document 3 discloses a cold-rolled steel sheet having a steel structure in which a total of 60 area % or more of ferrite and bainite are contained, 3 area % or more and 20 area % or less of retained austenite is contained, the average grain diameter of the ferrite and the bainite is 0.5 μm or more and 6.0 μm or less, and the C concentration in the retained austenite is 0.5 mass % or more and 1.2 mass % or less, having an element concentration distribution in which the average spacing in a direction orthogonal to a rolling direction between a Mn-concentrating portion and a Si-concentrating portion elongated in the rolling direction at a position 50 μm deep from the surface of the steel sheet is 1000 μm or less, having surface properties in which the maximum depth of cracks on the surface of the steel sheet is 4.5 μm or less and the number density of cracks that are 6 μm or less wide and 2 μm or less deep is 10 cracks/50 μm or less, and having mechanical properties in which the tensile strength (TS) is 800 MPa or higher and 1200 MPa or lower, the work hardening index ($n_{3-8}$) in a region with plastic strain of 3% or more and 8% or less is 0.10 or more, and the bendability satisfies Expression (1) separately.

CITATION LIST

Patent Document

[Patent Document 1] PCT International Publication No. WO 2009/096596

[Patent Document 2] PCT International Publication No. WO 2018/030503

[Patent Document 3] Japanese Patent No. 5659929

SUMMARY OF THE INVENTION

Problems to be Solved by the Invention

In consideration of the fact that, for high-strength steel sheets, there is a demand not only for improvement in the formability-strength balance but also for improvement in impact resistance as described above, the objective of the present invention is to provide a high-strength steel sheet (including a zinc-plated steel sheet, a zinc alloy-plated steel sheet, a galvannealed steel sheet, and an alloyed zinc alloy-plated steel sheet) that is excellent in terms of formability, strength, and impact resistance and a production method for the same. A high strength in the present invention refers to the fact that, as the strength of a steel sheet, the maximum tensile strength (TS), which is thought to be necessary to absorb a sufficient amount of energy in the event of impact deformation, is 900 MPa or higher.

Means for Solving the Problem

The present inventors carried out intensive studies regarding a method for solving the above-described problem. As a result, it was found that (i) localization of impact deformation can be suppressed by forming, in steel sheets, a heterogeneous structure in which millimeter-level homogeneity (hereinafter, macro homogeneity) is increased but micrometer-level homogeneity (hereinafter, micro homogeneity) is decreased by forming a structure including a soft structure and a hard structure mainly containing martensite as a microstructure and, furthermore, (ii) when such a hard structure contains cementite and a transition carbide, plastic deformation easily begins in the event of impact and the occurrence of fracture is suppressed.

The present invention has been made based on the above-described finding, and the gist of the present invention is as described below.

[1] A steel sheet according to an aspect of the present invention, in which a chemical composition contains, by mass %, C: 0.050% to 0.180%, Si: 0.01% to 1.20%, Mn: 0.80% to 3.00%, Al: 0.005% to 0.600%, Ti: 0.005% to 0.120%, P: 0.050% or less, S: 0.0080% or less, N: 0.0125% or less, O: 0.0040% or less, Nb: 0% to 0.075%, V: 0% to 1.000%, Cr: 0% to 1.50%, Ni: 0% to 1.50%, Cu: 0% to 1.50%, Mo: 0% to 1.00%, W: 0% to 1.000%, B: 0% to 0.0060%, Sn: 0% to 1.000%, Sb: 0% to 0.200%, and one or more of Ca, Ce, Mg, Zr, La, and REM in total: 0% to 0.0100% with a remainder of Fe and impurities, a microstructure within a range from a position of ⅛ of a sheet thickness from a surface in a sheet thickness direction to a position of ⅜ of the sheet thickness from the surface in the sheet thickness direction contains, in terms of a volume fraction, ferrite: 10% to 75%, martensite: 20% to 90%, retained austenite: 0% to 5%, bainite and bainitic ferrite in total: 0% to 50%, and pearlite: 0% to 5%, a proportion of unrecrystallized ferrite in the ferrite is 0% to 25%, cementite that is contained in the martensite satisfies Expression (1), a density of transition carbide included in the martensite is $1.0 \times 10^{13}$ pieces/m$^3$ or more, a density of coarse inclusion having an equivalent circle diameter of 10 µm or more is 0.50 pieces/mm$^2$ or less, in a surface parallel to the surface at a position of ¼ of the sheet thickness from the surface in the sheet thickness direction, a ratio of a maximum value $Hv_{max}$ of Vickers hardness to a minimum value $Hv_{min}$ of the Vickers hardness is 1.40 or less, and in a distribution map of the Vickers hardness, an average value of minimum distances between peaks of the Vickers hardness is 1.00 mm or less.

[Math. 1]

$$1.00 \leq \Sigma_{i=1}^{5} d_i^{0.80} \cdot a_i^{1.30} \leq 10.00 \qquad \text{Expression (1)}$$

in the Expression (1), $d_i$ represents a particle diameter of a cementite particle having an $i^{th}$ largest equivalent circle diameter in unit µm, and $a_i$ indicates an aspect ratio of the cementite particle having the $i^{th}$ largest equivalent circle diameter.

[2] The steel sheet according to [1], in which the chemical composition may contain, by mass %, one or more selected from the group consisting of Nb: 0.005% to 0.075%, V: 0.010% to 1.000%, Cr: 0.05% to 1.50%, Ni: 0.05% to 1.50%, Cu: 0.05% to 1.50%, Mo: 0.03% to 1.00%, W: 0.030% to 1.000%, B: 0.0005% to 0.0060%, Sn: 0.010% to 1.000%, Sb: 0.005% to 0.200%, and one or more of Ca, Ce, Mg, Zr, La, and REM in total: 0.0001% to 0.0100%.

[3] The steel sheet according to [1] or [2], in which, in the microstructure, an average grain diameter of prior austenite may be 5.0 µm or less, and an average aspect ratio of the prior austenite may be 2.50 or less.

[4] The steel sheet according to any one of [1] to [3], in which the martensite that is contained in the microstructure may have $1.0 \times 10^{13}$/m$^2$ or more of dislocations.

[5] The steel sheet according to any one of [1] to [4], in which a zinc plated layer may be formed on the surface.

[6] The steel sheet according to any one of [1] to [4], in which a zinc alloy plated layer may be formed on the surface.

[7] The steel sheet according to [5] or [6], in which an Fe content in the zinc plated layer or the zinc alloy plated layer may be, by mass %, 7.0% or more and 13.0% or less.

[8] A production method for a steel sheet according to another aspect of the present invention is a production method for the steel sheet according to [1] to [4], the method having a casting process of casting molten steel having the chemical composition according to [1] such that the average cooling rate within a surface temperature range of 700° C. to 550° C. is 10° C./hour to 75° C./hour to obtain a cast piece having a thickness of 100 mm to 500 mm or less, a hot rolling process of heating the cast piece to 1200° C. to 1350° C. and hot rolling the heated cast piece to obtain a hot-rolled steel sheet, a cooling process of cooling the hot-rolled steel sheet to 100° C. or lower, a cold rolling process of cold-rolling the hot-rolled steel sheet such that a total rolling reduction is 30% to 90% and a cold rolling completion temperature is 250° C. or lower to obtain a cold-rolled steel sheet, and an annealing process of heating the cold-rolled steel sheet at an annealing temperature of 760° C. or higher and Ac3+20° C. or lower and cooling the cold-rolled steel sheet to 80° C. or lower, in which, in the hot rolling process, during rolling that is carried out at 1050° C. or higher, Expression (2) is satisfied, and a total rolling reduction is set to 60% or more, rolling that is carried out at lower than 1050° C. is carried out under a condition that satisfies Expression (3), in the cooling process, an average cooling rate from a completion temperature of the hot rolling to 630° C. is set to 20° C./second or faster, within a temperature range of 630° C. to 500° C., Expression (4) is satisfied, in the annealing process, in a heating step to the annealing temperature, an average heating rate within a temperature range of 400° C. to 550° C. is 3.0° C./second or faster, within a temperature range of 550° C. to Ac1° C., Expression (5) is satisfied, an average heating rate within a temperature range of Ac1® C to (Ac1+20)° C. is 1.0° C./second or faster, in a cooling step from the annealing temperature, an average cooling rate within a temperature range of 720° C. to 550° C. is 10° C./second or faster, within a temperature range of 550° C. to (Ms−80)° C., Expression (6) is satisfied, an average cooling rate within a temperature range of Ms° C. to (Ms−25)° C. is 10° C./second or faster, and within a temperature range of Ms° C. to 80° C., Expression (7) is satisfied,

[Math. 2]

$$\sum_{i=1}^{n} A_1 \cdot \left( \frac{1}{1 + 12.1[Nb]} + \frac{1}{1 + 4.8 \cdot ([Ti] - 3.0[N])} + \frac{1}{1 + 93.3[B]} \right)^{-1} \cdot (T_i' - 1050)^{\frac{1}{6}} \cdot \frac{h_{i-1} - h_i}{h_{i-1}^{1.5}} \cdot t_i^{0.5} \cdot \exp\left( \frac{A_2}{T_i + 273} - \frac{A_3}{T_i' + 273} \right) \geq 1.00 \qquad \text{Expression (2)}$$

$$R_{m+n} \leq 10.00 \qquad \text{Expression (3)}$$

[Math. 4]

$$1.00 \times 10^{-7} \geq P_{13} \geq 1.00 \times 10^{-8} \qquad \text{Expression (4)}$$

$$\text{Expression (5)}$$

$$10.00 \geq \sum_{i=1}^{10} A_{18} \cdot \left\{ \ln\left( \frac{100}{100 - r} \right) \right\}^{\frac{2}{3}} \cdot$$

$$\exp\left( -\frac{A_{19}}{823 + (0.1i - 0.05) \cdot (Ac1 - 550)} \right) \cdot$$

$$\left( \frac{A_{20} \cdot E_4^{\frac{1}{3}}}{1 + 13[Nb] + 7[Ti] - 21[N]} \right)^{\frac{T_i}{275}} \cdot t_i \geq 1.00$$

$$-2.00 \leq \sum_{i=1}^{10} C_i \cdot D_i \leq 2.00 \qquad \text{Expression (6)}$$

[Math. 7]

$$0.00 \leq \sum_{i=1}^{10} \{1 - \exp(-E_6 - A_{25})\} \cdot \qquad \text{Expression (7)}$$

$$\left\{ 1 - \exp\left( -\frac{A_{26} \cdot [Ms - T_{i,min}]}{1 + 0.5[Mn] + 0.2[Cr] + 0.4[Ni]} \right) \right\} \cdot$$

$$\left\{ A_{27} \cdot \exp\left( -\frac{A_{28}}{T_i + 273} \right) - \right.$$

$$A_{29} \cdot \exp(A_{30} \cdot [T_i - A_{31} - A_{32} \cdot \ln([Si] + 0.3[Al])]) \cdot$$

$$\left. (1 - \exp[E_6 - A_{25}])^{-0.5} \right\} \cdot dt^{0.5} \leq 3.00$$

In the Expression (2), [Nb], [Ti], and [B] indicate amounts of Nb, Ti, and B, respectively, $A_1$, $A_2$, and $A_3$ are constant terms, $T_i$ is a temperature at which $i^{th}$ rolling is carried out in unit ° C., $T'_i$ is an average temperature of the temperature $T_i$ at which the $i^{th}$ rolling is carried out and a temperature $T_{i+1}$ at which $(i+1)^{th}$ rolling is carried out in unit ° C., and $h_i$ represents a thickness of a steel sheet that is obtained by carrying out the $i^{th}$ rolling in unit mm.

In the Expression (3), $R_{m+n}$ is an index that indicates a refinement behavior of a structure via the hot rolling within a temperature range of lower than 1050° C. when the hot rolling at 1050° C. or higher is carried out in a total of n times and hot rolling at lower than 1050° C. is carried out in a total of m times.

In the Expression (4), $P_{13}$ is an index that indicates a progress degree of precipitation within a temperature range from 630° C. to 500° C., in the Expression (5), $A_{18}$, $A_{19}$, and $A_{20}$ are all constants, [Nb], [Ti], and [N] indicate amounts of respective elements in unit mass %, $t_i$ indicates a staying time within an $i^{th}$ temperature range counted from 550° C. as a stat in unit seconds, and $E_4$ is a value that is obtained from the Expression (4), and in the Expression (6), $C_i$ is an index that indicates a progress degree of bainitic transformation within an $i^{th}$ time range from beginning of calculation, and $D_i$ is an index that indicates easiness of generation of cementite in association with bainitic transformation within the $i^{th}$ time range from the beginning of calculation.

In the Expression (7), $E_6$ is a value of a middle portion of the Expression (6), $A_{25}$, $A_{26}$, $A_{27}$, $A_{28}$, $A_{29}$, $A_{30}$, $A_{31}$, and $A_{32}$ are constant terms, Ms is a martensitic transformation start temperature, and $T_i$ is an average temperature within the $i^{th}$ time range. $T_{i,\ min}$ is a minimum value of $T_i$ up to $i^{th}$ time ranges after a temperature reaches Ms, and, in addition, [element sign] indicates an amount of each element in unit mass %, and dt indicates a time that is divided an elapsed time which is from a temperature reaches the martensitic transformation start temperature to the temperature reaches 80° C., into ten equal parts in unit seconds.

[9] The production method for the steel sheet according to [8], in which, in the annealing process, a retention time at the annealing temperature may be 3.0 seconds or longer and 200 seconds or shorter.

[10] The production method for the steel sheet according to [8] or [9], the method may include a temper rolling process of carrying out temper rolling so that an elongation ratio is 3.00% or less.

[11] The production method for the steel sheet according to any one of [8] to [10], in which, in a cooling step of the annealing process, a hot-dip galvanizing treatment may be carried out on the cold-rolled steel sheet.

[12] The production method for the steel sheet according to any one of [8] to [10], in which, in the cooling step of the annealing process, a hot-dip zinc alloy plating treatment may be carried out on the cold-rolled steel sheet.

[13] The production method for the steel sheet according to [11] or [12], in which, in the cooling step of the annealing process, an alloying treatment may be carried out after the hot-dip plating treatment or after the hot-dip zinc alloy plating treatment.

Effects of the Invention

According to the above-described aspects of the present invention, it is possible to provide a steel sheet that is excellent in terms of formability, strength, and impact resistance and a production method for the same. Such a steel sheet is effective for the weight reduction of automobile vehicle bodies with an increase in strength.

EMBODIMENTS OF THE INVENTION

Figure 1:
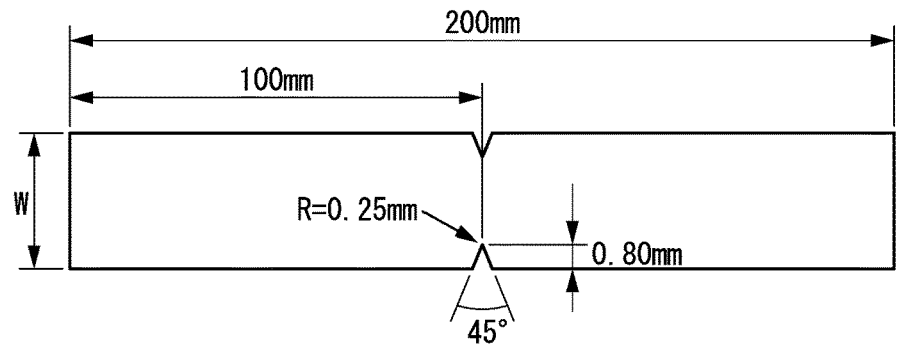
FIG. 1 is a view showing the shape of a test piece for a notched tension test.

Hereinafter, a steel sheet according to an embodiment of the present invention (a steel sheet according to the present embodiment) and production conditions for the same will be described sequentially.

First, the reasons for limiting the component composition (chemical composition) of the steel sheet according to the present embodiment will be described. Hereinafter, "%" relating to the component composition indicates "mass %".

C: 0.050% to 0.180%

C is an element that significantly increases the strength of steel. When the C content is less than 0.050%, a sufficient tensile strength (maximum tensile strength) cannot be obtained. Therefore, the C content is set to 0.050% or more. In order to increase the tensile strength, the C content is preferably 0.060% or more and more preferably 0.070% or more.

On the other hand, when the C content exceeds 0.180%, a large amount of retained austenite is formed after a heat treatment, and the impact resistance is not sufficiently improved. Therefore, the C content is set to 0.180% or less.

In order to further improve the impact resistance, the C content is preferably 0.160% or less and more preferably 0.140% or less.

Si: 0.01% to 1.20%

Si is an element that refines iron-based carbides and contributes to improvement in the strength-formability-impact resistance balance; however, when Si is excessively contained, steel embrittles.

When the Si content is reduced to less than 0.01%, a coarse iron-based carbide is formed immediately after martensitic transformation, and the impact resistance deteriorates. Therefore, the Si content is set to 0.01% or more. Since Si particularly improves the strength-formability balance, the Si content is preferably set to 0.05% or more and more preferably set to 0.10% or more.

On the other hand, when the Si content exceeds 1.20%, there is a case where a coarse Si oxide, which acts as a starting point of fracture, is formed, which creates a concern that the impact resistance may deteriorate. Therefore, the Si content is set to 1.20% or less. In addition, a solid-soluted Si is an element that accelerates the fracture of ferrite. Therefore, in the case of further enhancing the impact resistance, the Si content is preferably 1.00% or less and more preferably 0.80% or less.

Mn: 0.80% to 3.00%

Mn is an element that contributes to improvement in the strength by enhancing the hardenability of steel. When the Mn content is less than 0.80%, a soft structure is formed in a cooling step in annealing, which makes it difficult to secure a necessary strength. Therefore, the Mn content is set to 0.80% or more. The Mn content is preferably 1.00% or more and more preferably 1.20% or more.

On the other hand, when the Mn content exceeds 3.00%, macro homogeneity in the steel sheet is impaired due to the localization of Mn during casting, and the impact resistance deteriorates. Therefore, the Mn content is set to 3.00% or less. In order to secure favorable impact resistance, the Mn content is preferably 2.80% or less and more preferably 2.60% or less.

Al: 0.005% to 0.600%

Al is an element that functions as a deoxidizing material. When the Al content is less than 0.005%, the deoxidation effect cannot be sufficiently obtained. Therefore, the Al content is set to 0.005% or more. The Al content is preferably 0.010% or more and more preferably 0.020% or more.

Al is also an element that forms a coarse oxide, which acts as a starting point of fracture, and embrittles steel. When the Al content exceeds 0.600%, a number of a coarse oxide, which acts as a starting point of fracture, are generated, and cast pieces are likely to crack. Therefore, the Al content is set to 0.600% or less. In order to improve the balance between the formability and the impact resistance, the Al content is preferably 0.450% or less and more preferably 0.300% or less.

Ti: 0.005% to 0.120%

Ti is an element having an effect of reducing S, N, and O that form a coarse inclusion, which acts as a starting point of fracture. In addition, Ti is an element that refines the structure and has an effect of improving the strength-formability-impact resistance balance. In order to obtain these effects, the Ti content is set to 0.005% or more. The Ti content is preferably 0.010% or more.

When the Ti content becomes excessive, there is a case where a coarse Ti sulfide, a Ti nitride, and/or a Ti oxide are generated and, conversely, the formability-impact resistance balance deteriorates. From this viewpoint, the Ti content is set to 0.120% or less. In addition, contained Ti suppresses recrystallization during heating after cold rolling, and there is a case where unrecrystallized ferrite remains and the formability deteriorates. From this viewpoint, the Ti content is preferably set to 0.075% or less and more preferably set to 0.060% or less.

P: 0.050% or Less

P is an element that embrittles steel and embrittles a molten portion that is formed by spot welding. When the P content exceeds 0.050%, the steel sheet embrittles and becomes likely to crack in production processes. Therefore, the P content is set to 0.050% or less. From the viewpoint of productivity, P is preferably 0.035% or less and more preferably 0.020% or less.

The lower limit of the P content may be 0%, but when the P content is reduced to less than 0.001%, the production cost significantly increases, and thus the substantial lower limit of P content is 0.001% for practical steel sheets.

S: 0.0080% or Less

S is an element that forms a Mn sulfide and impairs the formability such as ductility, hole expansibility, stretch flangeability, and bendability or the impact resistance. When the S content exceeds 0.0080%, since the formability significantly deteriorates, the S content is set to 0.0080% or less. In order to improve the balance between the formability and the impact resistance, the S content is preferably 0.0060% or less and more preferably 0.0040% or less.

The lower limit of the S content may be 0%, but when the S content is reduced to less than 0.0001%, the production cost significantly increases, and thus the substantial lower limit of S content is 0.0001% for practical steel sheets.

N: 0.0125% or Less

N is an element that forms a nitride and impairs the formability such as ductility, hole expansibility, stretch flangeability, and bendability. When the N content exceeds 0.0125%, the formability deteriorates. Therefore, the N content is set to 0.0125% or less. In addition, N is an element that causes a welding defect during welding and impairs the productivity. Therefore, the N content is preferably 0.0080% or less and more preferably 0.0060% or less.

The lower limit of the N content may be 0%, but when the N content is reduced to less than 0.0005%, the production cost significantly increases, and thus the substantial lower limit is 0.0005% for practical steel sheets.

O: 0.0040% or Less

O is an element that forms an oxide and impairs the formability such as ductility, hole expansibility, stretch flangeability, and bendability. When the O content exceeds 0.0040%, the formability significantly deteriorates. Therefore, the O content is set to 0.0040% or less. The O content is preferably 0.0030% or less and more preferably 0.0020% or less.

The lower limit of the O content may be 0%, but the O content reduced to less than 0.0001% significantly increases the production cost, and thus the substantial lower limit is 0.0001% for practical steel sheets.

Nb: 0% to 0.075%

Nb is an element that contributes to improvement in the strength of the steel sheet by strengthening by a precipitate, grain refining strengthening by the suppression of the growth of ferrite crystal grains, and dislocation strengthening by the suppression of recrystallization. Since Nb may not be contained, the lower limit of the Nb content may be 0%; however, in order to sufficiently obtain the strength improvement effect of Nb, the Nb content is preferably 0.005% or more and more preferably 0.010% or more.

On the other hand, when the Nb content becomes excessive, unrecrystallized ferrite remains due to the suppression of recrystallization, and the formability deteriorates. Therefore, the Nb content is set to 0.075% or less. From the viewpoint of formability, the Nb content is preferably 0.050% or less and more preferably 0.040% or less.

V: 0% to 1.000%

V is an element that contributes to improvement in the strength of the steel sheet by strengthening by a precipitate, grain refining strengthening by the suppression of the growth of ferrite crystal grains, and dislocation strengthening by the suppression of recrystallization. Since V may not be contained, the lower limit of the V content may be 0%; however, in order to sufficiently obtain the strength improvement effect of V contained, the V content is preferably 0.010% or more and more preferably 0.030% or more.

On the other hand, when the V content exceeds 1.000%, a large amount of a carbonitride is precipitated, and the formability deteriorates. Therefore, the V content is set to 1.000% or less. The V content is preferably 0.200% or less.

Cr: 0% to 1.50%

Cr is an element that enhances the hardenability of steel and contributes to improvement in the strength of the steel sheet and is an element capable of replacing a part of Mn. Since Cr may not be contained, the lower limit of the Cr content may be 0%; however, in order to sufficiently obtain the strength improvement effect of Cr contained, the Cr content is preferably 0.05% or more and more preferably 0.20% or more.

On the other hand, when the Cr content exceeds 1.50%, there is a concern that a coarse Cr carbide capable of acting as a starting point of fracture may be formed. Therefore, the Cr content is set to 1.50% or less. The Cr content is preferably 0.80% or less.

Ni: 0% to 1.50%

Ni is an element that suppresses phase transformation at high temperatures and contributes to improvement in the strength of the steel sheet and is an element capable of replacing a part of Mn. Since Ni may not be contained, the lower limit of the Ni content may be 0%; however, in order to sufficiently obtain the strength improvement effect of Ni contained, the Ni content is preferably 0.05% or more and more preferably 0.20% or more.

On the other hand, when the Ni content exceeds 1.50%, the weldability deteriorates. Therefore, the Ni content is set to 1.50% or less. The Ni content is preferably 1.00% or less.

Cu: 0% to 1.50%

Cu is an element that is present in steel as fine particles and contributes to improvement in the strength of the steel sheet and is an element capable of replacing a part of C and/or Mn. Since Cu may not be contained, the lower limit of the Cu content may be 0%; however, in order to sufficiently obtain the strength improvement effect of Cu, the Cu content is preferably 0.05% or more and more preferably 0.15% or more.

On the other hand, when the Cu content exceeds 1.50%, the weldability deteriorates. Therefore, the Cu content is set to 1.50% or less. The Cu content is preferably 0.80% or less.

Mo: 0% to 1.00%

Mo is an element that suppresses phase transformation at high temperatures and contributes to improvement in the strength of the steel sheet and is an element capable of replacing a part of C and/or Mn. Since Mo may not be contained, the lower limit of the Mo content may be 0%; however, in order to sufficiently obtain the strength improvement effect of Mo contained, the Mo content is preferably 0.03% or more and more preferably 0.06% or more.

On the other hand, when the Mo content exceeds 1.00%, the hot workability deteriorates and the productivity is deteriorated. Therefore, the Mo content is set to 1.00% or less. The Mo content is preferably 0.50% or less and more preferably 0.30% or less.

W: 0% to 1.000%

W is an element that suppresses phase transformation at high temperatures and contributes to improvement in the strength of the steel sheet and an element capable of replacing a part of C and/or Mn. Since W may not be contained, the lower limit of the W content may be 0%; however, in order to sufficiently obtain the strength improvement effect of W, the W content is preferably 0.030% or more and more preferably 0.100% or more.

On the other hand, when the W content exceeds 1.000%, the hot workability deteriorates and the productivity is deteriorated. Therefore, the W content is set to 1.000% or less. The W content is preferably 0.600% or less.

B: 0% to 0.0060%

B is an element that suppresses phase transformation at high temperatures and contributes to improvement in the strength of the steel sheet and is an element capable of replacing a part of Mn. Since B may not be contained, the lower limit of the B content may be 0%; however, in order to sufficiently obtain the strength improvement effect of B contained, the B content is preferably 0.0005% or more and more preferably 0.0010% or more.

On the other hand, when the B content exceeds 0.0060%, a B precipitate is generated, and conversely, the effect of B deteriorates. Therefore, the B content is set to 0.0060% or less. In order to suppress the generation of the B precipitate and effectively obtain the effect of B, the B content is preferably set to 0.0035% or less.

Sn: 0% to 1.000%

Sn is an element that suppresses the coarsening of crystal grains and contributes to improvement in the strength of the steel sheet. Since Sn may not be contained, the lower limit of the Sn content may be 0%; however, in order to sufficiently obtain the effect of Sn contained, the Sn content is preferably 0.010% or more.

On the other hand, when the Sn content exceeds 1.000%, since there is a case where the steel sheet embrittles and breaks during rolling, the Sn content is set to 1.000% or less.

Sb: 0% to 0.200%

Sb is an element that suppresses the coarsening of crystal grains and contributes to improvement in the strength of the steel sheet. Since Sb may not be contained, the lower limit of the Sb content may be 0%; however, in order to sufficiently obtain the effect of Sb contained, the Sb content is preferably 0.005% or more.

On the other hand, when the Sb content exceeds 0.200%, since there is a case where the steel sheet embrittles and breaks during rolling, the Sb content is set to 0.200% or less.

The component composition of the steel sheet according to the present embodiment may contain, as necessary, one or more of Ca, Ce, Mg, Zr, La, and REM.

One or more of Ca, Ce, Mg, Zr, La, and REM: 0% to 0.0100% in total

Ca, Ce, Mg, Zr, La, and REM are elements that contribute to improvement in formability. The lower limit of the total amount of one or more of Ca, Ce, Mg, Zr, La, and REM may be 0%; however, in order to sufficiently obtain the formability improvement effect, the amount of these elements is preferably 0.0001% or more and more preferably 0.0010% or more in total.

On the other hand, when the total of the amounts of one or more of Ca, Ce, Mg, Zr, La, and REM exceeds 0.0100%, there is a concern that the ductility may deteriorate. Therefore, the amount of the above-described elements is set to 0.0100% or less in total. The amount of the elements is preferably 0.0050% or less.

REM (rare earth metal) indicates, in the element group belonging to the lanthanoid series, elements except for La and Ce, which are individually specified. In many cases, these are added in a mischmetal form, but the component composition may inevitably contain the lanthanoid-series elements except La and Ce.

In the component composition of the steel sheet according to the present embodiment, a remainder except the above-described elements is Fe and impurities. The impurity is an element that is inevitably mixed in from a steel raw material and/or in steel making steps. In addition, examples of the impurity include H, Na, Cl, Sc, Co, Zn, Ga, Ge, As, Se, Y, Zr, Tc, Ru, Rh, Pd, Ag, Cd, In, Sn, Sb, Te, Cs, Ta, Re, Os, Ir, Pt, Au, Pb, Bi, and Po. The amount of the impurity that may be contained is 0.100% or less in total.

Next, the microstructure of the steel sheet according to the present embodiment will be described.

The steel sheet according to the present embodiment specifies the microstructure within a range from a position of ⅛ of a sheet thickness t from the surface in the sheet thickness direction ((⅛)t) to a position of ⅜ of the sheet thickness t from the surface in the sheet thickness direction ((⅜)t). The reason therefor is that the microstructure within the above-described range around the position of a ¼ of the sheet thickness from the surface in the sheet thickness direction ((¼)t) is a typical structure of the steel sheet and has a strong correlation with the mechanical properties of the steel sheet.

In addition, the proportions of the following structures in the microstructure are all volume fractions.

Ferrite: 10% to 75%

Ferrite is a structure that is excellent in terms of formability and impact resistance, and the steel sheet according to the present embodiment needs to contain 10% or more of ferrite. In order to enhance the formability, the volume fraction of ferrite is preferably set to 17% or more and more preferably set to 25% or more.

On the other hand, ferrite is a structure having a low strength, and, when the volume fraction of ferrite is excessively high, it is necessary to excessively increase the strengths of residual portions in order to sufficiently obtain the strength of the steel sheet. In this case, conversely, the formability and/or the impact resistance is impaired. From this viewpoint, the volume fraction of ferrite is limited to 75% or less. The volume fraction of ferrite is preferably set to 65% or less and more preferably set to 50% or less.

Proportion of Unrecrystallized Ferrite in Ferrite: 0% to 25%

Unrecrystallized ferrite is ferrite in which strain introduced by cold rolling or the like remains. Compared with ordinary ferrite, unrecrystallized ferrite has a high strength but has poor ductility and poor impact resistance. Therefore, in the steel sheet according to the present embodiment, the proportion of unrecrystallized ferrite in ferrite is limited to 25% or less. The proportion of unrecrystallized ferrite in ferrite is preferably set to 20% or less and more preferably set to 15% or less. In order to enhance the formability, unrecrystallized ferrite is still more preferably not contained.

Martensite: 20% to 90%

Martensite is a structure that increases the strength, and the steel sheet according to the present embodiment needs to contain 20% or more of martensite in terms of the volume fraction. In order to increase the strength, it is effective to increase the volume fraction of martensite (including tempered martensite). Therefore, the volume fraction of martensite is preferably set to 30% or more and more preferably set to 40% or more.

On the other hand, when the volume fraction of martensite is excessively increased, the formability deteriorates. Therefore, the volume fraction of martensite is limited to 90% or less. In order to enhance the formability, the volume fraction of martensite is preferably set to 75% or less and more preferably set to 65% or less.

Retained Austenite: 0% to 5%

Retained austenite is a structure that improves the strength-ductility balance of the steel sheet, but is also a structure that acts as a starting point of fracture and degrades the impact resistance. Therefore, in the steel sheet according to the present embodiment, the volume fraction thereof is limited to 5% or less. The volume fraction of retained austenite is preferably set to 3% or less, and retained austenite may not be contained in the microstructure.

Bainite and Bainitic Ferrite in Total: 0% to 50%

Bainite and bainitic ferrite are structures having the strength-formability balance between ferrite and martensite, and the total volume fraction of both structures contained may be 50% or less (both structures may not be contained). Particularly, from the viewpoint of strength-formability balance, in the case of reducing a strength difference between structures in the microstructure, the total volume fraction of one or both structures contained is preferably 5% to 40% and more preferably 10% to 30%.

Pearlite: 0% to 5%

Pearlite is a structure that impairs the balance between the strength and the formability, and the volume fraction of pearlite is limited to 5% or less. In order to improve the strength-formability balance, the volume fraction thereof is preferably set to 3% or less and most preferably set to 0%.

Here, the method for determining the volume fractions (vol %) of the structures will be described.

A test piece having a cross section that is parallel to the rolling direction of the steel sheet and perpendicular to the surface of the steel sheet as an observation surface is collected from the steel sheet according to the present embodiment. The observation surface of the test piece is polished and then Nital-etched. In a region of (⅛)t (t: sheet thickness) to (⅜)t (t: sheet thickness) from the surface of the sheet thickness, a total of $2.0 \times 10^{-9}$ m$^2$ or larger areas are observed in one or more visual fields with a field emission scanning electron microscope (FE-SEM), each structure is identified based on the form (the shapes of crystal grains, subgrain boundaries in crystal grains, the generation state of a carbide, or the like) of the structure, the area fraction (area %) thereof is measured, and the area fraction is regarded as the volume fraction (vol %). With this method, the volume fractions of ferrite, unrecrystallized ferrite, bainite, bainitic ferrite, martensite, and MA (a region formed of any one or both of martensite and retained austenite) are obtained. In the case of observing a plurality of visual fields, the area that is analyzed in each visual field is set to $4.0 \times 10^{-10}$ m$^2$ or larger. In addition, the volume fraction is analyzed by carrying out a point counting method in each visual field, 15 lines are drawn parallel to the rolling direction, similarly, 15 lines are drawn perpendicular to the rolling direction, and structures are determined at 225 intersection points made up of these lines.

The volume fraction of retained austenite in the microstructure of the steel sheet according to the present embodiment is analyzed by the X-ray diffraction method. In the region of (⅛)t (t: sheet thickness) to (⅜)t (t: sheet thickness) from the surface of the sheet thickness of the test piece, a surface parallel to the surface of the steel sheet is finished to a mirror surface, and the area fraction of FCC iron is analyzed by the X-ray diffraction method. The area fraction is regarded as the volume fraction of retained austenite. In addition, the obtained volume fraction of retained austenite is subtracted from the volume fraction of MA obtained by observation, thereby obtaining the volume fraction of martensite that is contained in MA. The total of the volume fractions of martensite that is contained in MA and of martensite determined as martensite by observation with an FE-SEM is adopted as the volume fraction of martensite. However, in the above-described measurement method, cementite and a carbide that are singly precipitated are not included in the volume fractions.

Cementite that is Contained in Martensite: Satisfying Expression (1)

Martensite is a structure having a high strength, but is a brittle structure, and there is a need to enhance the impact resistance by controlling the internal structure. Since brittle fracture occurs in a case where plastic deformation is unlikely to occur, the occurrence of brittle fracture in martensite can be suppressed by generating a fine carbide in martensite to generate brittle cracks locally and effectively inducing the plastic deformation of martensite using those brittle cracks as starting points of plastic deformation. As the starting point of plastic deformation, cementite is effective. On the other hand, in a case where cementite that generates local brittle cracks is coarse, the degrees of stress concentration at the tips of the brittle cracks are large, and conversely, brittle fracture in martensite is promoted. From the above-described viewpoint, in the steel sheet according to the present embodiment, martensite is made to include cementite satisfying Expression (1). In Expression (1), for coarse cementite that is likely to generate brittle cracks in martensite, easiness of the generation of brittle cracks is used as an index.

[Math. 8]

$$1.00 \leq \Sigma_{i=1}^{5} d_i^{0.80} \cdot a_i^{1.30} \leq 10.00 \qquad \text{Expression (1)}$$

Expression (1) is a calculation expression for, among cementite particles in observed martensite, five cementite particles having the five largest equivalent circle diameters, which have a large influence on the impact resistance. Regarding the reference signs in the expression, $d_i$ represents the particle diameter [μm] of a cementite particle having an $i^{th}$ largest equivalent circle diameter, and $a_i$ indicates the aspect ratio of the cementite particle having the $i^{th}$ largest equivalent circle diameter.

When the value of the middle portion of Expression (1) is too small, the generation frequency of cracks becomes insufficient, plastic deformation is not efficiently caused, and the impact resistance deteriorates. On the other hand, when the value of the middle portion of Expression (1) is too large, cracks are excessively generated, and plastic fracture becomes likely to propagate. As a result, the strength-formability balance deteriorates. Therefore, the value of the middle portion of Expression (1) is set to 1.00 or more and 10.00 or less. In order to appropriately cause plastic deformation and improve the strength-formability-impact resistance balance, the value of the middle portion of Expression (1) is preferably set to 2.00 or more and 9.00 or less.

The equivalent circle diameters and aspect ratios of cementite particles are measured by the following method.

That is, similar to the above-described measurement of the area fraction of each structure, a region of (⅛)t to (⅜)t from the surface of the sheet thickness of a test piece on an observation surface is observed with an FE-SEM at a magnification of 3000 times, and the minor axes and major axes of 10 or more cementite particles in arbitrary martensite are measured. A value obtained by taking the square root of the product of the major axis and the minor axis of a cementite particle is defined as the equivalent circle diameter, and a value obtained by dividing the major axis by the minor axis of a cementite particle is defined as the aspect ratio.

Density of Transition Carbide Included in Martensite: $1.0 \times 10^{13}$ Pieces/m³ or More In order to propagate plastic deformation while suppressing the formation of voids after the plastic deformation of martensite begins, iron-based transition carbides other than cementite (ε carbide, η carbide, and χ carbide) are generated in martensite. These carbides are well consistent with peripheral bcc iron, and voids are unlikely to be formed in the vicinities of the carbides, but the carbides are different from peripheral bcc iron in terms of physical properties, and, in the vicinity of the carbides, plastic deformation is likely to be caused. From the above-described viewpoint, martensite in the steel sheet according to the present embodiment needs to have $1.0 \times 10^{13}$ pieces/m³ or more of transition carbides. As the density of the transition carbide increases, it becomes easier to propagate plastic deformation, and the initiation and propagation of brittle fracture are further suppressed. Therefore, the density of the transition carbide is preferably set to $3.0 \times 10^{13}$ pieces/m³ or more and more preferably set to $5.0 \times 10^{13}$ pieces/m³ or more. The upper limit of the density of the transition carbide is not particularly specified; however, in order to set the density of the transition carbide to more than $1.0 \times 10^{22}$ pieces/m³, there is a need to dissolve a large amount of carbon in austenite which is a matrix before turning into martensite. In this case, there is a concern that a part of austenite may not transform during martensitic transformation, but remain as retained austenite, and thus the density of the transition carbide is preferably set to $1.0 \times 10^{22}$ pieces/m³ or less.

In order to facilitate the progress of the plastic deformation of martensite, martensite preferably includes $1.0 \times 10^{13}$/m² or more of dislocations (mainly moving dislocations). The density of the dislocations is more preferably $3.0 \times 10^{13}$/m² or more.

Cementite, the transition carbides, and the dislocations in martensite are observed using a transmission electron microscope (TEM). Regarding the densities of the transition carbides and the moving dislocations, in five or more different visual fields, the number of the carbide or the lengths of the dislocations are measured in an area of $5.0 \times 10^{-12}$ m² or larger in each visual field, and furthermore, the thickness of the sample in the visual field is measured by an electron energy loss spectroscopy (EELS) method to obtain the volume observed in each observed visual field, whereby the densities of cementite, the transition carbide, and the dislocations can be obtained.

Average Grain Diameter of Prior Austenite Grains: 5.0 μm or Smaller

In order to suppress the generation and propagation of fracture cracks in martensite, it is effective to refine the grain size which is a matrix in which martensite generates (observed as prior austenite grains in the steel sheet). The average grain diameter of the parent phase austenite (prior austenite) is preferably 5.0 μm or smaller and more preferably 3.5 μm or smaller. In addition, in order to suppress the propagation of fracture, the parent phase austenite grains are preferably isotropic, and the average aspect ratio of the parent phase austenite grains (prior austenite grains) is preferably 2.50 or less and more preferably 1.75 or less.

The grain diameter and aspect ratio of prior austenite are determined as described below. In a visual field on which the volume fraction has been measured with the FE-SEM, 10 or more parent phase austenite grains (prior austenite grains) are randomly selected from the microstructure, the major axes and minor axes are measured in the observation surface, the grain diameter (=√(major axis×minor axis)) and aspect ratio (=major axis/minor axis) of each grain are obtained, and the grain diameter and aspect ratio of prior austenite are determined using the simple averages of the particle diameters and aspect ratios of all of the selected grains.

Density (Number Density) of Coarse Inclusion Having Equivalent Circle Diameter of 10 µm or More: 0.50 Pieces/Mm² or Less Coarse inclusion having equivalent circle diameters of 10 µm or more strongly act as starting points of brittle fracture and significantly impair the impact resistance of the steel sheet. Therefore, the number density of the above-described coarse inclusion is limited to 0.50 pieces/mm² or less. The number density of the coarse inclusion is preferably as small as possible and is preferably set to 0.33 pieces/mm² or less. Here, the inclusion refers to a sulfide (MnS, TiS, or the like), an oxide ($Al_2O_3$, SiO, or the like), or a nitride alone or a composite thereof.

The number density of the coarse inclusion can be obtained by, in the observation surface of the above-described microstructure, observing a mirror-polished observation surface with an optical microscope and measuring the number density of inclusion having equivalent circle diameters of 10 µm or larger within a range of 50 mm² or larger in total throughout the overall thickness of the steel sheet.

Ratio of maximum value $Hv_{max}$ of Vickers hardness to minimum value $Hv_{min}$ of Vickers hardness in surface parallel to surface at position ¼ of sheet thickness deep from surface in sheet thickness direction: 1.40 or less, average value of minimum distances between peaks of Vickers hardness in distribution map of Vickers hardness: 1.00 mm or less In the steel sheet according to the present embodiment, in order to enhance the impact resistance, the macro homogeneity in the steel sheet is enhanced. Specifically, in a surface parallel to the surface at a position ¼ of the sheet thickness deep from the surface in the sheet thickness direction, the ratio ($Hv_{max}/Hv_{min}$) of the maximum value $Hv_{max}$ to the minimum value $Hv_{min}$ of Vickers hardness measurement values is set to 1.40 or less. This ratio is preferably as small as possible. From the viewpoint of impact resistance, the ratio is preferably set to 1.32 or less and more preferably set to 1.25 or less.

In addition, in a case where the deviation of hardness is small, but the deviation occurs in the steel sheet over a long period of length, since strain imparted to a broad range concentrates at a portion having a low strength in the steel sheet, there is a need to shorten the period of the occurrence of the deviation. Specifically, when a distribution map of Vickers hardness is prepared on the same measurement surface, the average spacing between peaks (measurement points at which Vickers hardness is high compared with all peripheral measurement points) of Vickers hardness is set to 1.00 mm or less. The average distance between peaks is preferably as small as possible and is preferably set to 0.85 mm or less and more preferably set to 0.70 mm or less.

Here, Vickers hardness is measured with a load (100 gf to 300 gf) with which the diagonal length of an indent reaches 25 µm or longer and 45 µm or shorter on a mirror-polished surface in a region near a position of a ¼ thickness ((¼)t) in the sheet thickness direction that is parallel to the surface of the steel sheet. Indents are imparted at pitches of 100 µm, and a total of 600 indents (20 indents in the rolling direction and 30 indents in the sheet width direction) are imparted in a grid shape. The maximum value and minimum value of the hardness are defined as the maximum hardness and the minimum hardness of the measurement results at the 600 indents.

In addition, among the 600 measurement points, at 504 points excluding 96 points present in the outermost circumferential portion, the magnitude of the peak of hardness is compared with hardness measurement values at four points adjacent to each measurement point, and a point at which the hardness is maximized at that measurement point (a point at which hardness is larger than those at the four adjacent points) is determined as a peak. Regarding the average distance between peaks, peaks are mapped, the distance between closest peaks at each peak is measured, and the average distance between peaks is determined with the average value of the distances.

The steel sheet according to the present embodiment may be a steel sheet having a zinc plated layer or a zinc alloy plated layer on either or both surfaces of the steel sheet and may be a steel sheet having an alloyed plate layer obtained by carrying out an alloying treatment on a zinc plated layer or a zinc alloy plated layer.

The plated layer that is formed on either or both surfaces of the steel sheet according to the present embodiment is preferably a zinc plated layer or a zinc alloy plated layer mainly containing zinc. The zinc alloy plated layer preferably contains Ni as an alloy component.

Figure 2:
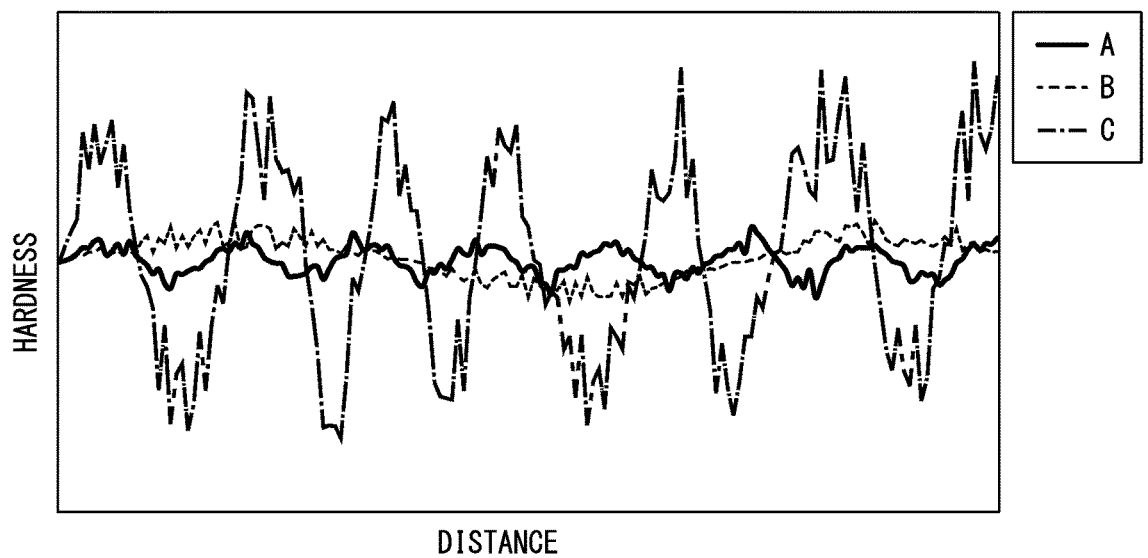
FIG. 2 is a schematic view of hardness distributions in steel sheets, in which A indicates a hardness distribution in a present invention steel, B indicates a hardness distribution in a comparative steel (an example in which the distance between hardness peaks is excessively large), and C indicates a hardness distribution in a comparative steel (an example in which the difference between the maximum value and the minimum value of hardness is excessively large).
Figure 3A:
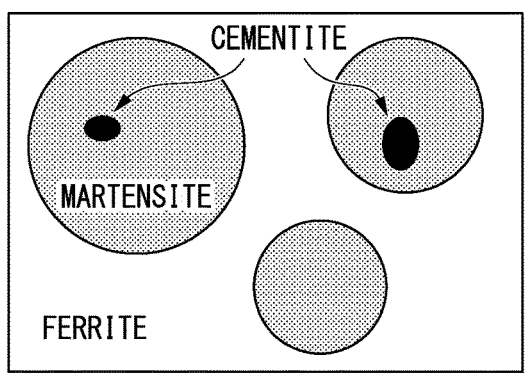
FIG. 3A is a schematic view showing an appearance of a (heterogeneous) microstructure in which micro homogeneity is low in a present invention steel.
Figure 3B:
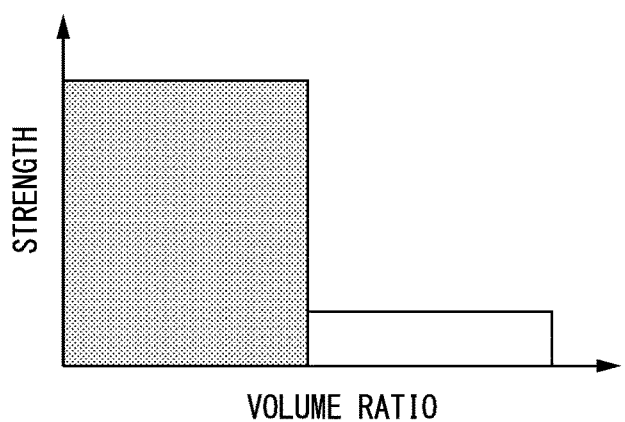
FIG. 3B is a schematic view showing configurational proportions of structures and hardness (corresponding to strength) thereof in the (heterogeneous) microstructure in which micro homogeneity is low in the present invention steel.
Figure 3C:
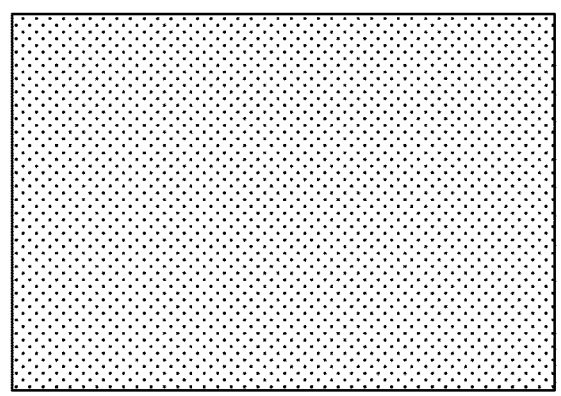
FIG. 3C is a schematic view showing an appearance of a (homogeneous) microstructure in which micro homogeneity is high.
Figure 3D:
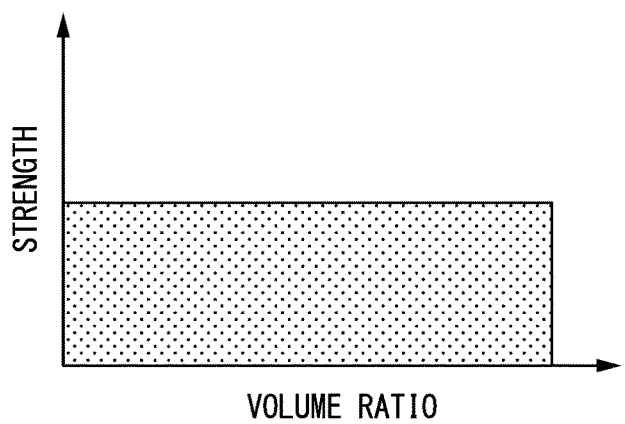
FIG. 3D is a schematic view showing configurational proportions of structures and hardness thereof in the microstructure in which micro homogeneity is high.
Figure 4A:
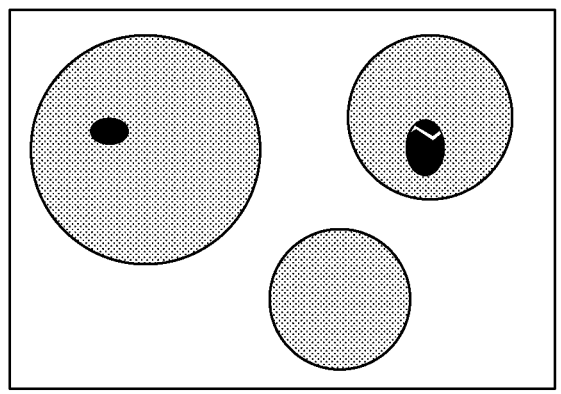
FIG. 4A is a schematic view of a fracture phenomenon in the (heterogeneous) microstructure in which micro homogeneity is low and a view showing an appearance in which a crack is initiated in coarse cementite in martensite in association with deformation.
Figure 4B:
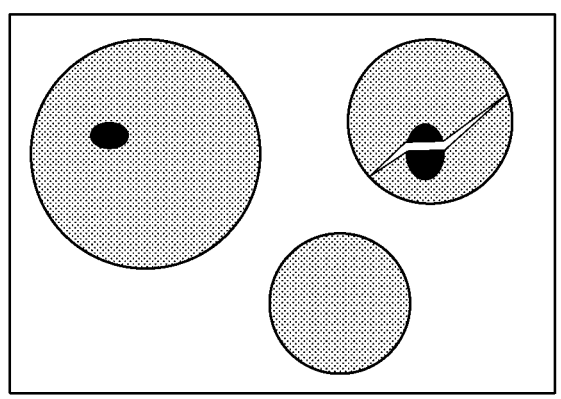
FIG. 4B is a schematic view showing an appearance in which, subsequent to FIG. 4A, the deformation further progresses, and the crack initiated in the coarse cementite in the martensite propagates to the surrounding martensite.
Figure 4C:
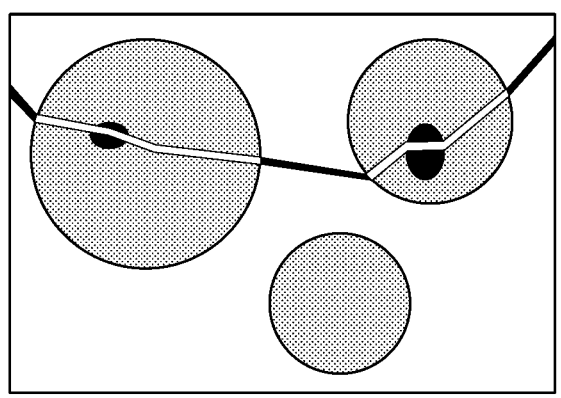
FIG. 4C is a schematic view showing an appearance in which, subsequent to FIG. 4B, the deformation further progresses, and the crack that has penetrated the martensite propagates to the surrounding ferrite or different nearby martensite.

In the steel sheet according to the present embodiment, the macro hardness distribution (like, for example, A in FIG. 2) is controlled as described above regarding the development behavior of fracture that continues as shown in FIG. 4A, FIG. 4B, and FIG. 4C sequentially, thereby suppressing the concentration of local strain and stress with respect to a heterogeneous microstructure including cementite, which acts as a starting point of fracture as shown in FIG. 3A. Furthermore, the size and shape of cementite are controlled, thereby suppressing the initiation of fracture as shown in FIG. 4A. Furthermore, in the steel sheet according to the present embodiment, the propagation of fracture as shown in FIG. 4B and FIG. 4C is suppressed by enhancing the toughness of martensite. This improves the formability and the impact resistance.

The zinc plated layer and the zinc alloy plated layer are formed by a hot-dip plating method, an electro plating method, or a deposition plating method. When the Al content in the zinc plated layer increases, since the adhesion between the surface of the steel sheet and the zinc plated layer deteriorates, the Al content in the zinc plated layer is preferably 0.5 mass % or less. In a case where the zinc plated layer is a hot-dip galvanized layer, the amount of Fe in the hot-dip galvanized layer is preferably 3.0 mass % or less in order to enhance the adhesion between the surface of the steel sheet and the zinc plated layer.

In a case where the zinc plated layer is an electrogalvanized layer, the amount of Fe in the plated layer is preferably 0.5 mass % or less from the viewpoint of improving the corrosion resistance.

The zinc plate layer and the zinc alloy plated layer may contain one or more of Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr, Ta, Ti, V, W, Zr, and REM to an extent that the corrosion resistance or the formability is not impaired. Particularly, Ni, Al, and Mg are effective for improvement in the corrosion resistance.

The zinc plated layer or the zinc alloy plated layer on the surface of the steel sheet according to the present embodiment may be an alloyed plated layer on which an alloying treatment has been carried out. In a case where an alloying treatment is carried out on a hot-dip galvanized layer or a hot-dip zinc alloy plated layer, the amount of Fe in the hot-dip galvanized layer or the hot-dip zinc alloy plated layer is preferably set to 7.0 to 13.0 mass % from the viewpoint of improving the adhesion between the surface of the steel sheet and the alloyed plated layer.

The sheet thickness of the steel sheet according to the present embodiment is not limited within a specific range, but is preferably 0.4 mm to 5.0 mm when the versatility or the productibility is taken into account. When the sheet thickness is smaller than 0.4 mm, it becomes difficult to maintain a flat shape of the steel sheet, and the dimension and shape accuracy deteriorates. Therefore, the sheet thickness is preferably 0.4 mm or more. The sheet thickness is more preferably 0.6 mm or more.

On the other hand, when the sheet thickness exceeds 5.0 mm, in production steps, it becomes difficult to impart appropriate strain and to control the temperature, and there is a case where a homogeneous structure cannot be obtained. Therefore, the sheet thickness is preferably 5.0 mm or less. The sheet thickness is more preferably 4.5 mm or less.

Next, a production method for the steel sheet according to the present embodiment will be described.

As long as the steel sheet according to the present embodiment has the above-described properties, the steel sheet is capable of obtaining the effects regardless of the production method. However, when produced by the following production method including the following processes, the steel sheet can be stably produced, which is preferable.

(I) A casting process of casting molten steel having a predetermined chemical composition such that the average cooling rate within a surface temperature range of 700° C. to 550° C. is 10° C./hour to 75° C./hour to obtain a cast piece having a thickness of 100 mm to 500 mm or less, (II) a hot rolling process of heating the cast piece to 1200° C. to 1350° C. and hot rolling the heated cast piece, thereby making a hot-rolled steel sheet, (III) a cooling process of cooling the hot-rolled steel sheet to room temperature, (IV) a cold rolling process of cold-rolling the hot-rolled steel sheet at a total rolling reduction of 30% to 90% and a rolling completion temperature of 250° C. or lower to obtain a cold-rolled steel sheet, and (V) an annealing process of heating the cold-rolled steel sheet at an annealing temperature of 760° C. or higher and Ac3+20° C. or lower and cooling the cold-rolled steel sheet to 80° C. or lower.

Hereinafter, preferred conditions for each process will be described.

<Casting Process>

In order to produce the steel sheet according to the present embodiment, first, a cast piece having the same composition as the above-described chemical composition (component composition) of the steel sheet according to the present embodiment is produced. The cast piece that is subjected to hot rolling is preferably produced by continuous casting from the viewpoint of production cost, but may also be produced by a different casting method (for example, an ingot-making method). The thickness of the cast piece is set to 100 mm or more and 500 mm or less and is preferably set to 150 mm or more and 350 mm or less in order to impart an appropriate strain amount in a hot rolling process. When the thickness of the cast piece is less than 100 mm, a steel sheet that has been imparted with an appropriate strain amount becomes too thin, and it is difficult to obtain a flat shape. On the other hand, when the thickness of the cast piece exceeds 500 mm, there is a risk that the cast piece may crack during the cooling of the cast piece.

In the casting process, in a cooling step of the cast piece, the average cooling rate from the surface temperature is 700° C. to 550° C. is set to 10° C./hour to 75° C./hour. Within the corresponding temperature range, since the localization of elements progress in association with phase transformation in the cast piece, when the average cooling rate is slower than 10° C./hour, segregation progresses excessively, which increases the ratio between the maximum hardness and the minimum hardness in a steel sheet that is finally obtained and degrades the impact resistance. From this viewpoint, the average cooling rate within the corresponding temperature range is preferably set to 10° C./hour or faster and more preferably set to 13° C./hour or faster.

On the other hand, when the average cooling rate while the surface temperature reaches 700° C. and then reaches 550° C. is faster than 75° C./hour, segregation does not sufficiently progress, the influence of a concentration fluctuation that occurs over a long period of length on a strength fluctuation of a steel sheet becomes significant, the average distance between hardness peaks in the steel sheet that is finally obtained becomes large, and the impact resistance deteriorates. From this viewpoint, the average cooling rate is preferably set to 75° C./hour or slower, more preferably set to 65° C./hour or slower, and still more preferably set to 30° C./hour or slower.

The cast piece may be once cooled to room temperature by additional cooling or may be directly subjected to hot rolling while remaining at a high temperature since it is possible to reduce energy necessary for heating.

<Hot Rolling Process>

Subsequently, hot rolling is carried out on the cast piece. First, the cast piece is heated up to a temperature of 1200° C. or higher. When the heating temperature of the cast piece is low, an element-concentrating portion attributed to a coarse carbonitride in the cast piece is locally generated, and the ratio between the maximum hardness and the minimum hardness in the steel sheet that is finally obtained becomes large. In addition, in order to carry out subsequent hot rolling at higher temperatures and enhance the macro homogeneity of the steel sheet, the heating temperature of the cast piece is preferably set to 1220° C. or higher. On the other hand, when the heating temperature of the cast piece exceeds 1350° C., the structure becomes coarse, and an effect of the subsequent hot rolling that homogenizes the inside of the steel sheet is impaired. Therefore, the heating temperature of the cast piece is set to 1350° C. or lower and preferably set to 1320° C. or lower.

After the heating, hot rolling is carried out on the cast piece. As the hot rolling, first, rolling is carried out within a temperature range from the highest heating temperature to 1050° C. (temperature range of 1050° C. or higher) such that the total rolling reduction (cumulative rolling reduction) reaches 60% or more. When the total rolling reduction within this temperature range is less than 60%, the effect of the hot rolling that homogenizes the inside of the steel sheet is not sufficiently exhibited. The total rolling reduction is preferably set to 70% or more. The upper limit of the total rolling reduction within the temperature range of 1050° C. or higher is not particularly set, but the total rolling reduction is preferably set to 95% or less since excessive rolling impairs the shape of the steel sheet.

In addition, since the hot rolling within the temperature range from the highest heating temperature to 1050° C. sufficiently promotes the homogenization of the inside of the steel sheet, there is a need to satisfy Expression (2).

[Math. 9]

$$\sum_{i=1}^{n} A_1 \cdot \left( \frac{1}{1 + 12.1[Nb]} + \frac{1}{1 + 4.8 \cdot ([Ti] - 3.0[N])} + \frac{1}{1 + 93.3[B]} \right)^{-1} \cdot (T'_i - 1050)^{\frac{1}{6}} \cdot \frac{h_{i-1} - h_i}{h_{i-1}^{1.5}} \cdot t_i^{0.5} \cdot \exp\left( \frac{A_2}{T_i + 273} - \frac{A_3}{T'_i + 273} \right) \geq 1.00$$

Expression (2)

Expression (2) includes expressions that represent the accumulation degree of strain by rolling and the degree of recrystallization of austenite. As the value of the left side of Expression (2) increases, austenite grain boundaries migrate inside of the steel sheet, and the homogenization of the inside of the steel sheet progresses. Between two terms in the exponent function term, the former (term including the constant $A_2$) is derived from an expression that represents the accumulation degree of strain, the latter (term including the constant $A_3$) is derived from an expression that represents the degree of recrystallization of austenite, and the other terms are obtained by rearranging the coefficient of the two expressions.

The reference signs in Expression (2) will be described. n is the number of times of rolling that is carried out while the temperature of the steel sheet reaches 1050° C. from the highest heating temperature. For each of first rolling to $n^{th}$ rolling, the expressions following the $A_1$ term are calculated, and the sum thereof becomes the value of the left side of Expression (2). $A_1$, $A_2$, and $A_3$ are constant terms and are $1.53 \times 10^2$, $1.60 \times 10^4$, and $2.31 \times 10^4$, respectively. [Element signs] ([Nb], [Ti], [N], and [B]) represent the amounts [mass %] of the respective elements. $T_i$ is the temperature [° C.] at which $i^{th}$ rolling is carried out. $T'_i$ is the average temperature [° C.] of the temperature $T_i$ at which the $i^{th}$ rolling is carried out and the temperature $T_{i+1}$ at which the $(i+1)^{th}$ rolling is carried out. Here, $T'_n$ is defined as the average temperature of the temperature $T_n$ at which the $n^{th}$ rolling is carried out and 1050° C. $h_i$ represents the thickness [mm] of a steel sheet that is obtained by carrying out the $i^{th}$ rolling. $h_0$ is defined as the thickness of the heated cast piece. $t_i$ is defined as the elapsed time [seconds] while the $i^{th}$ rolling is carried out and then the $(i+1)^{th}$ rolling is carried out. $t_n$ is defined as the elapsed time while the $n^{th}$ rolling is carried out and then the temperature of the steel sheet reaches 1050° C.

As the value of the left side of Expression (2) increases, homogenization via the hot rolling progresses. The hot rolling is carried out under a condition under which the value of the left side of Expression (2) reaches 1.00 or more within a temperature range of 1050° C. or higher. In order to increase the homogenization degree of the inside of the steel sheet and improve the impact resistance, the hot rolling is preferably carried out under a condition under which the value of the left side of Expression (2) reaches 1.20 or more and more preferably carried out under a condition under which the value reaches 1.40 or more. In the middle of the hot rolling, heating or cooling may be appropriately carried out such that Expression (2) is satisfied. The upper limit of the value of the left side of Expression (2) is not particularly set; however, when the value of the left side of Expression (2) becomes excessively large, the structure of the steel sheet becomes coarse, and it becomes difficult to refine the structure via hot rolling that is carried out after the temperature reaches 1050° C., and thus the value of the left side of Expression (2) is preferably limited to 6.00 or less. In order to increase the value of the left side of Expression (2), since a device such as a heating apparatus becomes necessary, the value of the left side of Expression (2) is preferably set to 4.00 or less from the viewpoint of production cost.

The hot rolling conditions while the temperature reaches 1050° C. and then reaches a rolling completion temperature (temperature range of lower than 1050° C.) are made to satisfy Expression (3).

[Math. 10]

$$R_{m+n} \leq 10.00$$

Expression (3)

[Math. 11]

$$R_n = \frac{h_0 \cdot E_2^3}{h_0 - h_n}$$

[Math. 12]

$$R_{n+j} = R_{n+j-1}^{1/3} \cdot 10^{\left\{ A_4 - A_5 \cdot \log_{10} \left\{ \frac{h_{n+j-1} - h_{n+j}}{h_{n+j-1}^{\frac{5}{4}}} \cdot \exp\left( \frac{A_6}{T_{n+j} + 273} \right) \right\} \right\}} + A_7 \cdot (1 + [C]) \cdot \left( \frac{1}{1 + 19.2[Nb]} + \frac{1}{1 + 7.5 \cdot ([Ti] - 3[N])} + \frac{1}{1 + 115.0[B] + 2.7[Mo]} \right) \cdot \exp\left( -\frac{A_8}{T'_{n+j} + 273} \right) \cdot t_{n+j}^{\frac{1}{2}}$$

Expression (3) is an index that represents the refinement behavior of the structure via the hot rolling within the temperature range of lower than 1050° C., is derived from a term relating to the generation of a recrystallization nucleus in association with the hot rolling and a term relating to grain growth after the rolling, and is obtained by rearranging coefficients.

The reference signs in Expression (3) will be described. n is the total number of times of hot rolling at 1050° C. or higher. m is the total number of times of hot rolling at lower than 1050° C. j indicates the order of specific rolling among rollings that are carried out at lower than 1050° C. $h_{n+j}$ [mm], $T_{n+j}$ [° C.], $T'_{n+j}$ [° C.], and $t_{n+j}$ [seconds] have the same meaning as the reference signs in Expression (2), respectively. $T'_{n+m}$ is defined as the average temperature of the rolling temperature of the $m^{th}$ hot rolling at lower than 1050° C. and 800° C. In addition, $t_{n+m}$ is defined as the elapsed time while the $m^{th}$ hot rolling is completed at lower than 1050° C. and then the temperature of the steel sheet reaches 800° C. $E_2$ represents the value of the left side of Expression (2). [Element signs] ([Nb], [Ti], [N], [B], [Mo], and [C]) represent the amounts [mass %] of the respective elements. $A_4$, $A_5$, $A_6$, $A_7$, and $A_8$ are constant and are $5.86 \times 10^0$, $5.00 \times 10^{-1}$, $3.37 \times 10^4$, $6.44 \times 10^4$, and $1.35 \times 10^4$, respectively.

In the above-described expression, first, $R_n$ is calculated based on the result of Expression (2), regarding the hot rolling at lower than 1050° C., $R_{n+1}$ is calculated for the first rolling, subsequently, $R_{n+2}$ is calculated, and whether or not $R_{n+m}$ ($R_{m+n}$) that is obtained by carrying out sequential calculation satisfies Expression (3) is determined.

When the value of the left side of Expression (3) is larger than 10.00, the structure after the hot rolling becomes coarse, in association with phase transformation after the hot rolling, carbon is localized and coarse cementite is formed, and a desired structure cannot be obtained in the steel sheet that is finally obtained. In the case of recrystallization effectively progressing after the cold rolling by refining a Ti carbide, the rolling at lower than 1050° C. is preferably carried out under conditions under which the value of the left side of Expression (3) reaches 7.50 or less and more preferably carried out under conditions under which the value reaches 5.00 or less. The lower limit of the value of the left side of Expression (3) is not particularly set; however, in order to set the value to less than 0.50, it is necessary to excessively thin the steel sheet, and the shape of the steel sheet after the hot rolling collapses. Therefore, the lower limit is preferably set to 0.50 or more. From the viewpoint of production cost, the lower limit of the value of the left side of Expression (3) is more preferably set to 1.50 or more.

The completion temperature of the hot rolling may be selected as long as Expression (3) is satisfied; however, at lower than 800° C., the rolling reaction force becomes large, and there is a concern that the shape of the steel sheet may deteriorate. Therefore, the completion temperature is preferably set to 800° C. or higher. In addition, in order to satisfy Expression (3) while the rolling completion temperature is set to higher than 1000° C., reheating of the steel sheet becomes necessary, and the production cost increases. Therefore, the rolling completion temperature is preferably set to 1000° C. or lower.

<Cooling Process>

After the completion of the hot rolling, the steel sheet is cooled to 100° C. or lower (for example, room temperature) at an average cooling rate of 20° C./second or faster within a temperature range of the completion temperature of the hot rolling to 630° C. and is cooled within a temperature range of 630° C. to 500° C. such that Expression (4) is satisfied.

When the average cooling rate from the completion temperature of the hot rolling to 630° C. is slower than 20° C./second, in association with phase transformation after the hot rolling, carbon is localized and coarse cementite is formed, and a desired structure cannot be obtained in the steel sheet that is finally obtained. In addition, the macro homogeneity of the steel sheet is also impaired by phase transformation within this temperature range. Therefore, in the case of further enhancing the impact resistance, the average cooling rate from the completion temperature of the hot rolling to 630° C. is preferably 30° C./second or faster. The upper limit of the average cooling rate is not particularly set, but a special cooling medium is required to achieve a cooling rate faster than 200° C./second, and thus the average cooling rate is preferably set to 200° C./second or slower from the viewpoint of production cost.

In the present embodiment, the average cooling rate and the average heating rate are each a value obtained by dividing the temperature difference between the starting point and the ending point of a setting range by the elapsed time from the start point to the end point.

After that, the temperature history from 630° C. to 500° C. is made to satisfy Expression (4). $P_{13}$ is an index that represents the progress degree of the precipitation of cementite and carbonitride of Nb and Ti that is obtained by calculation using the following expression within a temperature range from 630° C. to 500° C.

[Math. 13]

$$1.00 \times 10^{-7} \geq P_{13} \geq 1.00 \times 10^{-8} \qquad \text{Expression (3)}$$

[Math. 14]

$$P_1 = [X_1] \cdot [Y_1] =$$
$$\left[ \left\{ 1 - \exp\left(-A_9 \cdot [225 - 240[C] - 35[Mn] - 15[Si] - 15[Cr] - \right. \right. \right.$$
$$21[Ni] + 32[Al]]^{4.5} \cdot E_3^{-0.5} \cdot \exp\left(-\frac{A_{10}}{898}\right) \cdot$$
$$\left. \left. [A_{11} + 34[Nb] + 56[B]^{0.5} + 7[Mo]]\right) \cdot A_{12} \cdot \exp\left(-\frac{A_{10}}{1796}\right) \cdot t_1^{0.5} \right\} +$$
$$A_{13} \cdot (25 - 200[C] - 27[Mn] - 14[Cr] - 12[Ni] + 18[Al])^2 \cdot$$
$$(1 + [C]) \cdot \left[1 - \exp\left(-\frac{1.1}{[Si]}\right)\right]^2 \cdot \left[A_{14} \cdot \exp\left(-\frac{A_{15}}{1796}\right) \cdot t_1^{0.5} \cdot \right.$$
$$\frac{[Ti] - 3[N]}{[Ti] - 3[N] + 5.2[Nb]} \cdot \left(1 + 0.32[Ti]^{0.5} + 0.43[Ti]\right)^{-1} + A_{16} \cdot \exp\left(-\frac{A_{17}}{1796}\right) \cdot$$
$$\left. t_1^{0.5} \cdot \frac{5.2[Nb]}{[Ti] - 3[N] + 5.2[Nb]} \cdot \left(1 + 0.87[Nb]^{0.5} + 1.19[Nb]\right)^{-1} \right]$$

In the present embodiment, the temperature range from 630° C. to 500° C. is divided every 10° C. into 13 sections, and phase transformation and the precipitation degree are calculated in each of the first to 13$^{th}$ temperature ranges. $P_1$ is an index that evaluates the progress degree of precipitation within a temperature range from 630° C. to 620° C. and is made up of a term $X_1$ that evaluates the progress degree of phase transformation and a term $Y_i$ that evaluates the precipitation degree in a transformed region. As $X_1$ increases, phase transformation further progresses, and as $Y_1$ increases, the precipitation of a carbide of Nb and Ti (alloy carbide) in the transformed region further progresses.

Reference signs in the expression will be described. $A_9$, $A_{10}$, $A_{11}$, $A_{12}$, $A_{13}$, $A_{14}$, $A_{15}$, $A_{16}$, and $A_{17}$ are constants and are $3.70 \times 10^{12}$, $3.93 \times 10^4$, $1.93 \times 10^0$, $1.00 \times 10^7$, $9.09 \times 10^{-2}$, $2.80 \times 10^{-3}$, $2.54 \times 10^4$, $4.12 \times 10^{-2}$, and $3.03 \times 10^4$, respectively. [Element signs] ([C], [Mn], [Si], [Cr], [Ni], [Al], [Nb], [B], [Mo], [Ti], and [N]) represent the amounts [mass %] of the respective elements. $E_3$ is the value of the left side of Expression (3).

In a case where the term $(25-200[C]-27[Mn]-14[Cr]-12[Ni]+18[Al])$ becomes negative, the term is regarded as zero in calculation.

Subsequently, an evaluation index $P_i$ of the progress degree of precipitation in the region within a temperature range from 630° C. to $(630-10 \times i)$° C. is calculated. After calculation with i=1, calculation is carried out in order using the result for the case of i=2 and the case of i=3. The index $P_i$ in a case where i is 2 or more is defined as described below.

[Math. 15]

$$X_i(i > 1) =$$
$$\left[ \left\{ 1 - \exp\left(-A_9 \cdot [215 + 10i - 240[C] - 35[Mn] - 15[Si] - 15[Cr] - 21[Ni] + \right. \right. \right.$$
$$32[Al]]^{4.5} \cdot E_3^{-0.5} \cdot \exp\left(-\frac{A_{10}}{908 - 10i}\right) \cdot |A_{11} + 34[Nb] + 56[B]^{0.5} + 7[Mo]|\right) \cdot$$
$$\left\{ A_{12}^2 \cdot \exp\left(-\frac{A_{10}}{908 - 10i}\right) \cdot t_i + (-\ln(1 - X_{i-1})) \cdot \right.$$

-continued $$\left\{A_9 \cdot [215 + 10i - 240[C] - 35[Mn] - 15[Si] - 15[Cr] - 21[Ni] + 32[Al]]^{4.5} \cdot E_3^{-0.5} \cdot \exp\left(-\frac{A_{10}}{908 - 10i}\right) \cdot \left[A_{11} + 34[Nb] + 56[B]^{0.5} + 7[Mo]\right]^{-1}\right\}^{0.5} +$$

$$A_{13} \cdot (1 - X_i) \cdot (15 + 10i - 200[C] - 27[Mn] - 14[Cr] - 12[Ni] + 18[Al])^2 \cdot$$

$$(1 + [C]) \cdot \left[1 - \exp\left(-\frac{1.1}{[Si]}\right)\right]^2 \right]$$

Here, in a case where the term (15+10i−200[C]−27[Mn]−14[Cr]−12[Ni]+18[Al]) becomes negative, the term is regarded as zero.

[Math. 16]

$$t'_{i-1}(i > 1) =$$

$$P_{i-1}^2 \cdot X_{i-1}^2 \cdot X_i^{-2} \cdot \left(A_{14}^2 \cdot \exp\left(-\frac{A_{15}}{908 - 10i}\right) \cdot \frac{[Ti] - 3[N]}{[Ti] - 3[N] + 5.2[Nb]} \cdot A_{16}^2 \cdot \exp\left(-\frac{A_{17}}{908 - 10i}\right) \cdot \frac{5.2[Nb]}{[Ti] - 3[N] + 5.2[Nb]}\right)^{-1}$$

[Math. 17]

$$Y_i(i > 1) = \left[A_{14} \cdot \exp\left(-\frac{A_{15}}{1816 - 20i}\right) \cdot (t_i + t'_{i-1})^{0.5} \cdot \frac{[Ti] - 3[N]}{[Ti] - 3[N] + 5.2[Nb]} \cdot \right.$$

$$\left(1 + 0.32[Ti]^{0.5} + 0.43[Ti]\right)^{-1} + A_{16} \cdot \exp\left(-\frac{A_{17}}{1816 - 20i}\right) \cdot$$

$$\left.(t_i + t'_{i-1})^{0.5} \cdot \frac{5.2[Nb]}{[Ti] - 3[N] + 5.2[Nb]} \cdot \left(1 + 0.87[Nb]^{0.5} + 1.19[Nb]\right)^{-1}\right]$$

[Math. 18]

$$P_i = [X_i] \cdot [Y_i]$$

When $P_{13}$ in Expression (4) is less than $1.00 \times 10^{-8}$, a part of Ti and Nb remains as a solid solution, recrystallization after the cold rolling is suppressed, and unrecrystallized ferrite remains. In a case where the formability is improved by progressing recrystallization, $P_{13}$ is set to $1.00 \times 10^{-8}$ or more. In order to enhance the formability, $P_{13}$ is preferably set to $2.00 \times 10^{-8}$ or more.

Meanwhile, when $P_{13}$ is excessively increased, cementite coarsens, and there is a concern that cementite may not dissolve but remain even after a heat treatment is carried out after the cold rolling. Therefore, $P_{13}$ is limited to $1.00 \times 10^{-7}$ or less. In order to avoid unnecessary coarsening of cementite, $P_{13}$ is preferably set to $7.50 \times 10^{-8}$ or less and more preferably set to $6.00 \times 10^{-8}$ or less. Before the cold rolling is carried out, the steel sheet may be reheated up to 500° C. or higher again after the temperature of the steel sheet drops below 500° C.

<Cold Rolling Process>

Subsequently, a pickling treatment is carried out on the steel sheet that has been cooled to room temperature, and subsequently, cold rolling is carried out thereon. The total rolling reduction in the cold rolling is set to 30% or more and 90% or less. When the total rolling reduction in the cold rolling is less than 30%, the progress of recrystallization in the following heat treatment becomes insufficient, and unrecrystallized ferrite remains. In addition, from the viewpoint of improving the strength-formability-impact resistance balance by refining the structure, the total rolling reduction is preferably 40% or more and more preferably 50% or more.

On the other hand, when the total rolling reduction in the cold rolling exceeds 90%, the anisotropy of the steel sheet increases, and the formability deteriorates. From the viewpoint of enhancing the formability, the total rolling reduction is preferably 80% or less and more preferably 70% or less in order to reduce the anisotropy of the steel sheet.

In the cold rolling, the temperature of the steel sheet increases via processing heating. When the temperature of the steel sheet increases excessively, the accumulation of processing strain does not sufficiently progress, and there is a case where the progress of recrystallization is impaired. Therefore, the rolling reduction and the interpass time are controlled such that the temperature of the steel sheet at a point in time of the completion of the cold rolling (cold rolling completion temperature) reaches 250° C. or lower. From the viewpoint of formability, the completion temperature of the cold rolling is preferably 200° C. or lower in order for recrystallization to efficiently progress.

<Annealing Process>

[Heating Step]

Subsequently, a heat treatment (annealing) is carried out on the steel sheet after the cold rolling (cold-rolled steel sheet). First, the steel sheet is heated up to the highest heating temperature (annealing temperature); however, in this step, the heating rate is controlled for recrystallization to progress. When the average heating rate from 400° C. to 550° C. is slower than 3.0° C./second, since the recovery of dislocations in the steel sheet progresses excessively, and recrystallization is suppressed, the average heating rate within a temperature range of 400° C. to 550° C. is set to 3.0° C./second or faster. The upper limit of the average heating rate is not particularly set, but is preferably set to 200° C./second or slower from the viewpoint of production cost.

Subsequently, the steel sheet is heated from 550° C. to Ac1 (° C.) such that the temperature history satisfies Expression (5).

[Math. 19]

Expression (5)

$$10.00 \geq \sum_{i=1}^{10} A_{18} \cdot \left\{\ln\left(\frac{100}{100-r}\right)\right\}^{\frac{2}{3}} \cdot$$

$$\exp\left(-\frac{A_{19}}{823 + (0.1i - 0.05) \cdot (Ac1 - 550)}\right) \cdot$$

$$\left(\frac{A_{20} \cdot E_4^{\frac{1}{3}}}{1 + 13[Nb] + 7[Ti] - 21[N]}\right)^{\frac{T_i}{275}} \cdot t_i \geq 1.00$$

The middle portion of Expression (5) is an expression that represents the progress degree of recrystallization and is the sum of the evaluated possible progresses of recrystallization at the retention times in individual temperature ranges that are obtained by dividing the temperature range from 550° C. to Ac1 (° C.) by 10. Reference signs in the expression will be described. $A_{18}$, $A_{19}$, and $A_{20}$ are all constants and are $1.54 \times 10^{16}$, $3.81 \times 10^4$, and $3.68 \times 10^2$, respectively. r represents the rolling reduction in the cold rolling. Ac1 is Ac1 point (° C.) obtained for each steel via a method described below. $E_4$ is the value of $P_{13}$ in the above Expression (4). [Element signs]([Nb], [Ti], and [N]) represent the amounts [mass %] of the respective elements. $t_i$ indicates the staying time [seconds] within the $i^{th}$ temperature range counted from 550° C. as a start.

When the value of the middle portion of Expression (5) is less than 1.00, recrystallization does not sufficiently progress, and the formability deteriorates. Therefore, the value of the middle portion of Expression (5) is set to 1.00 or more. In order for recrystallization to sufficiently progress for the purpose of enhancing the formability, the value of the middle portion of Expression (5) is preferably set to 1.25 or more and more preferably set to 1.50 or more. Meanwhile, within a temperature range from 550° C. to Ac1, the growth of cementite with reduction in numbers progresses. When the value of the middle portion of Expression (5) exceeds 10.00, since coarse cementite remains in the steel sheet that is finally obtained, the upper limit of the middle portion of Expression (5) is set to 10.00. In order to prevent the coarsening of cementite, the value of the middle portion of Expression (5) is preferably set to 7.00 or less and more preferably set to 5.00 or less.

Furthermore, the average heating rate from Ac1 (° C.) to Ac1+20(° C.) is set to 1.0° C./second or faster. Thereby, the nucleation of austenite progresses uniformly in the steel sheet, and the fluctuation of hardness becomes small, and thus the macro homogeneity of the steel sheet is enhanced. The average heating rate within the temperature range from Ac1 to Ac1+20° C. is preferably set to 3.0° C./second or faster and more preferably set to 5.0° C./second or faster.

On the other hand, when the average heating rate within the temperature range from Ac1 to Ac1+20° C. is fast, cementite easily dissolves, and the impact resistance deteriorates. Therefore, the average heating rate is set to 50° C./second or slower, preferably set to 30° C./second or slower, and more preferably set to 15° C./second or slower.

The heating rate from Ac1+20° C. to the highest heating temperature is not particularly specified, but is preferably set to 5.0° C./second or slower in order to cause the isotropic growth of austenite.

The highest heating temperature in the heat treatment (annealing temperature) is set to 760° C. or higher. When the annealing temperature is lower than 760° C., coarse cementite dissolves, and the impact resistance deteriorates. In order to increase the volume fraction of martensite for the purpose of increasing the strength, the annealing temperature is preferably 770° C. or higher and more preferably 780° C. or higher such that austenite is sufficiently formed at the annealing temperature.

On the other hand, when the annealing temperature exceeds Ac3+20° C., ferrite is formed in the subsequent cooling step, but ferrite-forming sites are unevenly distributed due to the segregation of Mn or the like, and thus the macro homogeneity of the steel sheet is impaired. Therefore, the annealing temperature is set to Ac3+20° C. or lower. In the case of enhancing the formability by increasing the ferrite fraction, the annealing temperature is preferably Ac3 (° C.) or lower and more preferably Ac3−20° C. or lower.

Here, the Ac1 point and the Ac3 point are obtained by cutting a small piece from the steel sheet after the cold rolling, heating the small piece up to 1200° C. at 3° C./second, and measuring the volume expansion behavior during the heating. The production conditions may be specified using previous measurement results obtained from a cold-rolled steel sheet produced under the same conditions from which the Ac1 point and the Ac3 point have been evaluated without measuring the volume expansion behavior.

[Retention Step]

The retention time at the annealing temperature, that is, the time taken for the cold-rolled steel sheet to reach the highest heating temperature−10° C. in the heating step, get to the highest heating temperature (annealing temperature), and then reach the highest heating temperature−10° C. again is preferably set to 3.0 seconds or shorter. When the retention time is excessively short, the temperature in the steel sheet does not become sufficiently uniform, the fluctuation of the hardness becomes large, and the impact resistance deteriorates. From this viewpoint, the retention time is preferably set to 10.0 seconds or longer and more preferably set to 25.0 seconds or longer. The upper limit of the retention time is not particularly set, but is preferably set to 200 seconds or shorter in consideration of the production cost since the macro homogeneity of the steel sheet is not enhanced more even when the steel sheet is retained for longer than 200 seconds.

[Cooling Step]

After the steel sheet is heated up to the highest heating temperature, and the retention time is secured, cooling is carried out.

In the cooling step, cooling is carried out such that the average cooling rate within a temperature range of 720 to 550° C. is 10° C./second or faster, Expression (6) is satisfied within a temperature range of 550 to (Ms−80)° C., the average cooling rate within a temperature range of Ms to (Ms−25)° C. is 10° C./second or faster, and Expression (7) is satisfied within a temperature range of Ms to 80° C.

The average cooling rate within 720° C. to 550° C. is set to 10° C./second or faster. When the cooling rate within this temperature range is not sufficient, pearlite is formed, and there is a case where a sufficient amount of martensite cannot be obtained. The upper limit of the cooling rate is not particularly specified, but is preferably limited to 200° C./second or slower from the viewpoint of production cost since a special cooling medium and/or a cooling apparatus become necessary in order to realize a cooling rate of faster than 200° C./second.

The temperature history from 550° C. to Ms−80° C. is made to satisfy Expression (6).

In Expression (6), a point in time when the temperature of the steel sheet reaches 550° C. is regarded as the starting point, a point in time when the temperature reaches the martensitic transformation start temperature (Ms)−80° C. is regarded as the ending point, the temperature history from the starting point to the ending point is divided by 10 with respect to the elapsed time, and calculation is carried out in individual time ranges.

The bainitic transformation start temperature (Bs) [° C.] and the martensitic transformation start temperature (Ms) [° C.] are obtained using the following expression.

[Math. 20]

$$Bs = 650 - 200[C] \cdot \left(\frac{Ac3 - Ac1}{T_H - Ac1}\right)^{\frac{2}{3}} - 27[Mn] - 14[Cr] - 12[Ni] + 18[Al]$$

[Math. 21]

$$Ms = 666 - 489\sqrt{[C]} \cdot \left(\frac{Ac3 - Ac1}{T_H - Ac1}\right)^{\frac{1}{3}} +$$

$$35[C] \cdot \left(\frac{Ac3 - Ac1}{T_H - Ac1}\right)^{\frac{2}{3}} - 36[Mn] - 5[Si] - 13[Cr] - 18[Ni] + 19[Al]$$

[Element signs] ([C], [Mn], [Si], [Cr], [Ni], and [Al]) represent the amounts [mass %] of the respective elements. Ac1 and Ac3 indicate the transformation start temperature [° C.] and the transformation completion temperature [° C.]

when each steel sheet is reheated to an austenite single phase, respectively. $T_H$ [° C.] indicates the highest heating temperature in the heat treatment of each steel sheet. In a case where $T_H$ exceeds Ac3, the term (Ac3–Ac1)/($T_H$–Ac1) is regarded as 1.00.

[Math. 22]

$$C_i = 1 - \exp\left(-A_{21} \cdot \frac{\{Bs - T_i\}^{0.5}}{1+[C]} \cdot \left\{1 - \exp\left(-\frac{1.1}{[Si]}\right)\right\}^2 \cdot \exp\left(-\frac{A_{22}}{T_i + 273}\right) \cdot t_i^{1.5} + \ln(1 - C_{i-1})\right)$$

[Math. 23]

$$D_i = (A_{23} \cdot T_i^{4.23} + A_{24} - [Si] - 0.7[Al] - 0.3[Mo] - 0.1[Cr]) \cdot |A_{23} \cdot T_i^{4.23} + A_{24} - [Si] - 0.7[Al] - 0.3[Mo] - 0.1[Cr]|$$

[Math. 24]

$$-2.00 \leq \sum_{i=1}^{10} C_i \cdot D_i \leq 2.00 \quad \text{Expression (6)}$$

Expression (6) is an expression that represents bainitic transformation and the formation behavior of fine cementite in association with the bainitic transformation.

$C_i$ is an index that represents the progress degree of bainitic transformation within an $i^{th}$ time range from the beginning of calculation. $A_{21}$ and $A_{22}$ are constant and are $3.95 \times 10^0$ and $7.15 \times 10^3$, respectively. Bs is the bainitic transformation start temperature [° C.]. $T_i$ is the average temperature [° C.] within the corresponding time range. [Element signs] ([C] and [Si]) represent the amounts [mass %] of the respective components. $t_i$ is the elapsed time [seconds] within each time range. In a case where $T_i$ is above Bs, the term (Bs–$T_i$) is regarded as zero. In addition, $C_0$ is regarded as zero.

$D_i$ is an index that represents the easiness of the generation of cementite in association with bainitic transformation within the $i^{th}$ time range from the beginning of calculation. $A_{23}$ and $A_{24}$ are constant and are $4.03 \times 10^{12}$ and $3.40 \times 10^{-1}$, respectively. $T_i$ is the average temperature [° C.] within the corresponding time range. [Element signs] ([Si], [Al], [Mo], and [Cr]) represent the amounts [mass %] of the respective components. $t_i$ is the elapsed time [seconds] within each time range.

The middle portion of Expression (6) is the sum of the products of $C_i$ and $D_i$, in a case where the value of the middle portion of Expression (6) is below –2.00, a carbon solid solution is excessively accumulated in untransformed austenite, transformation is not completed even when the steel sheet is cooled to room temperature, a structure containing a large amount of retained austenite is formed, and the impact resistance deteriorates. Meanwhile, when the value of the middle portion of Expression (6) exceeds 2.00, since cementite is excessively formed, and bainitic transformation from untransformed austenite excessively progresses, a sufficient amount of martensite cannot be obtained, and the strength decreases. From the above-described viewpoint, the temperature history within the above-described temperature range is made to satisfy Expression (6). The value of the middle portion of Expression (6) is preferably –1.30 or more and 1.30 or less and more preferably –0.80 or more and 0.80 or less.

In the cooling step from 550° C. to Ms–80° C., a hot-dip galvanizing treatment or a hot-dip zinc alloy plating treatment may be carried out from 550° C. to Ms–80° C. within a temperature history range in which Expression (6) is satisfied. At this time, the steel sheet may be reheated before being immersed in a plating bath. Furthermore, within the temperature history range in which Expression (6) is satisfied, the steel sheet after the plating treatment may be further heated, and an alloying treatment may be carried out on the plated layer.

The average cooling rate in the cooling step from 550° C. to Ms–80° C., particularly, in the section of Ms to (Ms–25)° C. is set to 10° C./second or faster. When the cooling rate from Ms to (Ms–25)° C. is not sufficient, cementite that is formed from martensite coarsens, the number of cementite grains becomes insufficient, and Expression (1) is not satisfied. When the average cooling rate within the temperature range of Ms to (Ms–25)° C. is 10° C./second or faster, the formation of fine cementite becomes easy. In order to sufficiently form fine cementite and cause the plastic deformation of martensite, the average cooling rate within the temperature range of Ms to (Ms–25)° C. is preferably 20° C./second or faster. On the other hand, when the cooling rate within the temperature range of Ms to (Ms–25)° C. is excessive, cementite is not formed, and it becomes difficult to appropriately cause the plastic deformation of martensite. From this viewpoint, the average cooling rate is preferably set to 150° C./second or slower, more preferably set to 75° C./second or slower, and still more preferably set to 50° C./second or slower.

Furthermore, the cooling is carried out such that the temperature history during the cooling from Ms° C. to 80° C. satisfies Expression (7).

[Math. 25]

$$0.00 \leq \sum_{i=1}^{10} \{1 - \exp(-E_6 - A_{25})\} \cdot \left\{1 - \exp\left(\frac{(A_{26} \cdot [Ms - T_{i,min}])}{(1 + 0.5[Mn] + 0.2[Cr] + 0.4[Ni])}\right)\right\} \cdot \left\{A_{27} \cdot \exp\left(-\frac{A_{28}}{T_i + 273}\right) - A_{29} \cdot \exp(A_{30} \cdot [T_i - A_{31} - A_{32} \cdot \ln([Si] + 0.3[Al])]) \cdot (1 - \exp[E_6 - A_{25}])^{0.5}\right\} \cdot dt^{0.5} \leq 3.00 \quad \text{Expression (7)}$$

Expression (7) is an expression that represents the generation degree of the transition carbides. The elapsed time while the temperature of the steel sheet reaches the martensitic transformation start temperature (Ms[° C.]) and then reaches 80° C. is divided by 10, and calculation is carried out in each time range, thereby obtaining the sum of the generation degrees of the transition carbides. $E_6$ is the value of the middle portion of Expression (6). In a case where the calculation result of $(1-\exp[-E_6-A_{25}])$ becomes negative, the value of the same parenthesis is regarded as zero in calculation. $A_{25}$, $A_{26}$, $A_{27}$, $A_{28}$, $A_{29}$, $A_{30}$, $A_{31}$, and $A_{32}$ are constant terms and are $2.31 \times 10^0$, $3.70 \times 10^{-2}$, $1.44 \times 10^2$, $3.23 \times 10^3$, $3.96 \times 10^3$, $2.10 \times 10^{-2}$, $9.63 \times 10^1$, and $1.32 \times 10^1$, respectively. Ms is the martensitic transformation start temperature that is obtained by the above-described method. $T_i$ is the average temperature within the $i^{th}$ time range. $T_{i,\,min}$ is the minimum value of $T_i$ up to $i^{th}$ temperature ranges after the temperature reaches Ms. [Element signs] ([Mn], [Cr], [Ni], [Si], and [Al]) represent the contents [mass %] of the respective elements. dt indicates the time [seconds] that is divided the elapsed time which is from the temperature reaches the martensitic transformation start temperature (Ms) to the temperature reaches 80° C., into ten equal parts.

When the value of the middle portion of Expression (7) is less than 0.00, since it is not possible to obtain a sufficient time for the generation of the transition carbides or the temperature condition prioritizes the formation of cementite, the generation of the transition carbides is excessively suppressed, and a sufficient amount of the transition carbides cannot be obtained. Therefore, the steel sheet is cooled such that the value of the middle portion of Expression (7) is 0.00 or more. The value is preferably 0.20 or more and more preferably 0.40 or more.

On the other hand, when the value of the middle portion of Expression (7) is more than 3.00, cementite is formed from a part of the transition carbides, the amount of the transition carbides decreases, and a sufficient amount of the transition carbides cannot be obtained. The value of the middle portion of Expression (7) is preferably 2.50 or less and more preferably 2.20 or less.

<Temper Rolling Process>

After the end of the cooling, temper rolling with a rolling reduction of 3.00% or less may be carried out. Temper rolling introduces moving dislocations into the inside of martensite and promotes the plastic deformation of martensite. When the rolling reduction of the temper rolling is more than 3.00%, the amount of plastic deformation becomes too large, and uniform elongation significantly deteriorates, which is not preferable.

An electro plating treatment may be carried out on the steel sheet after the heat treatment to make an electro-plated steel sheet having a zinc plated layer on either or both surfaces of the steel sheet. A deposition plating treatment may be carried out on the steel sheet after the heat treatment to make a zinc-plated steel sheet having a zinc plated layer on either or both surfaces of the steel sheet.

The surface of the steel sheet may be modified by controlling the atmosphere during the heat treatment. For example, a heating treatment is carried out in a decarburization atmosphere, whereby a steel sheet in which the surface layer portion of the steel sheet is appropriately decarburized and the bendability is excellent can be obtained.

EXAMPLES

Next, examples of the present invention will be described. Conditions in the examples are examples of the conditions adopted to confirm the feasibility and effect of the present invention. The present invention is not limited to these examples of the conditions. The present invention is capable of adopting a variety of conditions within the scope of the gist of the present invention as long as the object of the present invention is achieved.

Molten steels having a chemical composition shown in Table 1A and Table 1B are cast to produce cast pieces. Next, the cast pieces are cooled under conditions shown in Table 2A to Table 2D, and furthermore, hot rolling and cold rolling are carried out under conditions shown in Table 2A to Table 2D, thereby obtaining steel sheets. After that, heat treatments are carried out on the steel sheets under conditions shown in Table 3A to Table 3D.

The remainder in Table 1A and Table 1B is Fe and impurities.

In Table 2A to Table 2D, "cooling rate 1" indicates average cooling rates while the temperatures of the cast piece surfaces are 700° C. to 550° C. in a cooling step of the cast pieces. "Cooling rate 2" in a hot rolling process indicates average cooling rates from the completion of the hot rolling to 630° C.

In Table 3A to Table 3D, "heating rate 1" indicates average heating rates within the range from 400° C. to 550° C. "Heating rate 2" indicates average heating rates within the range from Ac1 to (Ac1+20)° C. "Cooling rate 3" indicates average cooling rates within the range from 720° C. to 550° C. "Cooling rates 4" indicates average cooling rates within the range from Ms to (Ms−25)° C.

Plating treatments are carried out on some of the steel sheets after the cooling step or during cooling. "Plating bath" in Table 3A to Table 3D represents plating types. In Table 3A to Table 3D, "EG" is an example in which zinc plating is imparted to the cooled steel sheet by an electro plating treatment. "Deposition" is an example in which zinc plating is imparted to the cooled steel sheet by a deposition plating treatment. "GA" is an example in which the steel sheet in the cooling step is immersed in a molten zinc bath having an effective Al amount [mass %] controlled to 0.150% or less and hot-dip galvanizing is imparted. "GI" is an example in which the steel sheet in the cooling step is immersed in a molten zinc bath having an effective Al amount controlled to more than 0.150% and hot-dip galvanizing is imparted. "Zn alloy" is an example in which the steel sheet in the cooling step is immersed in a molten Zn—Al—Mg bath and hot-dip zinc alloy plating is imparted. In a case where the steel sheet immersed in the molten zinc bath or molten Zn—Al—Mg bath is heated and an alloying treatment that alloys the interface between the plated layer and the base metal is carried out, the temperature to be achieved by reheating is expressed as "alloying temperature". The effective Al amount is defined as a value obtained by subtracting the total Fe amount from the total Al amount in the bath.

TABLE 1A

| Chemical composition | C mass % | Si mass % | Mn mass % | P mass % | S mass % | Al mass % | N mass % | O mass % | Ti mass % | Nb mass % | V mass % | Cr mass % | Ni mass % |
|---|---|---|---|---|---|---|---|---|---|---|---|---|---|
| A | 0.093 | 0.35 | 2.14 | 0.010 | 0.0045 | 0.065 | 0.0039 | 0.0010 | 0.024 | | | | |
| B | 0.175 | 0.71 | 1.42 | 0.007 | 0.0008 | 0.025 | 0.0026 | 0.0012 | 0.037 | | | | |
| C | 0.054 | 0.82 | 1.84 | 0.006 | 0.0034 | 0.006 | 0.0018 | 0.0017 | 0.012 | | | | |
| D | 0.109 | 1.14 | 2.03 | 0.012 | 0.0012 | 0.081 | 0.0062 | 0.0009 | 0.071 | | | | |
| E | 0.063 | 0.23 | 2.92 | 0.008 | 0.0013 | 0.129 | 0.0037 | 0.0010 | 0.018 | | | | |
| F | 0.149 | 0.45 | 2.31 | 0.023 | 0.0025 | 0.572 | 0.0049 | 0.0011 | 0.028 | | | | |
| G | 0.081 | 0.97 | 1.23 | 0.017 | 0.0052 | 0.051 | 0.0115 | 0.0016 | 0.114 | | | | |
| H | 0.112 | 0.07 | 2.49 | 0.013 | 0.0039 | 0.199 | 0.0048 | 0.0004 | 0.022 | 0.023 | | | |
| I | 0.093 | 0.46 | 2.74 | 0.021 | 0.0013 | 0.143 | 0.0048 | 0.0010 | 0.012 | | 0.309 | | |
| L | 0.126 | 0.64 | 1.65 | 0.019 | 0.0048 | 0.071 | 0.0065 | 0.0011 | 0.006 | 0.071 | 0.118 | | |
| M | 0.103 | 0.35 | 2.52 | 0.016 | 0.0016 | 0.160 | 0.0055 | 0.0007 | 0.018 | | | 0.30 | |
| N | 0.117 | 0.56 | 2.64 | 0.009 | 0.0028 | 0.076 | 0.0050 | 0.0015 | 0.017 | | | | 0.26 |

TABLE 1A-continued

| Chemical composition | C mass % | Si mass % | Mn mass % | P mass % | S mass % | Al mass % | N mass % | O mass % | Ti mass % | Nb mass % | V mass % | Cr mass % | Ni mass % |
|---|---|---|---|---|---|---|---|---|---|---|---|---|---|
| O | 0.115 | 0.19 | 2.37 | 0.013 | 0.0026 | 0.304 | 0.0046 | 0.0008 | 0.051 | | | | |
| P | 0.094 | 0.52 | 0.86 | 0.010 | 0.0021 | 0.031 | 0.0032 | 0.0004 | 0.016 | | | 1.17 | 0.38 |
| Q | 0.122 | 0.83 | 1.75 | 0.016 | 0.0074 | 0.075 | 0.0069 | 0.0012 | 0.087 | | | | |
| R | 0.122 | 0.63 | 2.46 | 0.014 | 0.0067 | 0.301 | 0.0063 | 0.0013 | 0.026 | | | | |
| S | 0.087 | 0.45 | 1.33 | 0.016 | 0.0015 | 0.014 | 0.0033 | 0.0014 | 0.019 | | | | |
| T | 0.147 | 0.44 | 1.32 | 0.021 | 0.0075 | 0.018 | 0.0046 | 0.0009 | 0.018 | | | | |
| U | 0.136 | 0.26 | 1.69 | 0.008 | 0.0020 | 0.023 | 0.0039 | 0.0006 | 0.033 | | | | |
| V | 0.100 | 0.97 | 2.45 | 0.011 | 0.0033 | 0.069 | 0.0003 | 0.0003 | 0.067 | | | | |
| W | 0.130 | 0.62 | 1.49 | 0.020 | 0.0055 | 0.057 | 0.0025 | 0.0003 | 0.016 | | | | |
| X | 0.120 | 0.36 | 1.34 | 0.016 | 0.0055 | 0.440 | 0.0027 | 0.0009 | 0.026 | | | | |
| Y | 0.134 | 0.31 | 1.00 | 0.009 | 0.0012 | 0.175 | 0.0042 | 0.0006 | 0.012 | | | | 1.21 |
| Z | 0.166 | 0.62 | 1.72 | 0.027 | 0.0010 | 0.012 | 0.0025 | 0.0005 | 0.026 | | | | |
| AA | 0.175 | 1.09 | 2.01 | 0.012 | 0.0017 | 0.055 | 0.0062 | 0.0010 | 0.070 | | | | |
| AB | 0.118 | 0.35 | 1.94 | 0.015 | 0.0037 | 0.052 | 0.0050 | 0.0006 | 0.034 | 0.005 | | | |
| AC | 0.116 | 0.27 | 2.16 | 0.009 | 0.0039 | 0.086 | 0.0069 | 0.0013 | 0.021 | 0.013 | | 0.09 | |
| AD | 0.098 | 0.89 | 1.13 | 0.004 | 0.0029 | 0.328 | 0.0041 | 0.0010 | 0.024 | 0.052 | | 0.65 | |
| AE | 0.081 | 0.42 | 2.04 | 0.003 | 0.0023 | 0.010 | 0.0034 | 0.0011 | 0.011 | 0.035 | | | |
| AF | 0.146 | 0.61 | 1.26 | 0.008 | 0.0046 | 0.249 | 0.0050 | 0.0003 | 0.046 | | | | |
| AG | 0.118 | 0.70 | 2.70 | 0.012 | 0.0025 | 0.012 | 0.0081 | 0.0008 | 0.061 | | | | |
| AH | 0.065 | 0.66 | 2.49 | 0.010 | 0.0028 | 0.083 | 0.0060 | 0.0008 | 0.019 | | | | |
| AI | 0.106 | 0.42 | 1.88 | 0.010 | 0.0038 | 0.073 | 0.0025 | 0.0014 | 0.015 | | | | 0.54 |
| AJ | 0.120 | 0.80 | 2.52 | 0.012 | 0.0057 | 0.273 | 0.0057 | 0.0005 | 0.027 | | | | |
| AK | 0.106 | 0.36 | 2.67 | 0.015 | 0.0051 | 0.059 | 0.0058 | 0.0014 | 0.018 | 0.004 | | | |
| AL | 0.080 | 0.43 | 2.87 | 0.013 | 0.0059 | 0.341 | 0.0052 | 0.0010 | 0.013 | 0.029 | | | 0.09 |
| AM | 0.089 | 0.55 | 2.14 | 0.010 | 0.0023 | 0.487 | 0.0037 | 0.0014 | 0.018 | | | | |
| AN | 0.087 | 0.15 | 1.40 | 0.006 | 0.0049 | 0.430 | 0.0035 | 0.0014 | 0.023 | | | 0.43 | |
| AO | 0.098 | 0.73 | 2.16 | 0.011 | 0.0037 | 0.011 | 0.0070 | 0.0011 | 0.009 | | | | |
| BA | <u>0.041</u> | 0.38 | 1.91 | 0.007 | 0.0031 | 0.036 | 0.0059 | 0.0009 | 0.021 | | | | |
| BB | <u>0.233</u> | 0.73 | 1.93 | 0.008 | 0.0024 | 0.084 | 0.0027 | 0.0015 | 0.067 | | | | |
| BC | <u>0.155</u> | <u>1.54</u> | 1.03 | 0.012 | 0.0034 | 0.058 | 0.0026 | 0.0006 | 0.041 | | | | |
| BD | 0.100 | <u>0.25</u> | <u>0.49</u> | 0.014 | 0.0045 | 0.091 | 0.0065 | 0.0012 | 0.066 | | | | |
| BE | 0.084 | 0.56 | <u>3.10</u> | 0.008 | 0.0019 | 0.138 | 0.0039 | 0.0012 | 0.057 | | | | |
| BF | 0.098 | 0.51 | 1.89 | 0.016 | 0.0040 | <u>1.042</u> | 0.0057 | 0.0016 | 0.030 | | | | |
| BG | 0.093 | 0.73 | 1.65 | 0.005 | 0.0038 | <u>0.124</u> | 0.0017 | 0.0007 | <u>0.003</u> | | | | |
| BH | 0.114 | 0.66 | 2.08 | 0.017 | 0.0019 | 0.046 | 0.0019 | 0.0015 | <u>0.151</u> | | | | |

TABLE 1B

| Chemical composition | Cu mass % | Mo mass % | W mass % | B mass % | Sn mass % | Sb mass % | Ca mass % | Ce mass % | Mg mass % | Zr mass % | La mass % | REM mass % | |
|---|---|---|---|---|---|---|---|---|---|---|---|---|---|
| A | | | | | | | | | | | | | Example |
| B | | | | | | | | | | | | | Example |
| C | | | | | | | | | | | | | Example |
| D | | | | | | | | | | | | | Example |
| E | | | | | | | | | | | | | Example |
| F | | | | | | | | | | | | | Example |
| G | | | | | | | | | | | | | Example |
| H | | | | | | | | | | | | | Example |
| I | | | | | | | | | | | | | Example |
| L | | | | | | | | | | | | | Example |
| M | | | | | | | | | | | | | Example |
| N | | | | | | | | | | | | | Example |
| O | 0.33 | | | | | | | | | | | | Example |
| P | 0.28 | | | | | | | | | | | | Example |
| Q | | 0.33 | | | | | | | | | | | Example |
| R | | | 0.254 | | | | | | | | | | Example |
| S | | | | 0.0048 | | | | | | | | | Example |
| T | | | | | 0.235 | | | | | | | | Example |
| U | | | | | | 0.081 | | | | | | | Example |
| V | | | | | | | 0.0023 | | | | | | Example |
| W | | | | | | | | 0.0032 | | | | | Example |
| X | | | | | | | | | 0.0048 | | | | Example |
| U | 0.54 | | | | | | | | | 0.0035 | | | Example |
| Z | | | | 0.0022 | | | | | | | 0.0034 | | Example |
| AA | | | | | 0.123 | | 0.0008 | | | | 0.0014 | 0.0015 | Example |
| AB | | 0.16 | | 0.0015 | | | | | | | | | Example |
| AC | | | | 0.0009 | | | | | | | | | Example |
| AD | | 0.07 | | | | | | | | | | | Example |
| AE | | | | 0.0036 | | | | | | | | | Example |
| AF | | 0.37 | | | | | | | | | | | Example |
| AG | | | | 0.0003 | | | | | | | | | Example |
| AH | | | | | | 0.108 | | | | | | | Example |
| AI | 0.16 | | | 0.0024 | | | | | | | | | Example |

TABLE 1B-continued

| Chemical composition | Cu mass % | Mo mass % | W mass % | B mass % | Sn mass % | Sb mass % | Ca mass % | Ce mass % | Mg mass % | Zr mass % | La mass % | REM mass % | |
|---|---|---|---|---|---|---|---|---|---|---|---|---|---|
| AJ |  | 0.10 |  |  |  |  |  |  |  |  |  |  | Example |
| AK |  |  |  | 0.0051 | 0.023 |  |  |  |  |  |  |  | Example |
| AL |  |  |  |  |  |  |  |  |  |  |  |  | Example |
| AM |  | 0.05 |  |  |  |  |  |  |  |  |  |  | Example |
| AN |  | 0.23 |  |  |  |  |  |  |  |  |  |  | Example |
| AO |  |  |  | 0.0008 |  | 0.033 |  |  |  |  |  |  | Example |
| BA |  |  |  |  |  |  |  |  |  |  |  |  | Comparative Example |
| BB |  |  |  |  |  |  |  |  |  |  |  |  | Comparative Example |
| BC |  |  |  |  |  |  |  |  |  |  |  |  | Comparative Example |
| BD |  |  |  |  |  |  |  |  |  |  |  |  | Comparative Example |
| BE |  |  |  |  |  |  |  |  |  |  |  |  | Comparative Example |
| BF |  |  |  |  |  |  |  |  |  |  |  |  | Comparative Example |
| BG |  |  |  |  |  |  |  |  |  |  |  |  | Comparative Example |
| BH |  |  |  |  |  |  |  |  |  |  |  |  | Comparative Example |

TABLE 2A

| | | Casting process | | Hot rolling process | | | | | | Cold rolling process | | | |
|---|---|---|---|---|---|---|---|---|---|---|---|---|---|
| Experiment Example | Chemical composition | Cast piece thickness mm | Cooling rate 1 °C./hour | Heating temperature °C. | Total rolling reduction at 1050° C. or higher % | Left side of Expression (2) | Left side of Expression (3) | Cooling rate 2 °C./hour | $P_{13}$ in Expression (4) $(\times 10^{-8})$ | Sheet thickness mm | Total rolling reduction % | Completion temperature °C. | Sheet thickness mm | |
| 1 | A | 250 | 19 | 1230 | 80 | 2.7 | 3.04 | 40 | 5.0 | 2.7 | 48 | 124 | 1.4 | Example |
| 2 | A | 120 | 26 | 1280 | 80 | 2.9 | 3.40 | 53 | 4.4 | 1.9 | 58 | 98 | 0.8 | Example |
| 3 | A | 250 | 15 | 1265 | 84 | 1.8 | 7.69 | 37 | 3.0 | 3.8 | 79 | 230 | 0.8 | Example |
| 4 | B | 310 | 21 | 1285 | 82 | 1.7 | 3.60 | 53 | 2.8 | 4.3 | 67 | 204 | 1.4 | Example |
| 5 | B | 360 | 11 | 1325 | 75 | 1.4 | 4.06 | 47 | 3.6 | 2.0 | 50 | 117 | 1.0 | Example |
| 6 | B | 240 | 15 | 1285 | 85 | 3.7 | 6.91 | 62 | 1.6 | 4.0 | 78 | <u>287</u> | 0.9 | Comparative Example |
| 7 | B | 240 | 16 | 1285 | 85 | 2.5 | 3.78 | 31 | 2.0 | 4.0 | 78 | 171 | 0.9 | Comparative Example |
| 8 | C | 310 | 14 | 1260 | 82 | 2.0 | 4.13 | 27 | 1.7 | 4.5 | 64 | 121 | 1.6 | Example |
| 9 | C | 240 | 13 | 1285 | 86 | 1.8 | 1.98 | 60 | 3.6 | 4.3 | 81 | 167 | 0.8 | Example |
| 10 | C | 240 | 16 | 1270 | 85 | 5.0 | 5.90 | <u>12</u> | 3.2 | 3.6 | 50 | 109 | 1.8 | Comparative Example |
| 11 | D | 280 | 14 | 1255 | 85 | 3.3 | 2.76 | 33 | 2.4 | 2.8 | 57 | 125 | 1.2 | Example |
| 12 | D | 260 | 14 | 1285 | 85 | 1.9 | 1.34 | 53 | 4.0 | 4.0 | 53 | 91 | 1.9 | Example |
| 13 | D | 260 | 15 | 1295 | 85 | 2.2 | 3.81 | 42 | 2.4 | 3.2 | 56 | 117 | 1.4 | Comparative Example |
| 14 | E | 220 | 14 | 1235 | 80 | 1.4 | 2.92 | 55 | 3.7 | 3.7 | 68 | 154 | 1.2 | Example |
| 15 | E | 180 | 14 | 1225 | 63 | 2.6 | 3.83 | 43 | 3.5 | 3.6 | 42 | 83 | 2.1 | Example |
| 16 | E | 220 | 15 | 1255 | 80 | 1.2 | 3.24 | 47 | 5.4 | 3.2 | 63 | 121 | 1.2 | Comparative Example |
| 17 | F | 190 | 19 | 1315 | 85 | 1.3 | 3.14 | 46 | 3.9 | 2.7 | 56 | 145 | 1.2 | Example |
| 18 | F | 270 | 12 | 1210 | 87 | 2.3 | 3.65 | 33 | 2.7 | 3.6 | 50 | 104 | 1.8 | Example |
| 19 | F | 240 | 16 | 1270 | 85 | 2.5 | 2.98 | 39 | <u>11.1</u> | 3.6 | 67 | 158 | 1.2 | Comparative Example |
| 20 | G | 220 | 16 | 1255 | 84 | 1.1 | 3.55 | 39 | 3.0 | 2.6 | 38 | 66 | 1.6 | Example |
| 21 | G | 320 | 14 | 1265 | 80 | 1.7 | 6.59 | 31 | 1.9 | 5.1 | 84 | 192 | 0.8 | Example |
| 22 | G | 240 | 15 | 1295 | 85 | 2.4 | 6.58 | 41 | 2.0 | 3.2 | 44 | 111 | 1.8 | Example |
| 23 | H | 190 | 21 | 1240 | 83 | 2.1 | 2.87 | 31 | 2.2 | 3.1 | 74 | 181 | 0.8 | Example |
| 24 | H | 240 | 15 | 1270 | 75 | 1.1 | 1.54 | 32 | 2.4 | 4.0 | 75 | 199 | 1.0 | Example |
| 25 | H | 240 | 17 | 1280 | 80 | 1.4 | 5.57 | 47 | 2.3 | 3.0 | 67 | 118 | 1.0 | Comparative Example |

TABLE 2B

| Experiment Example | Chemical composition | Casting process Cast piece thickness mm | Cooling rate 1° C./hour | Hot rolling process Heating temperature ° C. | Total rolling reduction at 1050° C. or higher % | Left side of Expression (2) | Left side of Expression (3) | Cooling rate 2° C./hour | $P_{13}$ in Expression (4) (×10⁻⁸) | Sheet thickness mm | Cold rolling process Total rolling reduction % | Completion temperature ° C. | Sheet thickness mm | |
|---|---|---|---|---|---|---|---|---|---|---|---|---|---|---|
| 26 | I | 220 | 14 | 1235 | 80 | 1.3 | 3.83 | 54 | 3.2 | 4.5 | 78 | 162 | 1.0 | Example |
| 27 | I | 380 | 13 | 1315 | 90 | 1.4 | 3.58 | 26 | 8.3 | 1.9 | 53 | 119 | 0.9 | Example |
| 28 | I | 250 | 7 | 1305 | 88 | 1.9 | 6.07 | 36 | 5.1 | 2.6 | 50 | 105 | 1.3 | Comparative Example |
| 29 | L | 240 | 16 | 1305 | 80 | 3.4 | 4.34 | 50 | 1.2 | 2.5 | 60 | 150 | 1.0 | Example |
| 30 | L | 240 | 17 | 1345 | 85 | 2.8 | 4.02 | 53 | 1.1 | 3.0 | 67 | 154 | 1.0 | Example |
| 31 | L | 240 | 17 | 1285 | 80 | 1.7 | 3.72 | 45 | 1.1 | 3.0 | 67 | 138 | 1.0 | Comparative Example |
| 32 | M | 240 | 19 | 1285 | 79 | 1.4 | 3.10 | 43 | 4.1 | 3.1 | 55 | 127 | 1.4 | Example |
| 33 | M | 300 | 14 | 1300 | 85 | 1.7 | 1.68 | 23 | 6.2 | 3.0 | 67 | 163 | 1.0 | Example |
| 34 | N | 250 | 16 | 1310 | 86 | 3.8 | 3.11 | 50 | 4.5 | 2.3 | 39 | 93 | 1.4 | Example |
| 35 | N | 260 | 12 | 1320 | 95 | 2.0 | 2.60 | 38 | 3.9 | 2.0 | 50 | 104 | 1.0 | Example |
| 36 | N | 250 | 15 | 1300 | 80 | 3.1 | 5.97 | 32 | 2.1 | 3.0 | 60 | 119 | 1.2 | Comparative Example |
| 37 | O | 340 | 16 | 1270 | 89 | 1.4 | 2.74 | 48 | 1.6 | 2.7 | 41 | 117 | 1.6 | Example |
| 38 | O | 250 | 15 | 1290 | 80 | 1.3 | 4.81 | 33 | 2.7 | 3.0 | 67 | 182 | 1.0 | Example |
| 39 | O | 240 | 17 | 1280 | 85 | 1.8 | 3.08 | 47 | 0.7 | 3.2 | 63 | 120 | 1.2 | Comparative Example |
| 40 | P | 190 | 13 | 1285 | 72 | 1.9 | 3.18 | 32 | 1.6 | 3.8 | 63 | 170 | 1.4 | Example |
| 41 | P | 220 | 15 | 1335 | 80 | 1.6 | 3.12 | 50 | 7.5 | 2.5 | 60 | 117 | 1.0 | Example |
| 42 | Q | 280 | 22 | 1275 | 83 | 1.1 | 3.05 | 34 | 2.4 | 4.3 | 67 | 181 | 1.4 | Example |
| 43 | Q | 240 | 14 | 1280 | 74 | 1.7 | 2.38 | 55 | 1.1 | 3.5 | 74 | 213 | 0.9 | Example |
| 44 | Q | 240 | 14 | 1280 | 74 | 2.0 | 7.21 | 45 | 1.6 | 3.5 | 74 | 207 | 0.9 | Example |
| 45 | Q | 240 | 17 | 1250 | 86 | 1.6 | 2.85 | 31 | 2.8 | 4.0 | 63 | 120 | 1.5 | Comparative Example |
| 46 | R | 280 | 21 | 1275 | 79 | 1.5 | 2.30 | 48 | 4.6 | 2.7 | 56 | 127 | 1.2 | Example |
| 47 | S | 280 | 21 | 1235 | 80 | 1.8 | 3.48 | 39 | 4.8 | 2.6 | 38 | 83 | 1.6 | Example |
| 48 | T | 310 | 19 | 1300 | 83 | 1.3 | 3.86 | 32 | 4.5 | 3.2 | 50 | 160 | 1.6 | Example |
| 49 | T | 220 | 14 | 1305 | 85 | 2.4 | 6.83 | 42 | 4.4 | 3.3 | 64 | 143 | 1.2 | Example |
| 50 | T | 250 | 16 | 1290 | 83 | 1.5 | 6.85 | 48 | 7.7 | 3.0 | 67 | 169 | 1.0 | Comparative Example |

TABLE 2C

| Experiment Example | Chemical composition | Casting process Cast piece thickness mm | Cooling rate 1° C./hour | Hot rolling process Hearing temperature ° C. | Total rolling reduction at 1050° C. or higher % | Left side of Expression (2) | Left side of Expression (3) | Cooling rate 2° C./hour | $P_{13}$ in Expression (4) (×10⁻⁸) | Sheet thickness mm | Cold rolling process Total rolling reduction % | Completion temperature ° C. | Sheet thickness mm | |
|---|---|---|---|---|---|---|---|---|---|---|---|---|---|---|
| 51 | U | 220 | 18 | 1275 | 87 | 1.5 | 3.29 | 33 | 3.8 | 3.0 | 47 | 101 | 1.6 | Example |
| 52 | V | 190 | 20 | 1280 | 84 | 3.3 | 2.71 | 31 | 4.4 | 2.8 | 57 | 113 | 1.2 | Example |
| 53 | V | 420 | 14 | 1290 | 80 | 1.4 | 3.66 | 36 | 6.4 | 1.8 | 44 | 85 | 1.0 | Example |
| 54 | V | 240 | 18 | 1275 | 80 | 1.4 | 1.37 | 47 | 4.1 | 3.0 | 50 | 105 | 1.5 | Comparative Example |
| 55 | W | 340 | 22 | 1265 | 85 | 1.2 | 2.69 | 42 | 3.1 | 2.4 | 33 | 67 | 1.6 | Example |
| 56 | W | 140 | 31 | 1325 | 68 | 1.2 | 5.51 | 44 | 3.2 | 1.4 | 43 | 120 | 0.8 | Example |
| 57 | W | 250 | 87 | 1280 | 82 | 2.0 | 3.72 | 32 | 5.6 | 2.3 | 57 | 125 | 1.0 | Comparative Example |
| 58 | X | 340 | 15 | 1235 | 89 | 1.2 | 2.98 | 35 | 2.1 | 3.1 | 48 | 96 | 1.6 | Example |
| 59 | X | 180 | 37 | 1325 | 80 | 1.4 | 3.54 | 45 | 5.4 | 2.0 | 55 | 125 | 0.9 | Example |
| 60 | X | 250 | 15 | 1240 | 45 | 1.4 | 3.58 | 36 | 3.7 | 3.0 | 60 | 144 | 1.2 | Comparative Example |
| 61 | Y | 170 | 27 | 1260 | 69 | 2.0 | 3.90 | 36 | 4.1 | 4.1 | 80 | 148 | 0.8 | Example |
| 62 | Z | 280 | 13 | 1300 | 83 | 2.0 | 2.58 | 59 | 3.6 | 4.5 | 69 | 228 | 1.4 | Example |
| 63 | AA | 310 | 19 | 1285 | 85 | 2.4 | 3.49 | 31 | 3.0 | 4.4 | 73 | 186 | 1.2 | Example |
| 64 | AA | 340 | 14 | 1305 | 93 | 2.2 | 4.02 | 27 | 2.5 | 4.2 | 52 | 146 | 2.0 | Example |
| 65 | AA | 260 | 13 | 1295 | 85 | 2.1 | 1.21 | 47 | 2.5 | 1.9 | 37 | 88 | 1.2 | Example |
| 66 | AB | 250 | 13 | 1310 | 83 | 2.1 | 4.76 | 42 | 2.5 | 3.8 | 74 | 197 | 1.0 | Example |
| 67 | AB | 480 | 14 | 1280 | 90 | 1.3 | 2.98 | 58 | 2.8 | 2.4 | 50 | 146 | 1.2 | Example |
| 68 | AB | 200 | 15 | 1260 | 80 | 1.9 | 2.68 | 60 | 3.2 | 2.0 | 25 | 51 | 1.5 | Comparative Example |

TABLE 2C-continued

| Experiment Example | Chemical composition | Casting process | | Hot rolling process | | | | | | Cold rolling process | | | |
|---|---|---|---|---|---|---|---|---|---|---|---|---|---|
| | | Cast piece thickness mm | Cooling rate 1° C./hour | Heating temperature ° C. | Total rolling reduction at 1050° C. or higher % | Left side of Expression (2) | Left side of Expression (3) | Cooling rate 2° C./hour | $P_{13}$ in Expression (4) ($\times 10^{-8}$) | Sheet thickness mm | Total rolling reduction % | Completion temperature ° C. | Sheet thickness mm | |
| 69 | AC | 280 | 19 | 1235 | 80 | 1.8 | 2.76 | 39 | 2.6 | 3.8 | 63 | 141 | 1.4 | Example |
| 70 | AC | 200 | 32 | 1290 | 85 | 2.3 | 3.63 | 47 | 4.2 | 3.0 | 67 | 148 | 1.0 | Example |
| 71 | AC | 240 | 15 | 1285 | 80 | 2.9 | 5.73 | 39 | 2.5 | 3.2 | 63 | 179 | 1.2 | Comparative Example |
| 72 | AD | 310 | 21 | 1240 | 89 | 2.9 | 3.86 | 46 | 1.7 | 2.8 | 64 | 151 | 1.0 | Example |
| 73 | AE | 280 | 14 | 1305 | 84 | 2.1 | 3.81 | 31 | 1.1 | 3.8 | 68 | 188 | 1.2 | Example |
| 74 | AF | 190 | 29 | 1230 | 82 | 4.1 | 3.99 | 40 | 4.1 | 2.8 | 50 | 141 | 1.4 | Example |
| 75 | AF | 240 | 15 | 1290 | 85 | 2.3 | 5.09 | 43 | 3.2 | 4.5 | 51 | 152 | 2.2 | Example |

TABLE 2D

| Experiment Example | Chemical composition | Casting process | | Hot rolling process | | | | | | Cold rolling process | | | |
|---|---|---|---|---|---|---|---|---|---|---|---|---|---|
| | | Cast piece thickness mm | Cooling rate 1° C./hour | Heating temperature ° C. | Total rolling reduction at 1050° C. or higher % | Left side of Expression (2) | Left side of Expression (3) | Cooling rate 2° C./hour | $P_{13}$ in Expression (4) ($\times 10^{-8}$) | Sheet thickness mm | Total rolling reduction % | Completion temperature ° C. | Sheet thickness mm | |
| 76 | AF | 270 | 18 | 1280 | 93 | 2.2 | 1.95 | 47 | 4.1 | 4.5 | 63 | 177 | 1.0 | Comparative Example |
| 77 | AG | 250 | 15 | 1225 | 87 | 2.6 | 3.66 | 44 | 3.6 | 3.0 | 60 | 121 | 1.2 | Example |
| 78 | AH | 260 | 16 | 1315 | 80 | 2.0 | 3.70 | 38 | 1.6 | 2.4 | 67 | 148 | 0.8 | Example |
| 79 | AI | 240 | 18 | 1235 | 85 | 2.1 | 3.45 | 48 | 3.3 | 3.5 | 77 | 212 | 0.8 | Example |
| 80 | AJ | 280 | 13 | 1260 | 90 | 2.6 | 3.69 | 39 | 4.1 | 2.8 | 43 | 86 | 1.6 | Example |
| 81 | AK | 280 | 18 | 1300 | 86 | 4.0 | 2.79 | 40 | 3.9 | 3.1 | 55 | 113 | 1.4 | Example |
| 82 | AL | 280 | 20 | 1240 | 88 | 2.0 | 3.05 | 37 | 1.4 | 4.5 | 64 | 144 | 1.6 | Example |
| 83 | AL | 250 | 15 | <u>1155</u> | 73 | 1.3 | 2.41 | 51 | 1.8 | 3.6 | 56 | 128 | 1.6 | Comparative Example |
| 84 | AM | 190 | 13 | 1250 | 85 | 2.0 | 2.54 | 40 | 3.2 | 3.6 | 61 | 116 | 1.4 | Example |
| 85 | AM | 240 | 15 | 1235 | 85 | 1.8 | 5.17 | 35 | 3.6 | 4.0 | 75 | 175 | 1.0 | Example |
| 86 | AM | 250 | 17 | 1295 | 88 | 2.2 | 5.54 | 38 | 3.6 | 3.0 | 60 | 143 | 1.2 | Comparative Example |
| 87 | AN | 160 | 19 | 1310 | 81 | 4.1 | 3.63 | 31 | 3.4 | 2.6 | 54 | 101 | 1.2 | Example |
| 88 | AN | 160 | 65 | 1300 | 80 | 2.3 | 3.55 | 47 | 2.4 | 2.5 | 48 | 125 | 1.3 | Example |
| 89 | AN | 220 | 15 | 1250 | 70 | <u>0.8</u> | 5.79 | 58 | 3.9 | 3.0 | 50 | 129 | 1.5 | Comparative Example |
| 90 | AO | 240 | 15 | 1290 | 80 | 2.3 | 3.22 | 56 | 3.2 | 3.5 | 60 | 119 | 1.4 | Example |
| 91 | AO | 300 | 18 | 1275 | 87 | 3.4 | 7.47 | 31 | 2.8 | 3.8 | 42 | 77 | 2.2 | Example |
| 92 | AO | 300 | 15 | 1250 | 84 | 3.3 | <u>12.73</u> | 58 | 1.1 | 4.5 | 56 | 113 | 2.0 | Comparative Example |
| 93 | BA | 260 | 16 | 1300 | 83 | 1.8 | 3.22 | 46 | 2.4 | 3.0 | 67 | 112 | 1.0 | Comparative Example |
| 94 | BB | 260 | 16 | 1230 | 88 | 3.2 | 2.49 | 55 | 4.0 | 3.0 | 67 | 230 | 1.0 | Comparative Example |
| 95 | BC | 260 | 21 | 1300 | 84 | 1.1 | 1.21 | 45 | 1.9 | 3.0 | 67 | 112 | 1.0 | Comparative Example |
| 96 | BD | 260 | 17 | 1310 | 83 | 1.2 | 3.28 | 37 | 3.3 | 3.0 | 67 | 141 | 1.0 | Comparative Example |
| 97 | BE | 260 | 14 | 1290 | 85 | 1.8 | 2.55 | 48 | 6.0 | 3.0 | 67 | 172 | 1.0 | Comparative Example |
| 98 | BF | 260 | 14 | 1290 | 89 | 1.8 | 3.28 | 36 | 7.8 | 3.0 | 67 | 172 | 1.0 | Comparative Example |
| 99 | BG | 260 | 20 | 1310 | 88 | 4.7 | 3.90 | 37 | <u>11.1</u> | 3.0 | 67 | 98 | 1.0 | Comparative Example |
| 100 | BH | 260 | 14 | 1255 | 79 | 1.6 | 2.70 | 47 | 4.1 | 3.0 | 67 | 188 | 1.0 | Comparative Example |

TABLE 3A

| Experiment Example | Chemical composition | Ac1 °C. | Ac3 °C. | Bs °C. | Ms °C. | Heating step Heating rate 1° C./second | Heating step Value of Expression (5) | Heating step Heating rate 2° C./second | Heating step Heating temperature °C. | Heating step Retention time seconds |
|---|---|---|---|---|---|---|---|---|---|---|
| 1 | A | 704 | 824 | 566 | 412 | 17 | 1.7 | 3.9 | 776 | 82 |
| 2 | A | 696 | 826 | 566 | 413 | 6 | 1.2 | 2.0 | 777 | 49 |
| 3 | A | 690 | 813 | 571 | 430 | 4 | 5.6 | 1.6 | 786 | 51 |
| 4 | B | 719 | 822 | 570 | 394 | 47 | 1.6 | 3.2 | 809 | 58 |
| 5 | B | 714 | 829 | 573 | 403 | 5 | 1.9 | 2.0 | 812 | 27 |
| 6 | B | 725 | 833 | 564 | 380 | 8 | 2.9 | 2.2 | 792 | 49 |
| 7 | B | 719 | 819 | 570 | 396 | 4 | 3.4 | 3.5 | 796 | 99 |
| 8 | C | 713 | 842 | 582 | 449 | 57 | 1.2 | 3.8 | 780 | 58 |
| 9 | C | 707 | 839 | 585 | 462 | 92 | 6.0 | 2.7 | 783 | 42 |
| 10 | C | 717 | 856 | 582 | 450 | 4 | 2.3 | 2.4 | 779 | 42 |
| 11 | D | 715 | 843 | 571 | 417 | 6 | 1.1 | 2.5 | 824 | 49 |
| 12 | D | 713 | 838 | 573 | 424 | 6 | 2.0 | 1.8 | 822 | 138 |
| 13 | D | 710 | 848 | 562 | 393 | 27 | 1.2 | 1.6 | 780 | 40 |
| 14 | E | 686 | 816 | 556 | 422 | 5 | 1.9 | 1.5 | 772 | 51 |
| 15 | E | 679 | 814 | 559 | 433 | 7 | 1.5 | 2.2 | 789 | 34 |
| 16 | E | 681 | 813 | 560 | 437 | 16 | 1.1 | 1.9 | 799 | 88 |
| 17 | F | 723 | 854 | 556 | 375 | 21 | 5.4 | 3.1 | 808 | 49 |
| 18 | F | 711 | 856 | 567 | 405 | 28 | 3.6 | 3.4 | 850 | 48 |
| 19 | F | 711 | 848 | 559 | 382 | 8 | 7.3 | 1.5 | 802 | 51 |
| 20 | G | 729 | 867 | 584 | 422 | 8 | 1.1 | 1.6 | 783 | 41 |
| 21 | G | 721 | 872 | 596 | 461 | 6 | 1.5 | 2.1 | 819 | 58 |
| 22 | G | 721 | 872 | 591 | 443 | 8 | 3.2 | 2.9 | 791 | 45 |
| 23 | H | 687 | 819 | 555 | 393 | 4 | 1.2 | 2.5 | 775 | 103 |
| 24 | H | 684 | 810 | 561 | 410 | 8 | 1.5 | 1.8 | 789 | 15 |
| 25 | H | 682 | 811 | 559 | 404 | 6 | 0.3 | 2.3 | 778 | 50 |

| Experiment Example | Cooling step Cooling rate 3° C./second | Cooling step Value of Expression (6) | Cooling step Cooling rate 4° C./second | Cooling step Value of Expression (7) | Plating treatment Plating bath | Plating treatment Alloying temperature °C. | Temper rolling Elongation ratio | Note |
|---|---|---|---|---|---|---|---|---|
| 1 | 21 | 0.3 | 75 | 1.3 | GI | — | 0.15 | Example |
| 2 | 52 | 0.1 | 15 | 1.2 | — | — | — | Example |
| 3 | 15 | 0.1 | 23 | 0.4 | Deposition | — | 0.21 | Example |
| 4 | 57 | 0.8 | 98 | 2.5 | GA | 540 | 0.22 | Example |
| 5 | 22 | 0.1 | 12 | 1.4 | — | — | 0.13 | Example |
| 6 | 20 | 0.1 | 83 | 1.6 | GA | 539 | 0.16 | Comparative Example |
| 7 | 17 | 0.1 | 20 | 3.5 | GA | 536 | 0.25 | Comparative Example |
| 8 | 40 | 0.1 | 50 | 0.8 | GA | 534 | 0.21 | Example |
| 9 | 14 | 0.3 | 46 | 0.2 | GA | 511 | 0.57 | Example |
| 10 | 14 | 0.4 | 77 | 0.6 | GA | 542 | 0.30 | Comparative Example |
| 11 | 16 | −0.2 | 50 | 1.7 | GA | 539 | 0.28 | Example |
| 12 | 43 | −0.4 | 44 | 1.6 | GA | 521 | 0.62 | Example |
| 13 | 14 | −0.3 | 3 | 1.3 | GA | 535 | 0.20 | Comparative Example |
| 14 | 64 | 0.0 | 19 | 0.2 | — | — | 0.58 | Example |
| 15 | 21 | 0.1 | 45 | 0.1 | EG | — | 0.10 | Example |
| 16 | 44 | 0.1 | 21 | −0.5 | — | — | 0.12 | Comparative Example |
| 17 | 40 | 0.1 | 40 | 2.0 | Zinc alloy | — | 0.18 | Example |
| 18 | 20 | 0.0 | 22 | 1.6 | GI | — | 0.56 | Example |
| 19 | 44 | 0.1 | 81 | 0.8 | GA | 528 | 0.20 | Comparative Example |
| 20 | 50 | 0.1 | 95 | 1.4 | Zinc alloy | — | 0.06 | Example |
| 21 | 52 | 0.0 | 91 | 0.1 | GA | — | 0.20 | Example |
| 22 | 14 | −0.9 | 21 | 0.9 | GA | 541 | 1.10 | Example |
| 23 | 19 | 0.6 | 13 | 0.4 | — | — | 0.54 | Example |
| 24 | 13 | 0.8 | 19 | 0.2 | GA | 520 | 0.14 | Example |
| 25 | 65 | 0.7 | 50 | 0.1 | GI | — | 0.30 | Comparative Example |

TABLE 3B

| | | | | | | Heating step | | | | |
|---|---|---|---|---|---|---|---|---|---|---|
| Experiment Example | Chemical composition | Ac1 C.° | Ac3 C.° | Bs C.° | Ms C.° | Heating rate 1° C./second | Value of Expression (5) | Heating rate 2° C./second | Heating temperature ° C. | Retention time seconds |
| 26 | I | 687 | 818 | 553 | 396 | 6 | 1.6 | 2.9 | 776 | 97 |
| 27 | I | 694 | 813 | 558 | 413 | 27 | 3.7 | 2.5 | 805 | 60 |
| 28 | I | 699 | 809 | 558 | 414 | 5 | 5.0 | 1.9 | 792 | 96 |
| 29 | L | 710 | 838 | 572 | 407 | 6 | 1.8 | 1.9 | 796 | 41 |
| 30 | L | 717 | 836 | 572 | 406 | 28 | 1.3 | 2.0 | 789 | 100 |
| 31 | L | 717 | 829 | 571 | 404 | <u>1.5</u> | 1.2 | 1.6 | 783 | 85 |
| 32 | M | 706 | 808 | 554 | 399 | 8 | 9.0 | 1.9 | 786 | 56 |
| 33 | M | 696 | 808 | 561 | 423 | 5 | 7.5 | 2.0 | 816 | 60 |
| 34 | N | 684 | 807 | 551 | 393 | 8 | 3.4 | 1.6 | 796 | 40 |
| 35 | N | 687 | 809 | 552 | 396 | 4 | 1.2 | 2.4 | 801 | 58 |
| 36 | N | 693 | 814 | 547 | 381 | 92 | 1.1 | 1.6 | 776 | 79 |
| 37 | O | 703 | 825 | 558 | 392 | 8 | 3.0 | 3.4 | 776 | 54 |
| 38 | O | 694 | 816 | 564 | 411 | 4 | 2.7 | 1.2 | 790 | 79 |
| 39 | O | 689 | 814 | 565 | 411 | 7 | 2.1 | 4.3 | 788 | 49 |
| 40 | P | 733 | 826 | 572 | 414 | 6 | 7.9 | 2.1 | 780 | 56 |
| 41 | P | 729 | 822 | 577 | 428 | 7 | 9.3 | 2.1 | 776 | 102 |
| 42 | Q | 717 | 845 | 572 | 410 | 4 | 1.0 | 1.7 | 810 | 128 |
| 43 | Q | 714 | 841 | 572 | 411 | 6 | 2.5 | 3.2 | 800 | 56 |
| 44 | Q | 717 | 835 | 576 | 422 | 28 | 2.3 | 1.4 | 812 | 90 |
| 45 | Q | 714 | 838 | 569 | 402 | 6 | 1.5 | 1.5 | 786 | 41 |
| 46 | R | 708 | 835 | 549 | 369 | 27 | 1.2 | 2.6 | 777 | 85 |
| 47 | S | 720 | 843 | 583 | 427 | 6 | 2.6 | 2.4 | 775 | 89 |
| 48 | T | 714 | 822 | 576 | 408 | 5 | 2.7 | 3.2 | 797 | 95 |
| 49 | T | 719 | 833 | 578 | 414 | 7 | 5.3 | 2.5 | 801 | 6 |
| 50 | T | 712 | 819 | 579 | 417 | 4 | 8.7 | <u>0.6</u> | 793 | 91 |

| | Cooling step | | | | Plating treatment | | Temper | |
|---|---|---|---|---|---|---|---|---|
| Experiment Example | Cooling rate 3° C./second | Value of Expression (6) | Cooling rate 4° C./second | Value of Expression (7) | Plating bath | Alloying temperature ° C. | rolling Elongation ratio | Note |
| 26 | 31 | 0.2 | 15 | 1.7 | GI | — | 0.97 | Example |
| 27 | 47 | 0.4 | 21 | 1.4 | GA | 500 | 0.14 | Example |
| 28 | 47 | 0.3 | 20 | 1.0 | — | — | 0.14 | Comparative Example |
| 29 | 34 | 0.0 | 17 | 1.7 | GA | 499 | 0.10 | Example |
| 30 | 17 | 0.7 | 19 | 1.3 | GI | — | 0.68 | Example |
| 31 | 15 | 1.1 | 44 | 1.0 | GA | 509 | 0.35 | Comparative Example |
| 32 | 64 | 0.2 | 20 | 1.7 | GA | 487 | 0.21 | Example |
| 33 | 14 | 0.5 | 21 | 1.0 | GA | 512 | 0.14 | Example |
| 34 | 22 | 0.1 | 99 | 1.9 | — | — | 0.25 | Example |
| 35 | 40 | 1.4 | 14 | 1.0 | GI | — | 0.07 | Example |
| 36 | 18 | <u>2.2</u> | 44 | 0.1 | GI | — | 0.21 | Comparative Example |
| 37 | 50 | 0.9 | 17 | 1.2 | GA | 506 | 1.15 | Example |
| 38 | 76 | 0.2 | 90 | 0.7 | GA | — | 0.10 | Example |
| 39 | 14 | 0.1 | 15 | 0.4 | — | — | 0.25 | Comparative Example |
| 40 | 42 | 0.3 | 22 | 1.8 | GA | 540 | 0.29 | Example |
| 41 | 20 | 0.0 | 44 | 1.3 | — | — | 0.80 | Example |
| 42 | 20 | 0.0 | 23 | 2.8 | GA | 500 | 0.61 | Example |
| 43 | 17 | 0.0 | 101 | 1.3 | — | — | 0.28 | Example |
| 44 | 49 | 0.2 | 21 | 1.0 | GA | 531 | 0.69 | Example |
| 45 | 20 | <u>−2.1</u> | 18 | 1.2 | — | — | 0.25 | Comparative Example |
| 46 | 33 | 0.0 | 45 | 1.5 | GA | 525 | 0.21 | Example |
| 47 | 48 | 0.4 | 21 | 0.7 | GA | 522 | 0.16 | Example |
| 48 | 55 | 0.3 | 14 | 1.8 | GA | 547 | 0.44 | Example |
| 49 | 21 | 0.4 | 18 | 1.0 | GA | 501 | 0.20 | Example |
| 50 | 17 | 1.2 | 77 | 0.5 | GA | 524 | 0.18 | Comparative Example |

TABLE 3C

| Experiment Example | Chemical composition | Ac1 C.° | Ac3 C.° | Bs C.° | Ms C.° | Heating step Heating rate 1° C./second | Value of Expression (5) | Heating rate 2° C./second | Heating temperature ° C. | Retention time seconds |
|---|---|---|---|---|---|---|---|---|---|---|
| 51 | U | 703 | 817 | 563 | 388 | 8 | 1.8 | 1.8 | 772 | 96 |
| 52 | V | 704 | 830 | 557 | 396 | 65 | 1.2 | 2.4 | 788 | 82 |
| 53 | V | 703 | 821 | 561 | 408 | 5 | 1.3 | 2.1 | 791 | 43 |
| 54 | V | 697 | 824 | 568 | 435 | 7 | 1.1 | 2.1 | 861 | 60 |
| 55 | W | 702 | 840 | 578 | 419 | 66 | 2.0 | 3.3 | 808 | 46 |
| 56 | W | 710 | 833 | 581 | 427 | 5 | 2.9 | 2.5 | 810 | 163 |
| 57 | W | 710 | 838 | 582 | 429 | 18 | 9.0 | 1.7 | 819 | 81 |
| 58 | X | 733 | 879 | 575 | 397 | 6 | 4.1 | 1.6 | 792 | 140 |
| 59 | X | 734 | 869 | 580 | 408 | 5 | 5.9 | 2.3 | 801 | 58 |
| 60 | X | 729 | 865 | 590 | 434 | 5 | 5.0 | 2.5 | 817 | 142 |
| 61 | Y | 684 | 808 | 579 | 419 | 5 | 1.1 | 1.6 | 782 | 52 |
| 62 | Z | 716 | 823 | 553 | 364 | 19 | 2.6 | 2.0 | 777 | 93 |
| 63 | AA | 717 | 829 | 551 | 364 | 26 | 1.1 | 1.4 | 798 | 43 |
| 64 | AA | 718 | 827 | 551 | 365 | 4 | 1.9 | 1.8 | 792 | 54 |
| 65 | AA | 708 | 821 | 551 | 364 | 6 | 3.0 | 2.1 | 784 | 47 |
| 66 | AB | 709 | 819 | 562 | 393 | 7 | 1.1 | 1.6 | 773 | 173 |
| 67 | AB | 701 | 827 | 562 | 391 | 8 | 1.2 | 1.5 | 772 | 86 |
| 68 | AB | 695 | 813 | 570 | 417 | 8 | 1.7 | 3.0 | 786 | 54 |
| 69 | AC | 704 | 812 | 557 | 390 | 8 | 1.0 | 2.1 | 772 | 91 |
| 70 | AC | 701 | 813 | 564 | 410 | 7 | 1.4 | 1.6 | 787 | 97 |
| 71 | AC | 697 | 807 | 565 | 414 | 8 | 1.6 | 2.4 | 787 | 35 |
| 72 | AD | 762 | 883 | 558 | 365 | 8 | 1.5 | 1.9 | 790 | 129 |
| 73 | AE | 705 | 831 | 573 | 431 | 7 | 1.3 | 2.2 | 785 | 58 |
| 74 | AF | 732 | 858 | 570 | 386 | 27 | 3.4 | 2.1 | 798 | 48 |
| 75 | AF | 740 | 861 | 588 | 430 | 6 | 7.0 | 1.7 | 842 | 114 |

| Experiment Example | Cooling step Cooling rate 3° C./second | Value of Expression (6) | Cooling rate 4° C./second | Value of Expression (7) | Plating treatment Plating bath | Alloying temperature ° C. | Temper rolling Elongation ratio | Note |
|---|---|---|---|---|---|---|---|---|
| 51 | 15 | 0.6 | 16 | 1.1 | GA | 517 | 0.21 | Example |
| 52 | 45 | 0.0 | 45 | 2.1 | GI | — | 0.61 | Example |
| 53 | 22 | 0.0 | 79 | 1.5 | GA | 490 | 0.36 | Example |
| 54 | 15 | 0.6 | 70 | 1.5 | GA | 542 | 0.21 | Comparative Example |
| 55 | 18 | 0.2 | 23 | 1.1 | GA | — | 0.14 | Example |
| 56 | 44 | 0.2 | 12 | 1.3 | — | — | 0.04 | Example |
| 57 | 21 | 0.0 | 18 | 1.4 | — | — | 0.22 | Comparative Example |
| 58 | 43 | 0.2 | 19 | 2.2 | GA | — | 0.04 | Example |
| 59 | 22 | 0.0 | 23 | 1.6 | — | — | 1.90 | Example |
| 60 | 22 | 0.3 | 18 | 0.3 | GI | — | 0.12 | Comparative Example |
| 61 | 22 | 0.2 | 44 | 1.1 | GA | 511 | 0.26 | Example |
| 62 | 49 | 0.1 | 89 | 1.1 | GI | — | 0.29 | Example |
| 63 | 60 | −0.2 | 16 | 2.6 | GA | 489 | 0.52 | Example |
| 64 | 39 | −0.1 | 20 | 2.0 | GA | 525 | 0.52 | Example |
| 65 | 15 | −1.6 | 38 | 1.5 | — | — | 0.14 | Example |
| 66 | 34 | 0.8 | 39 | 1.7 | Zinc alloy | — | — | Example |
| 67 | 16 | 0.1 | 21 | 1.7 | Deposition | — | 0.24 | Example |
| 68 | 40 | 0.7 | 16 | 0.3 | GI | — | 0.10 | Comparative Example |
| 69 | 17 | 0.4 | 63 | 1.7 | — | — | 0.34 | Example |
| 70 | 14 | 0.6 | 57 | 1.1 | Zinc alloy | — | 0.16 | Example |
| 71 | 5 | 0.7 | 17 | 0.7 | GA | 530 | 0.20 | Comparative Example |
| 72 | 33 | −0.1 | 11 | 1.1 | GA | 513 | 0.10 | Example |
| 73 | 21 | 0.1 | 88 | 0.8 | GI | — | 0.26 | Example |
| 74 | 32 | 0.0 | 19 | 2.5 | — | — | 0.07 | Example |
| 75 | 44 | 0.6 | 20 | 0.4 | GA | 522 | 0.45 | Example |

TABLE 3D

| Experiment Example | Chemical composition | Ac1 C.° | Ac3 C.° | Bs C.° | Ms C.° | Heating step ||||| 
|---|---|---|---|---|---|---|---|---|---|---|
| | | | | | | Heating rate 1° C./second | Value of Expression (5) | Heating rate 2° C./second | Heating temperature ° C. | Retention time seconds |
| 76 | AF | 725 | 857 | 584 | 419 | 6 | 16.7 | 1.6 | 818 | 104 |
| 77 | AG | 690 | 815 | 551 | 393 | 31 | 1.1 | 1.8 | 800 | 92 |
| 78 | AH | 703 | 824 | 570 | 447 | 22 | 1.6 | 3.8 | 821 | 140 |
| 79 | AI | 691 | 809 | 565 | 408 | 4 | 1.1 | 2.5 | 773 | 85 |
| 80 | AJ | 707 | 841 | 555 | 387 | 7 | 1.6 | 2.2 | 802 | 44 |
| 81 | AK | 691 | 803 | 552 | 395 | 22 | 1.3 | 2.2 | 780 | 41 |
| 82 | AL | 688 | 828 | 557 | 411 | 4 | 1.2 | 2.5 | 792 | 133 |
| 83 | AL | 692 | 821 | 562 | 430 | 5 | 1.1 | 2.8 | 802 | 46 |
| 84 | AM | 725 | 870 | 573 | 419 | 6 | 9.4 | 2.4 | 808 | 91 |
| 85 | AM | 713 | 863 | 577 | 429 | 6 | 5.7 | 2.2 | 806 | 55 |
| 86 | AM | 719 | 880 | 541 | 338 | 7 | 8.7 | 2.3 | 745 | 48 |
| 87 | AN | 730 | 870 | 578 | 415 | 6 | 6.3 | 2.0 | 787 | 60 |
| 88 | AN | 727 | 867 | 581 | 426 | 6 | 6.0 | 1.7 | 782 | 94 |
| 89 | AN | 739 | 869 | 582 | 428 | 5 | 5.8 | 1.9 | 792 | 41 |
| 90 | AO | 705 | 823 | 569 | 423 | 56 | 2.7 | 4.1 | 810 | 90 |
| 91 | AO | 712 | 826 | 572 | 433 | 23 | 2.4 | 2.0 | 820 | 14 |
| 92 | AO | 695 | 836 | 568 | 419 | 5 | 1.2 | 1.5 | 798 | 54 |
| 93 | BA | 705 | 842 | 590 | 491 | 7 | 2.3 | 2.7 | 820 | 82 |
| 94 | BB | 714 | 808 | 530 | 319 | 7 | 2.1 | 1.6 | 774 | 44 |
| 95 | BC | 716 | 842 | 594 | 441 | 7 | 6.1 | 2.1 | 855 | 94 |
| 96 | BD | 728 | 862 | 599 | 439 | 6 | 1.7 | 1.5 | 785 | 55 |
| 97 | BE | 691 | 819 | 546 | 392 | 15 | 1.2 | 2.5 | 773 | 86 |
| 98 | BF | 746 | 973 | 584 | 420 | 5 | 14.0 | 3.6 | 858 | 52 |
| 99 | BG | 725 | 853 | 583 | 437 | 4 | 12.2 | 2.3 | 812 | 79 |
| 100 | BH | 701 | 830 | 559 | 390 | 6 | 0.7 | 1.8 | 776 | 139 |

| Experiment Example | Cooling step |||| Plating treatment || Temper rolling Elongation ratio | Note |
|---|---|---|---|---|---|---|---|---|
| | Cooling rate 3° C./second | Value of Expression (6) | Cooling rate 4° C./second | Value of Expression (7) | Plating bath | Alloying temperature ° C. | | |
| 76 | 48 | 1.3 | 68 | 0.7 | GA | 540 | 0.23 | Comparative Example |
| 77 | 14 | 0.0 | 20 | 1.7 | — | — | 0.25 | Example |
| 78 | 44 | 0.2 | 20 | 0.8 | GA | 517 | 0.62 | Example |
| 79 | 69 | 1.3 | 47 | 0.9 | Zinc alloy | 547 | 0.17 | Example |
| 80 | 66 | 0.0 | 17 | 2.1 | GA | 539 | 0.24 | Example |
| 81 | 19 | 0.6 | 19 | 0.6 | GA | 518 | 0.46 | Example |
| 82 | 20 | 1.2 | 100 | 1.4 | GA | 540 | 0.30 | Example |
| 83 | 17 | 0.0 | 106 | 1.8 | — | — | 0.15 | Comparative Example |
| 84 | 40 | 0.1 | 22 | 1.1 | — | — | 0.76 | Example |
| 85 | 38 | 0.4 | 19 | 1.5 | GA | 532 | 0.64 | Example |
| 86 | 21 | 0.0 | 18 | 2.0 | GI | — | 0.44 | Comparative Example |
| 87 | 22 | 0.1 | 18 | 0.3 | GA | 531 | 0.26 | Example |
| 88 | 53 | 0.6 | 20 | 0.1 | EG | — | 0.09 | Example |
| 89 | 21 | 0.0 | 23 | 0.3 | — | — | 0.16 | Comparative Example |
| 90 | 54 | 0.0 | 88 | 2.1 | — | — | 0.22 | Example |
| 91 | 21 | 0.9 | 93 | 1.3 | GA | 541 | 0.52 | Example |
| 92 | 14 | 0.3 | 20 | 2.2 | GA | 505 | 0.22 | Comparative Example |
| 93 | 48 | 1.8 | 23 | −5.9 | GA | 511 | 0.29 | Comparative Example |
| 94 | 42 | 0.0 | 68 | 1.4 | — | — | 0.27 | Comparative Example |
| 95 | 20 | −1.6 | 22 | 1.5 | Zinc alloy | 543 | 0.14 | Comparative Example |
| 96 | 47 | 0.3 | 21 | −1.3 | GI | — | 0.21 | Comparative Example |
| 97 | 47 | 0.0 | 39 | 1.6 | — | — | 0.15 | Comparative Example |
| 98 | 38 | −0.1 | 17 | 2.1 | GA | 492 | 0.23 | Comparative Example |
| 99 | 21 | 0.3 | 39 | 1.0 | GA | 541 | 0.19 | Comparative Example |
| 100 | 33 | 0.0 | 80 | 1.9 | — | — | 0.35 | Comparative Example |

Table 4A to Table 4D show the observation results of the microstructures of the steel sheets that are obtained under the production conditions of Table 1A to Table 3D. Structural fractions represent the volume fractions of individual structures such as ferrite (α), unrecrystallized ferrite (unrecrystallized α), bainite (B), bainitic ferrite (BF), pearlite (P), martensite (M), and retained austenite (retained γ). Here, "unrecrystallized ferrite" indicates the proportion of unrecrystallized ferrite in ferrite. "Surface" represents the states of the steel sheet surfaces, which are classified into a steel sheet on which no plating treatment is carried out (CR), a steel sheet having an electro plated layer (EG), a steel sheet having a hot-dip galvanized layer (GI), a steel sheet having a hot-dip galvannealed layer (GA), and a steel sheet having a Zn—Al—Mg alloy plated layer (Zn alloy).

TABLE 4A

| Experiment Example | Chemical composition | Surface | Structural fraction α % | Unrecrystallized α % | M % | Retained γ % | B % | BF % | B + BF % | P % | Expression (1) | Martensite Density of transition carbide pieces/$m^3$ | Density of dislocations $10^{13}$/$m^2$ | Prior γ grain diameter μm | Prior γ grain aspect ratio |
|---|---|---|---|---|---|---|---|---|---|---|---|---|---|---|---|
| 1 | A | GI | 47 | 1 | 33 | 0 | 12 | 7 | 19 | 1 | 2.7 | $5.5 \times 10^{17}$ | 9.0 | 4.5 | 1.7 |
| 2 | A | CR | 42 | 1 | 47 | 1 | 5 | 5 | 10 | 0 | 7.5 | $1.5 \times 10^{17}$ | 5.5 | 3.5 | 1.8 |
| 3 | A | Deposition | 36 | 0 | 52 | 1 | 6 | 5 | 11 | 0 | 7.3 | $1.4 \times 10^{18}$ | 24.6 | 2.5 | 1.2 |
| 4 | B | GA | 33 | 0 | 34 | 1 | 26 | 3 | 29 | 3 | 1.9 | $1.5 \times 10^{17}$ | 7.1 | 2.5 | 1.4 |
| 5 | B | CR | 24 | 0 | 51 | 2 | 14 | 9 | 23 | 0 | 9.2 | $2.5 \times 10^{17}$ | 9.7 | 3.3 | 1.5 |
| 6 | B | GA | 44 | 37 | 48 | 0 | 4 | 4 | 8 | 0 | 1.4 | $6.3 \times 10^{17}$ | 13.1 | 1.8 | 3.0 |
| 7 | B | GA | 40 | 0 | 50 | 1 | 5 | 4 | 9 | 0 | 5.9 | $<1.0 \times 10^{13}$ | 3.7 | 1.8 | 1.3 |
| 8 | C | GA | 58 | 0 | 25 | 0 | 9 | 7 | 16 | 1 | 3.5 | $1.2 \times 10^{17}$ | 9.6 | 1.7 | 1.4 |
| 9 | C | GA | 55 | 1 | 31 | 2 | 7 | 5 | 12 | 0 | 2.4 | $3.2 \times 10^{15}$ | 16.4 | 3.1 | 1.7 |
| 10 | C | GA | 60 | 0 | 20 | 1 | 14 | 5 | 19 | 0 | 12.9 | $8.9 \times 10^{15}$ | 19.9 | 3.4 | 1.3 |
| 11 | D | GA | 21 | 8 | 59 | 2 | 7 | 10 | 17 | 1 | 2.9 | $6.3 \times 10^{17}$ | 9.2 | 1.7 | 2.2 |
| 12 | D | GA | 25 | 1 | 41 | 2 | 11 | 21 | 32 | 0 | 2.8 | $1.1 \times 10^{19}$ | 11.4 | 3.3 | 1.7 |
| 13 | D | GA | 58 | 5 | 25 | 3 | 5 | 9 | 14 | 0 | 12.0 | $4.0 \times 10^{19}$ | 7.0 | 2.1 | 1.8 |
| 14 | E | CR | 36 | 0 | 52 | 0 | 6 | 5 | 11 | 1 | 4.7 | $8.5 \times 10^{14}$ | 31.6 | 2.9 | 1.2 |
| 15 | E | EG | 17 | 0 | 75 | 1 | 4 | 3 | 7 | 0 | 2.2 | $5.4 \times 10^{13}$ | 15.5 | 3.4 | 1.6 |
| 16 | E | CR | 15 | 1 | 61 | 1 | 13 | 10 | 23 | 0 | 7.6 | $<1.0 \times 10^{13}$ | 20.6 | 3.4 | 1.7 |
| 17 | F | Zinc alloy | 41 | 0 | 43 | 1 | 8 | 7 | 15 | 0 | 4.2 | $1.8 \times 10^{19}$ | 11.7 | 4.3 | 1.3 |
| 18 | F | GI | 16 | 0 | 69 | 0 | 8 | 7 | 15 | 0 | 5.4 | $2.6 \times 10^{17}$ | 5.4 | 3.1 | 1.5 |
| 19 | F | GA | 45 | 0 | 45 | 1 | 5 | 4 | 9 | 0 | 10.5 | $5.6 \times 10^{15}$ | 26.8 | 8.7 | 1.3 |
| 20 | G | Zinc alloy | 73 | 5 | 22 | 0 | 3 | 2 | 5 | 0 | 2.9 | $3.6 \times 10^{17}$ | 13.0 | 2.6 | 2.2 |
| 21 | G | GI | 44 | 6 | 43 | 2 | 4 | 5 | 9 | 2 | 2.6 | $2.3 \times 10^{17}$ | 31.9 | 1.7 | 2.1 |
| 22 | G | GA | 66 | 0 | 22 | 4 | 0 | 8 | 8 | 0 | 6.9 | $6.3 \times 10^{15}$ | 44.7 | 2.3 | 1.8 |
| 23 | H | CR | 38 | 8 | 35 | 0 | 22 | 4 | 26 | 1 | 8.8 | $4.4 \times 10^{15}$ | 33.4 | 2.1 | 2.3 |
| 24 | H | GA | 25 | 5 | 32 | 0 | 40 | 3 | 43 | 0 | 3.9 | $3.4 \times 10^{14}$ | 20.8 | 2.2 | 2.0 |
| 25 | H | GI | 35 | 47 | 34 | 1 | 24 | 6 | 30 | 0 | 2.9 | $2.9 \times 10^{17}$ | 45.7 | 1.4 | 3.4 |

| Experiment Example | Number density of coarse inclusion pieces/$mm^2$ | Hardness measurement Maximum value Hv1kgf | Minimum value Hv1kgf | Maximum value/minimum value | Interpeak distance mm | Note |
|---|---|---|---|---|---|---|
| 1 | 0.1 | 348 | 311 | 1.12 | 0.37 | Example |
| 2 | 0.1 | 377 | 325 | 1.16 | 0.27 | Example |
| 3 | 0.1 | 366 | 289 | 1.27 | 0.26 | Example |
| 4 | 0.0 | 404 | 345 | 1.17 | 0.34 | Example |
| 5 | 0.0 | 492 | 379 | 1.30 | 0.35 | Example |
| 6 | 0.0 | 427 | 377 | 1.13 | 0.22 | Comparative Example |
| 7 | 0.0 | 381 | 337 | 1.13 | 0.28 | Comparative Example |
| 8 | 0.0 | 307 | 254 | 1.21 | 0.34 | Example |
| 9 | 0.0 | 308 | 247 | 1.25 | 0.33 | Example |
| 10 | 0.0 | 288 | 262 | 1.10 | 0.29 | Comparative Example |
| 11 | 0.1 | 406 | 359 | 1.13 | 0.42 | Example |
| 12 | 0.1 | 365 | 294 | 1.24 | 0.33 | Example |
| 13 | 0.2 | 352 | 314 | 1.12 | 0.40 | Comparative Example |
| 14 | 0.0 | 349 | 277 | 1.26 | 0.37 | Example |
| 15 | 0.0 | 312 | 274 | 1.14 | 0.55 | Example |
| 16 | 0.0 | 402 | 307 | 1.31 | 0.34 | Comparative Example |
| 17 | 0.0 | 385 | 318 | 1.21 | 0.22 | Example |
| 18 | 0.0 | 411 | 337 | 1.22 | 0.23 | Example |
| 19 | 0.0 | 410 | 357 | 1.15 | 0.21 | Comparative Example |

TABLE 4A-continued

| | | | | | | |
|---|---|---|---|---|---|---|
| 20 | 0.4 | 330 | 270 | 1.22 | 0.34 | Example |
| 21 | 0.4 | 324 | 277 | 1.17 | 0.38 | Example |
| 22 | 0.3 | 320 | 271 | 1.18 | 0.27 | Example |
| 23 | 0.1 | 377 | 336 | 1.12 | 0.30 | Example |
| 24 | 0.1 | 370 | 294 | 1.26 | 0.27 | Example |
| 25 | 0.1 | 408 | 326 | 1.25 | 0.25 | Comparative Example |

TABLE 4B

| Experiment Example | Chemical composition | Surface | Structural fraction | | | | | | | | Expression (1) | Martensite | | Prior γ grain diameter μm | Prior γ grain aspect ratio |
| | | | α % | Unrecrystallized α % | M % | Retained γ % | B % | BF % | B + BF % | P % | | Density of transition carbide pieces/m³ | Density of dislocations $10^{13}/m^2$ | | |
|---|---|---|---|---|---|---|---|---|---|---|---|---|---|---|---|
| 26 | I | GI | 37 | 1 | 47 | 0 | 9 | 7 | 16 | 0 | 6.4 | $6.3 \times 10^{17}$ | 8.0 | 2.1 | 1.6 |
| 27 | I | GA | 15 | 0 | 38 | 0 | 33 | 14 | 47 | 0 | 9.7 | $3.0 \times 10^{17}$ | 2.9 | 5.0 | 1.6 |
| 28 | I | CR | 23 | 0 | 51 | 1 | 15 | 9 | 24 | 1 | 9.4 | $6.9 \times 10^{15}$ | 6.9 | 5.8 | 1.4 |
| 29 | L | GA | 50 | 19 | 38 | 2 | 5 | 5 | 10 | 0 | 4.7 | $4.1 \times 10^{19}$ | 8.1 | 1.7 | 2.8 |
| 30 | L | GI | 45 | 23 | 27 | 1 | 23 | 4 | 27 | 0 | 3.9 | $3.5 \times 10^{18}$ | 8.6 | 1.5 | 2.9 |
| 31 | L | GA | 51 | <u>37</u> | 23 | 2 | 24 | 0 | 24 | 0 | 2.3 | $1.2 \times 10^{17}$ | 24.8 | 1.4 | 3.4 |
| 32 | M | GA | 29 | 0 | 46 | 1 | 14 | 9 | 23 | 1 | 6.6 | $1.7 \times 10^{18}$ | 5.7 | 5.6 | 1.5 |
| 33 | M | GA | 14 | 0 | 59 | 1 | 19 | 7 | 26 | 0 | 5.3 | $5.4 \times 10^{16}$ | 4.9 | 4.6 | 1.4 |
| 34 | N | CR | 12 | 0 | 82 | 0 | 4 | 2 | 6 | 0 | 1.8 | $2.3 \times 10^{16}$ | 9.0 | 4.4 | 1.6 |
| 35 | N | GI | 11 | 0 | 41 | 0 | 44 | 4 | 48 | 0 | 8.9 | $1.3 \times 10^{16}$ | 5.5 | 3.0 | 1.6 |
| 36 | N | GI | 29 | 0 | <u>6</u> | 2 | <u>63</u> | 0 | <u>63</u> | 0 | 4.8 | $1.2 \times 10^{15}$ | 51.3 | 1.7 | 1.2 |
| 37 | O | GA | 52 | 0 | <u>23</u> | 0 | <u>23</u> | 2 | <u>25</u> | 0 | 4.1 | $3.0 \times 10^{19}$ | 15.5 | 2.3 | 1.4 |
| 38 | O | GI | 28 | 0 | 47 | 0 | 14 | 10 | 24 | 1 | 2.5 | $5.7 \times 10^{17}$ | 25.2 | 2.6 | 1.1 |
| 39 | O | CR | 31 | <u>68</u> | 58 | 1 | 5 | 5 | 10 | 0 | <u>0.7</u> | $5.1 \times 10^{15}$ | 14.8 | 0.6 | 4.3 |
| 40 | P | GA | 59 | <u>0</u> | 23 | 3 | 10 | 5 | 15 | 0 | <u>4.6</u> | $4.3 \times 10^{18}$ | 8.5 | 2.9 | 1.3 |
| 41 | P | CR | 61 | 0 | 29 | 1 | 4 | 4 | 8 | 1 | 3.5 | $2.5 \times 10^{18}$ | 45.5 | 6.4 | 1.4 |
| 42 | Q | GA | 31 | 13 | 58 | 0 | 6 | 5 | 11 | 0 | 5.5 | $3.9 \times 10^{19}$ | 6.2 | 2.3 | 2.5 |
| 43 | Q | CR | 39 | 3 | 51 | 1 | 5 | 4 | 9 | 0 | 1.3 | $1.1 \times 10^{16}$ | 13.6 | 1.8 | 2.0 |
| 44 | Q | GA | 31 | 1 | 44 | 3 | 12 | 9 | 21 | 1 | 7.5 | $6.5 \times 10^{17}$ | 16.0 | 1.7 | 1.5 |
| 45 | Q | CR | 47 | 3 | 24 | <u>8</u> | 0 | 21 | 21 | 0 | 9.1 | $2.0 \times 10^{19}$ | 32.0 | 2.6 | 1.9 |
| 46 | R | GA | 49 | 0 | 40 | <u>0</u> | 6 | 5 | 11 | 0 | 2.1 | $3.8 \times 10^{17}$ | 27.6 | 2.9 | 1.3 |
| 47 | S | GA | 59 | 1 | 21 | 2 | 12 | 6 | 18 | 0 | 6.7 | $1.3 \times 10^{17}$ | 10.6 | 4.4 | 2.3 |
| 48 | T | GA | 39 | 0 | 37 | 0 | 16 | 8 | 24 | 0 | 8.5 | $2.8 \times 10^{17}$ | 7.5 | 4.4 | 1.4 |
| 49 | T | GA | 36 | 1 | 33 | 1 | 20 | 10 | 30 | 0 | 7.3 | $7.8 \times 10^{17}$ | 10.4 | 4.4 | 1.7 |
| 50 | T | GA | 43 | 0 | 26 | 0 | 31 | 0 | 31 | 0 | 5.6 | $9.1 \times 10^{15}$ | 58.8 | 6.8 | 1.0 |

| Experiment Example | Number density of coarse inclusion pieces/mm² | Hardness measurement | | | | Note |
| | | Maximum value Hv1kgf | Minimum value Hv1kgf | Maximum value/minimum value | Interpeak distance mm | |
|---|---|---|---|---|---|---|
| 26 | 0.0 | 350 | 282 | 1.24 | 0.34 | Example |
| 27 | 0.0 | 354 | 283 | 1.25 | 0.37 | Example |
| 28 | 0.0 | 412 | 273 | <u>1.51</u> | 0.45 | Comparative Example |
| 29 | 0.0 | 436 | 349 | 1.25 | 0.35 | Example |
| 30 | 0.0 | 375 | 305 | 1.23 | 0.19 | Example |
| 31 | 0.0 | 369 | 308 | 1.20 | 0.31 | Comparative Example |
| 32 | 0.0 | 391 | 308 | 1.27 | 0.42 | Example |
| 33 | 0.0 | 358 | 303 | 1.18 | 0.34 | Example |
| 34 | 0.0 | 384 | 343 | 1.12 | 0.41 | Example |
| 35 | 0.0 | 363 | 313 | 1.16 | 0.47 | Example |
| 36 | 0.0 | 314 | 266 | 1.18 | 0.34 | Comparative Example |
| 37 | 0.0 | 349 | 264 | 1.32 | 0.24 | Example |
| 38 | 0.0 | 376 | 294 | 1.28 | 0.22 | Example |
| 39 | 0.0 | 444 | 342 | 1.30 | 0.26 | Comparative Example |
| 40 | 0.0 | 312 | 253 | 1.23 | 0.84 | Example |
| 41 | 0.0 | 369 | 272 | 1.36 | 0.63 | Example |
| 42 | 0.1 | 431 | 329 | 1.31 | 0.65 | Example |
| 43 | 0.4 | 400 | 310 | 1.29 | 0.63 | Example |
| 44 | 0.2 | 393 | 342 | 1.15 | 0.47 | Example |
| 45 | 0.2 | 369 | 293 | 1.26 | 0.62 | Comparative Example |
| 46 | 0.2 | 367 | 311 | 1.18 | 0.41 | Example |
| 47 | 0.0 | 323 | 288 | 1.12 | 0.21 | Example |
| 48 | 0.1 | 396 | 339 | 1.17 | 0.25 | Example |

TABLE 4B-continued

| | | | | | | |
|---|---|---|---|---|---|---|
| 49 | 0.0 | 386 | 335 | 1.15 | 0.25 | Example |
| 50 | 0.1 | 442 | 307 | 1.44 | 0.22 | Comparative Example |

TABLE 4C

| Experiment Example | Chemical composition | Surface | Structural fraction | | | | | | | | | Martensite | | | |
|---|---|---|---|---|---|---|---|---|---|---|---|---|---|---|---|
| | | | α % | Unrecrystallized α % | M % | Retained γ % | B % | BF % | B + BF % | P % | Expression (1) | Density of transition carbide pieces/$m^3$ | Density of dislocations $10^{13}/m^2$ | Prior γ grain diameter μm | Prior γ grain aspect ratio |
| 51 | U | GA | 49 | 0 | 32 | 0 | 15 | 4 | 19 | 0 | 7.3 | $3.9 \times 10^{18}$ | 21.9 | 3.3 | 1.4 |
| 52 | V | GI | 38 | 4 | 53 | 1 | 4 | 4 | 8 | 0 | 3.7 | $2.0 \times 10^{19}$ | 8.8 | 2.7 | 2.0 |
| 53 | V | GA | 36 | 7 | 50 | 1 | 6 | 7 | 13 | 0 | 2.4 | $1.8 \times 10^{18}$ | 16.4 | 3.9 | 2.3 |
| 54 | V | GA | 17 | 0 | 52 | 2 | 15 | 13 | 28 | 1 | 1.3 | $8.5 \times 10^{16}$ | 7.5 | 3.5 | 1.7 |
| 55 | W | GI | 30 | 0 | 56 | 0 | 9 | 5 | 14 | 0 | 3.4 | $2.5 \times 10^{17}$ | 10.9 | 3.5 | 1.9 |
| 56 | W | CR | 28 | 0 | 54 | 0 | 10 | 7 | 17 | 1 | 8.8 | $2.0 \times 10^{18}$ | 9.3 | 3.5 | 1.6 |
| 57 | W | CR | 23 | 0 | 62 | 1 | 6 | 5 | 11 | 3 | 7.9 | $1.1 \times 10^{17}$ | 11.5 | 6.7 | 1.2 |
| 58 | X | GI | 72 | 0 | 22 | 0 | 3 | 3 | 6 | 0 | 6.7 | $2.2 \times 10^{21}$ | 4.8 | 3.1 | 1.3 |
| 59 | X | CR | 64 | 0 | 29 | 2 | 3 | 2 | 5 | 0 | 6.6 | $6.5 \times 10^{19}$ | 43.4 | 5.8 | 1.6 |
| 60 | X | GI | 51 | 0 | 30 | 2 | 11 | 6 | 17 | 0 | 9.3 | $9.9 \times 10^{16}$ | 33.1 | 4.4 | 1.4 |
| 61 | Y | GA | 28 | 0 | 46 | 1 | 14 | 10 | 24 | 1 | 4.5 | $4.0 \times 10^{18}$ | 9.6 | 2.7 | 1.3 |
| 62 | Z | GI | 44 | 2 | 42 | 2 | 7 | 5 | 12 | 0 | 2.1 | $1.4 \times 10^{19}$ | 32.9 | 2.9 | 1.9 |
| 63 | AA | GA | 40 | 5 | 46 | 2 | 5 | 7 | 12 | 0 | 8.2 | $6.7 \times 10^{19}$ | 6.9 | 2.4 | 1.9 |
| 64 | AA | GA | 47 | 3 | 35 | 1 | 8 | 9 | 17 | 0 | 9.6 | $4.7 \times 10^{20}$ | 15.4 | 2.9 | 2.0 |
| 65 | AA | CR | 53 | 1 | 23 | 4 | 0 | 20 | 20 | 0 | 2.1 | $1.9 \times 10^{20}$ | 70.2 | 3.0 | 1.8 |
| 66 | AB | Zinc alloy | 52 | 3 | 28 | 1 | 16 | 3 | 19 | 0 | 4.3 | $2.0 \times 10^{20}$ | 12.4 | 2.0 | 1.7 |
| 67 | AB | deposition | 46 | 4 | 40 | 0 | 6 | 5 | 11 | 3 | 4.8 | $1.2 \times 10^{18}$ | 10.7 | 2.5 | 2.1 |
| 68 | AB | GI | 34 | 28 | 36 | 0 | 25 | 5 | 30 | 0 | 5.8 | $9.9 \times 10^{15}$ | 25.0 | 3.6 | 3.7 |
| 69 | AC | CR | 42 | 4 | 27 | 1 | 19 | 10 | 29 | 1 | 2.5 | $3.0 \times 10^{17}$ | 15.4 | 2.1 | 2.0 |
| 70 | AC | Zinc alloy | 30 | 3 | 41 | 0 | 23 | 6 | 29 | 0 | 3.0 | $1.0 \times 10^{16}$ | 9.0 | 3.6 | 1.7 |
| 71 | AC | GA | 47 | 0 | 6 | 0 | 32 | 7 | 39 | 8 | 6.8 | $1.0 \times 10^{18}$ | 11.6 | 3.9 | 1.2 |
| 72 | AD | GA | 73 | 4 | 21 | 1 | 3 | 2 | 5 | 0 | 6.8 | $3.1 \times 10^{17}$ | 17.0 | 1.5 | 2.0 |
| 73 | AE | GI | 36 | 15 | 49 | 2 | 8 | 5 | 13 | 0 | 2.1 | $1.2 \times 10^{16}$ | 21.4 | 1.3 | 2.4 |
| 74 | AF | CR | 54 | 0 | 36 | 1 | 4 | 5 | 9 | 0 | 6.5 | $1.7 \times 10^{20}$ | 4.8 | 3.8 | 1.6 |
| 75 | AF | GA | 20 | 0 | 45 | 0 | 30 | 5 | 35 | 0 | 7.3 | $7.1 \times 10^{15}$ | 13.4 | 4.2 | 1.3 |

| Experiment Example | Number density of coarse inclusion pieces/$mm^2$ | Hardness measurement | | | Interpeak distance mm | Note |
|---|---|---|---|---|---|---|
| | | Maximum value Hv1kgf | Minimum value Hv1kgf | Maximum value/ minimum value | | |
| 51 | 0.0 | 375 | 300 | 1.25 | 0.17 | Example |
| 52 | 0.3 | 394 | 345 | 1.14 | 0.52 | Example |
| 53 | 0.1 | 383 | 309 | 1.24 | 0.40 | Example |
| 54 | 0.1 | 421 | 280 | 1.50 | 1.20 | Comparative Example |
| 55 | 0.1 | 399 | 330 | 1.21 | 0.33 | Example |
| 56 | 0.0 | 391 | 331 | 1.18 | 0.34 | Example |
| 57 | 0.0 | 364 | 347 | 1.05 | 1.15 | Comparative Example |
| 58 | 0.0 | 335 | 258 | 1.30 | 0.19 | Example |
| 59 | 0.0 | 322 | 290 | 1.11 | 0.32 | Example |
| 60 | 0.0 | 391 | 294 | 1.33 | 1.13 | Comparative Example |
| 61 | 0.0 | 362 | 321 | 1.13 | 0.69 | Example |
| 62 | 0.0 | 384 | 326 | 1.18 | 0.19 | Example |
| 63 | 0.1 | 404 | 345 | 1.17 | 0.38 | Example |
| 64 | 0.1 | 419 | 308 | 1.36 | 0.46 | Example |
| 65 | 0.1 | 380 | 330 | 1.15 | 0.41 | Example |
| 66 | 0.0 | 345 | 279 | 1.24 | 0.35 | Example |
| 67 | 0.0 | 372 | 291 | 1.28 | 0.39 | Example |
| 68 | 0.0 | 411 | 354 | 1.16 | 0.44 | Comparative Example |
| 69 | 0.1 | 314 | 269 | 1.17 | 0.41 | Example |
| 70 | 0.0 | 366 | 316 | 1.16 | 0.29 | Example |
| 71 | 0.0 | 271 | 232 | 1.17 | 0.39 | Comparative Example |
| 72 | 0.0 | 322 | 285 | 1.13 | 0.57 | Example |
| 73 | 0.2 | 418 | 317 | 1.32 | 0.32 | Example |

TABLE 4C-continued

| | | | | | | |
|---|---|---|---|---|---|---|
| 74 | 0.0 | 349 | 326 | 1.07 | 0.33 | Example |
| 75 | 0.0 | 379 | 308 | 1.23 | 0.27 | Example |

TABLE 4D

| Experiment Example | Chemical composition | Surface | Structural fraction | | | | | | | | Expression (1) | Martensite Density of transition carbide pieces/m$^3$ | Density of dislocations 10$^{13}$/m$^2$ | Prior γ grain diameter μm | Prior γ grain aspect ratio |
|---|---|---|---|---|---|---|---|---|---|---|---|---|---|---|---|
| | | | α % | Unrecrystallized α % | M % | Retained γ % | B % | BF % | B + BF % | P % | | | | | |
| 76 | AF | GA | 37 | 0 | 20 | 1 | 37 | 0 | 37 | 5 | <u>12.5</u> | 1.0 × 10$^{18}$ | 35.5 | 7.7 | 1.2 |
| 77 | AG | CR | 13 | 6 | 79 | 1 | 5 | 2 | 7 | 0 | <u>3.8</u> | 1.5 × 10$^{15}$ | 4.0 | 2.6 | 2.0 |
| 78 | AH | GA | 11 | 1 | 61 | 1 | 17 | 10 | 27 | 0 | 8.2 | 2.1 × 10$^{17}$ | 12.0 | 2.3 | 1.7 |
| 79 | AI | Zinc alloy | 34 | 0 | 24 | 0 | 42 | 0 | 42 | 0 | 3.3 | 3.8 × 10$^{15}$ | 14.4 | 2.1 | 1.5 |
| 80 | AJ | GA | 33 | 0 | 60 | 1 | 3 | 3 | 6 | 0 | 6.5 | 4.7 × 10$^{17}$ | 5.4 | 3.3 | 1.7 |
| 81 | AK | GA | 25 | 2 | 26 | 0 | 36 | 10 | 46 | 3 | 7.0 | 5.6 × 10$^{17}$ | 14.4 | 3.3 | 1.8 |
| 82 | AL | GA | 30 | 18 | 23 | 1 | 44 | 0 | 44 | 2 | 1.3 | 4.8 × 10$^{17}$ | 8.9 | 1.3 | 2.7 |
| 83 | AL | CR | 23 | 16 | 66 | 1 | 6 | 5 | 11 | 0 | 1.9 | 4.1 × 10$^{16}$ | 6.2 | 1.8 | 2.5 |
| 84 | AM | CR | 50 | 0 | 36 | 1 | 7 | 6 | 13 | 0 | 4.0 | 1.8 × 10$^{17}$ | 11.3 | 3.9 | 1.3 |
| 85 | AM | GA | 49 | 0 | 25 | 1 | 16 | 5 | 21 | 4 | 7.2 | 2.6 × 10$^{16}$ | 6.1 | 3.4 | 1.4 |
| 86 | AM | GI | 73 | 18 | 22 | 0 | 2 | 3 | 5 | 0 | <u>10.8</u> | 5.2 × 10$^{21}$ | 15.0 | 4.3 | 1.6 |
| 87 | AN | GA | 67 | 0 | 23 | 0 | 6 | 4 | 10 | 0 | <u>5.8</u> | 3.8 × 10$^{15}$ | 23.1 | 4.1 | 1.3 |
| 88 | AN | EG | 70 | 1 | 22 | 1 | 6 | 1 | 7 | 0 | 4.5 | 1.4 × 10$^{14}$ | 37.8 | 3.5 | 1.9 |
| 89 | AN | CR | 62 | 0 | 25 | 1 | 6 | 6 | 12 | 0 | 5.9 | 7.0 × 10$^{15}$ | 41.7 | 4.4 | 1.5 |
| 90 | AO | CR | 19 | 0 | 68 | 1 | 6 | 6 | 12 | 0 | 2.3 | 6.2 × 10$^{16}$ | 4.5 | 3.2 | 1.3 |
| 91 | AO | GA | 11 | 0 | 43 | 2 | 40 | 4 | 44 | 0 | 3.9 | 2.5 × 10$^{17}$ | 7.6 | 3.0 | 1.5 |
| 92 | AO | GA | 29 | 0 | 52 | 1 | 12 | 6 | 18 | 0 | <u>11.2</u> | 1.0 × 10$^{17}$ | 3.5 | 1.3 | 1.3 |
| 93 | BA | GA | <u>94</u> | 0 | <u>3</u> | 0 | 3 | 0 | 3 | 0 | <u>3.8</u> | — | — | — | — |
| 94 | BB | CR | <u>37</u> | 2 | <u>44</u> | <u>8</u> | 6 | 5 | 11 | 0 | 2.6 | 2.1 × 10$^{18}$ | 36.2 | 3.0 | 1.7 |
| 95 | BC | Zinc alloy | 27 | 0 | 23 | <u>4</u> | 8 | 38 | 46 | 0 | 2.6 | 2.4 × 10$^{21}$ | 14.0 | 2.5 | 1.5 |
| 96 | BD | GI | 73 | 0 | <u>12</u> | 1 | 8 | 4 | 12 | 2 | 4.9 | <u><1.0 × 10$^{13}$</u> | 101.2 | 2.9 | 1.3 |
| 97 | BE | CR | 35 | 3 | <u>53</u> | 2 | 6 | 4 | 10 | 0 | 2.2 | 4.3 × 10$^{17}$ | 3.7 | 3.6 | 1.9 |
| 98 | BF | GA | 62 | 1 | 23 | 1 | 6 | 8 | 14 | 0 | 8.2 | 2.7 × 10$^{20}$ | 5.6 | 6.1 | 1.7 |
| 99 | BG | GA | 37 | 0 | 43 | 0 | 13 | 7 | 20 | 0 | 6.3 | 3.6 × 10$^{17}$ | 8.7 | 5.8 | 1.3 |
| 100 | BH | CR | 47 | 38 | 43 | 2 | 4 | 4 | 8 | 0 | 2.5 | 7.3 × 10$^{19}$ | 9.3 | 2.3 | 3.1 |

| Experiment Example | Number density of coarse inclusion pieces/mm$^2$ | Hardness measurement | | | | Note |
|---|---|---|---|---|---|---|
| | | Maximum value Hv1kgf | Minimum value Hv1kgf | Maximum value/ minimum value | Interpeak distance mm | |
| 76 | 0.0 | 372 | 329 | 1.13 | 0.29 | Comparative Example |
| 77 | 0.1 | 416 | 358 | 1.16 | 0.48 | Example |
| 78 | 0.0 | 346 | 295 | 1.17 | 0.51 | Example |
| 79 | 0.0 | 354 | 272 | 1.30 | 0.61 | Example |
| 80 | 0.2 | 417 | 356 | 1.17 | 0.41 | Example |
| 81 | 0.1 | 348 | 316 | 1.10 | 0.36 | Example |
| 82 | 0.1 | 367 | 284 | 1.29 | 0.31 | Example |
| 83 | 0.1 | 411 | 269 | <u>1.53</u> | 0.66 | Comparative Example |
| 84 | 0.0 | 314 | 270 | 1.16 | 0.28 | Example |
| 85 | 0.0 | 311 | 271 | 1.15 | 0.27 | Example |
| 86 | 0.0 | 325 | 278 | 1.17 | 0.25 | Comparative Example |
| 87 | 0.0 | 307 | 277 | 1.11 | 0.29 | Example |
| 88 | 0.0 | 291 | 260 | 1.12 | 0.18 | Example |
| 89 | 0.0 | 362 | 250 | <u>1.45</u> | <u>1.19</u> | Comparative Example |
| 90 | 0.0 | 419 | 349 | 1.20 | 0.45 | Example |
| 91 | 0.0 | 349 | 317 | 1.10 | 0.29 | Example |
| 92 | 0.0 | 354 | 305 | 1.16 | 0.34 | Comparative Example |
| 93 | 0.0 | 158 | 130 | 1.22 | 0.21 | Comparative Example |
| 94 | 0.0 | 466 | 412 | 1.13 | 0.24 | Comparative Example |
| 95 | <u>0.7</u> | 433 | 355 | 1.22 | 0.43 | Comparative Example |
| 96 | 0.1 | 275 | 215 | 1.28 | 0.35 | Comparative Example |

TABLE 4D-continued

| 97 | 0.0 | 357 | 295 | 1.21 | <u>1.15</u> | Comparative Example |
| 98 | <u>1.0</u> | 342 | 285 | 1.20 | 0.27 | Comparative Example |
| 99 | <u>0.7</u> | 343 | 315 | 1.09 | 0.24 | Comparative Example |
| 100 | <u>0.7</u> | 407 | 336 | 1.21 | 0.35 | Comparative Example |

Table 5A to Table 5D show the properties of the steel sheets obtained under the production conditions of Table 1A to Table 3D.

A tensile test is carried out by producing a No. 5 test piece described in JIS Z 2241 (2011), setting width direction of the steel sheet as a tensile axis and performing according to JIS Z 2241 (2011). With an assumption that the tensile strength in the tensile test is 900 MPa or higher, in a case where the values of the tensile strength (maximum nominal stress, TS) and uniform elongation (UEL) satisfy Expression (8), the strength-formability balance is determined as excellent.

In a case where the yield ratio obtained by dividing the 0.2% proof stress by the maximum tensile strength is 0.90 or less, since spring back during press forming becomes small, the strength-formability balance is determined as more preferable.

[Math. 26]

$$TS \cdot UEL^{0.667} \geq 3.83 \times 10^3 \quad \text{Expression (8)}$$

Here, regarding the reference signs in Expression (8), TS indicates the tensile strength, and UEL indicates the uniform elongation.

In order to evaluate the impact resistance after the forming, a notched tension test and a bending test are carried out.

The notched tension test is carried out while width direction of the steel sheet is set as the tensile axis using a test piece shown in FIG. 1, a stripe-shaped small piece cut out from the steel sheet that is 200 mm long in the width direction of the steel sheet. The maximum nominal stress in the notched tension test is divided by the maximum nominal stress in the tensile test in which the No. 5 test piece is used, and when the value is 0.75 or more, the steel sheet is regarded as pass.

In the bending test, the maximum bending angle is measured by a bending test based on VDA-238-100. The bending test is carried out such that a bending ridge is formed parallel to the rolling direction of the steel sheet. The bending tests are carried out using a test piece cut out from each of the steel sheets shown in Table 1A to Table 4D and, furthermore, a test piece cut out from the steel sheet after 3.0% uniaxial tensile strain is imparted as pre-strain to the steel sheet along the width direction of the steel sheet as the tensile axis. When the bending angle at which the indentation load is maximized (hereinafter, limiting bending angle) satisfies Expression (9) in the latter test, and the value obtained by dividing the latter limiting bending angle by the former limiting bending angle is 0.75 or more, the steel sheet is regarded as pass.

[Math. 27]

$$1.96 \times 10^{-2} \cdot t^{0.5} \cdot \varphi - 3.53 \times 10^{-2} \cdot t^{0.5} \geq 1.00 \quad \text{Expression (9)}$$

Here, regarding the reference signs in Expression (9), t represents the sheet thickness [mm] of the steel sheet, and $\varphi$ represents the limiting bending angle [degrees] of the pre-strain imparted material.

TABLE 5A

| | | | | Formability Tensile test | | | | |
|---|---|---|---|---|---|---|---|---|
| Experiment Example | Chemical composition | Surface | Sheet thickness mm | 0.2% Proof stress YS MPa | Tensile strength TS MPa | Uniform elongation UEL % | Total elongation T-EL % | Left side of Expression (8) TS × UEL$^{0.667}$ MPa-% |
| 1 | A | GI | 1.4 | 677 | 1069 | 8.0 | 14.7 | 4271 |
| 2 | A | CR | 0.8 | 816 | 1139 | 6.9 | 9.8 | 4123 |
| 3 | A | Deposition | 0.8 | 830 | 1129 | 7.2 | 10.1 | 4228 |
| 4 | B | GA | 1.4 | 893 | 1220 | 6.1 | 11.6 | 4070 |
| 5 | B | CR | 1.0 | 1041 | 1435 | 4.8 | 6.7 | 4057 |
| 6 | B | GA | 0.9 | 1229 | 1408 | 3.8 | 5.5 | 3441 |
| 7 | B | GA | 0.9 | 1073 | 1198 | 5.8 | 8.5 | 3867 |
| 8 | C | GA | 1.6 | 601 | 906 | 9.4 | 18.1 | 4036 |
| 9 | C | GA | 0.8 | 714 | 958 | 8.6 | 12.1 | 4007 |
| 10 | C | GA | 1.8 | 654 | 915 | 8.1 | 16.5 | 3687 |
| 11 | D | GA | 1.2 | 1128 | 1259 | 5.6 | 9.1 | 3961 |
| 12 | D | GA | 1.9 | 1003 | 1161 | 6.6 | 13.5 | 4094 |
| 13 | D | GA | 1.4 | 773 | 1108 | 6.1 | 10.0 | 3706 |
| 14 | E | CR | 1.2 | 683 | 1043 | 7.5 | 12.6 | 4001 |
| 15 | E | EG | 2.1 | 851 | 1045 | 7.7 | 19.3 | 4072 |
| 16 | E | CR | 1.2 | 755 | 1139 | 6.4 | 11.1 | 3915 |
| 17 | F | Zinc alloy | 1.2 | 835 | 1246 | 6.4 | 11.5 | 4293 |
| 18 | F | GI | 1.8 | 1005 | 1325 | 4.9 | 11.3 | 3841 |
| 19 | F | GA | 1.2 | 803 | 1262 | 4.9 | 8.4 | 3640 |
| 20 | G | Zinc alloy | 1.6 | 631 | 972 | 9.6 | 18.1 | 4389 |
| 21 | G | GI | 0.8 | 822 | 1022 | 8.7 | 11.6 | 4332 |
| 22 | G | GA | 1.8 | 731 | 955 | 11.4 | 20.3 | 4845 |

TABLE 5A-continued

| | | | | | | | | |
|---|---|---|---|---|---|---|---|---|
| 23 | H | CR | 0.8 | 745 | 1171 | 6.4 | 9.3 | 4023 |
| 24 | H | GA | 1.0 | 729 | 1166 | 6.4 | 10.1 | 4019 |
| 25 | H | GI | 1.0 | 1053 | 1207 | 3.7 | 5.5 | 2876 |

| | Impact resistance | | | | | | |
|---|---|---|---|---|---|---|---|
| | Notched tension test | | Bending test | | | | |
| Experiment Example | Maximum stress 1 MPa | Stress ratio 1 | Maximum bending angle (ordinary) degree | Maximum bending angle (pre-strain) degree | Maximum bending angle ratio | Expression (9) | Note |
| 1 | 827 | 0.77 | 66 | 61 | 0.93 | 1.37 | Example |
| 2 | 1193 | 1.05 | 89 | 83 | 0.93 | 1.42 | Example |
| 3 | 887 | 0.79 | 105 | 91 | 0.87 | 1.57 | Example |
| 4 | 987 | 0.81 | 80 | 73 | 0.91 | 1.65 | Example |
| 5 | 1491 | 1.04 | 96 | 73 | 0.76 | 1.39 | Example |
| 6 | 1134 | 0.81 | 49 | 45 | 0.92 | 0.80 | Comparative Example |
| 7 | 876 | 0.67 | 86 | 78 | 0.91 | 1.42 | Comparative Example |
| 8 | 947 | 1.05 | 100 | 89 | 0.89 | 2.16 | Example |
| 9 | 964 | 1.01 | 84 | 72 | 0.87 | 1.24 | Example |
| 10 | 702 | 0.77 | 82 | 66 | 0.81 | 1.69 | Comparative Example |
| 11 | 1196 | 0.95 | 71 | 63 | 0.89 | 1.32 | Example |
| 12 | 1036 | 0.89 | 76 | 68 | 0.90 | 1.80 | Example |
| 13 | 1028 | 0.93 | 84 | 69 | 0.82 | 1.56 | Comparative Example |
| 14 | 861 | 0.83 | 80 | 72 | 0.89 | 1.50 | Example |
| 15 | 918 | 0.88 | 67 | 61 | 0.90 | 1.67 | Example |
| 16 | 662 | 0.58 | 66 | 52 | 0.79 | 1.09 | Comparative Example |
| 17 | 1049 | 0.84 | 93 | 80 | 0.87 | 1.69 | Example |
| 18 | 1447 | 1.09 | 87 | 78 | 0.90 | 2.01 | Example |
| 19 | 1175 | 0.93 | 71 | 58 | 0.82 | 1.21 | Comparative Example |
| 20 | 738 | 0.76 | 72 | 64 | 0.89 | 1.53 | Example |
| 21 | 935 | 0.92 | 78 | 68 | 0.88 | 1.17 | Example |
| 22 | 880 | 0.92 | 72 | 63 | 0.88 | 1.62 | Example |
| 23 | 1062 | 0.91 | 81 | 70 | 0.86 | 1.20 | Example |
| 24 | 896 | 0.77 | 79 | 69 | 0.88 | 1.32 | Example |
| 25 | 1072 | 0.89 | 44 | 39 | 0.88 | 0.73 | Comparative Example |

TABLE 5B

| | | | | Formability Tensile test | | | | |
|---|---|---|---|---|---|---|---|---|
| Experiment Example | Chemical composition | Surface | Sheet thickness mm | 0.2% Proof stress YS MPa | Tensile strength TS MPa | Uniform elongation UEL % | Total elongation T-EL % | Left side of Expression (8) TS × UEL$^{0.667}$ MPa-% |
| 26 | I | GI | 1.0 | 949 | 1079 | 6.8 | 11.3 | 3869 |
| 27 | I | GA | 0.9 | 820 | 1085 | 7.0 | 11.3 | 3986 |
| 28 | I | CR | 1.3 | 860 | 1137 | 6.2 | 11.0 | 3853 |
| 29 | L | GA | 1.0 | 828 | 1300 | 6.3 | 8.9 | 4415 |
| 30 | L | GI | 1.0 | 903 | 1181 | 6.2 | 9.6 | 4002 |
| 31 | L | GA | 1.0 | 998 | 1151 | 5.6 | 7.1 | 3629 |
| 32 | M | GA | 1.4 | 858 | 1171 | 6.2 | 11.6 | 3969 |
| 33 | M | GA | 1.0 | 836 | 1177 | 6.0 | 9.2 | 3901 |
| 34 | N | CR | 1.4 | 969 | 1233 | 5.5 | 10.6 | 3863 |
| 35 | N | GI | 1.0 | 893 | 1178 | 6.0 | 9.8 | 3873 |
| 36 | N | GI | 1.2 | 740 | 1010 | 5.4 | 9.8 | 3109 |
| 37 | O | GA | 1.6 | 726 | 1026 | 9.7 | 18.3 | 4677 |
| 38 | O | GI | 1.0 | 701 | 1175 | 6.4 | 10.8 | 4062 |
| 39 | O | CR | 1.2 | 1014 | 1298 | 4.6 | 6.3 | 3570 |
| 40 | P | GA | 1.4 | 644 | 953 | 9.8 | 15.6 | 4364 |
| 41 | P | CR | 1.0 | 738 | 1028 | 7.7 | 11.4 | 3994 |
| 42 | Q | GA | 1.4 | 1035 | 1263 | 5.6 | 11.1 | 3962 |
| 43 | Q | CR | 0.9 | 927 | 1165 | 6.4 | 9.3 | 4012 |
| 44 | Q | GA | 0.9 | 893 | 1211 | 6.8 | 8.8 | 4342 |

TABLE 5B-continued

| | | | | | | | | |
|---|---|---|---|---|---|---|---|---|
| 45 | Q | CR | 1.5 | 783 | 1121 | 9.2 | 12.4 | 4927 |
| 46 | R | GA | 1.2 | 820 | 1129 | 6.9 | 12.2 | 4091 |
| 47 | S | GA | 1.6 | 622 | 997 | 9.6 | 18.0 | 4495 |
| 48 | T | GA | 1.6 | 885 | 1201 | 5.8 | 13.2 | 3871 |
| 49 | T | GA | 1.2 | 818 | 1195 | 6.6 | 11.2 | 4194 |
| 50 | T | GA | 1.0 | 747 | 1189 | 6.4 | 9.7 | 4118 |

| | Impact resistance | | | | | | |
|---|---|---|---|---|---|---|---|
| | Notched tension test | | Bending test | | | | |
| Experiment Example | Maximum stress 1 MPa | Stress ratio 1 | Maximum bending angle (ordinary) degree | Maximum bending angle (pre-strain) degree | Maximum bending angle ratio | Expression (9) | Note |
| 26 | 816 | 0.76 | 102 | 86 | 0.85 | 1.65 | Example |
| 27 | 1045 | 0.96 | 99 | 78 | 0.79 | 1.42 | Example |
| 28 | 650 | 0.57 | 97 | 68 | 0.70 | 1.47 | Comparative Example |
| 29 | 1263 | 0.97 | 67 | 58 | 0.86 | 1.10 | Example |
| 30 | 1189 | 1.01 | 91 | 81 | 0.90 | 1.56 | Example |
| 31 | 1193 | 1.04 | 50 | 45 | 0.89 | 0.84 | Comparative Example |
| 32 | 894 | 0.76 | 72 | 64 | 0.89 | 1.44 | Example |
| 33 | 1137 | 0.97 | 85 | 77 | 0.91 | 1.46 | Example |
| 34 | 1109 | 0.90 | 67 | 62 | 0.93 | 1.40 | Example |
| 35 | 1223 | 1.04 | 79 | 69 | 0.87 | 1.31 | Example |
| 36 | 807 | 0.80 | 84 | 77 | 0.92 | 1.61 | Comparative Example |
| 37 | 1012 | 0.99 | 96 | 81 | 0.85 | 1.97 | Example |
| 38 | 1160 | 0.99 | 108 | 96 | 0.89 | 1.86 | Example |
| 39 | 514 | 0.40 | 52 | 44 | 0.85 | 0.91 | Comparative Example |
| 40 | 965 | 1.01 | 66 | 58 | 0.89 | 1.31 | Example |
| 41 | 1030 | 1.00 | 67 | 56 | 0.83 | 1.05 | Example |
| 42 | 1314 | 1.04 | 72 | 62 | 0.85 | 1.39 | Example |
| 43 | 1098 | 0.94 | 92 | 78 | 0.85 | 1.42 | Example |
| 44 | 1250 | 1.03 | 102 | 88 | 0.86 | 1.60 | Example |
| 45 | 1000 | 0.89 | 58 | 41 | 0.70 | 0.93 | Comparative Example |
| 46 | 1016 | 0.90 | 81 | 73 | 0.91 | 1.53 | Example |
| 47 | 781 | 0.78 | 66 | 59 | 0.89 | 1.41 | Example |
| 48 | 1187 | 0.99 | 84 | 75 | 0.89 | 1.81 | Example |
| 49 | 1206 | 1.01 | 75 | 65 | 0.87 | 1.36 | Example |
| 50 | 772 | 0.65 | 88 | 72 | 0.82 | 1.38 | Comparative Example |

TABLE 5C

| | | | | Formability Tensile test | | | |
|---|---|---|---|---|---|---|---|
| Experiment Example | Chemical composition | Surface | Sheet thickness mm | 0.2% Proof stress YS MPa | Tensile strength TS MPa | Uniform elongation UEL % | Total elongation T-EL % | Left side of Expression (8) TS × UEL$^{0.667}$ MPa-% |
| 51 | U | GA | 1.6 | 737 | 1101 | 8.3 | 17.5 | 4501 |
| 52 | V | GI | 1.2 | 922 | 1229 | 6.6 | 10.9 | 4334 |
| 53 | V | GA | 1.0 | 842 | 1169 | 6.5 | 9.7 | 4076 |
| 54 | V | GA | 1.5 | 987 | 1218 | 5.6 | 9.8 | 3840 |
| 55 | W | GI | 1.6 | 1090 | 1229 | 5.7 | 12.5 | 3911 |
| 56 | W | CR | 0.8 | 868 | 1275 | 5.7 | 8.2 | 4055 |
| 57 | W | CR | 1.0 | 986 | 1251 | 5.6 | 9.2 | 3929 |
| 58 | X | GI | 1.6 | 575 | 996 | 9.6 | 19.1 | 4498 |
| 59 | X | CR | 0.9 | 778 | 1041 | 8.9 | 13.0 | 4460 |
| 60 | X | GI | 1.2 | 722 | 1097 | 6.7 | 10.3 | 3916 |
| 61 | Y | GA | 0.8 | 936 | 1204 | 6.1 | 8.4 | 3999 |
| 62 | Z | GI | 1.4 | 849 | 1207 | 7.3 | 12.7 | 4551 |
| 63 | AA | GA | 1.2 | 1118 | 1319 | 5.3 | 8.0 | 3990 |
| 64 | AA | GA | 2.0 | 1065 | 1284 | 5.7 | 12.9 | 4100 |
| 65 | AA | CR | 1.2 | 851 | 1265 | 7.8 | 11.1 | 4962 |
| 66 | AB | Zinc alloy | 1.0 | 684 | 1092 | 7.2 | 11.6 | 4084 |
| 67 | AB | Deposition | 1.2 | 939 | 1096 | 7.8 | 13.4 | 4324 |

TABLE 5C-continued

| | | | | | | | | |
|---|---|---|---|---|---|---|---|---|
| 68 | AB | GI | 1.5 | 929 | 1260 | 5.0 | 10.6 | 3682 |
| 69 | AC | CR | 1.4 | 726 | 1013 | 8.1 | 15.6 | 4092 |
| 70 | AC | Zinc alloy | 1.0 | 741 | 1141 | 6.7 | 11.0 | 4039 |
| 71 | AC | GA | 1.2 | 551 | 861 | 10.3 | 18.2 | 4076 |
| 72 | AD | GA | 1.0 | 697 | 1043 | 9.6 | 15.5 | 4699 |
| 73 | AE | GI | 1.2 | 902 | 1202 | 6.4 | 9.8 | 4129 |
| 74 | AF | CR | 1.4 | 816 | 1167 | 8.0 | 15.9 | 4679 |
| 75 | AF | GA | 2.2 | 1063 | 1212 | 5.7 | 14.8 | 3845 |

| | Impact resistance | | | | | | |
|---|---|---|---|---|---|---|---|
| | Notched tension test | | Bending test | | | | |
| Experiment Example | Maximum stress 1 MPa | Stress ratio 1 | Maximum bending angle (ordinary) degree | Maximum bending angle (pre-strain) degree | Maximum bending angle ratio | Expression (9) | Note |
| 51 | 828 | 0.75 | 103 | 90 | 0.88 | 2.18 | Example |
| 52 | 1010 | 0.82 | 75 | 67 | 0.90 | 1.40 | Example |
| 53 | 939 | 0.80 | 61 | 54 | 0.88 | 1.02 | Example |
| 54 | 704 | 0.58 | 58 | 39 | 0.66 | 0.88 | Comparative Example |
| 55 | 1142 | 0.93 | 71 | 64 | 0.90 | 1.54 | Example |
| 56 | 1196 | 0.94 | 96 | 83 | 0.87 | 1.43 | Example |
| 57 | 1042 | 0.83 | 55.3 | 50 | 0.91 | 0.95 | Comparative Example |
| 58 | 1057 | 1.06 | 109 | 88 | 0.81 | 2.13 | Example |
| 59 | 944 | 0.91 | 72 | 65 | 0.90 | 1.18 | Example |
| 60 | 1001 | 0.91 | 63 | 45 | 0.71 | 0.92 | Comparative Example |
| 61 | 1038 | 0.86 | 90 | 82 | 0.91 | 1.40 | Example |
| 62 | 1231 | 1.02 | 83 | 71 | 0.86 | 1.61 | Example |
| 63 | 1468 | 1.11 | 82 | 70 | 0.86 | 1.47 | Example |
| 64 | 1010 | 0.79 | 82 | 63 | 0.77 | 1.70 | Example |
| 65 | 1105 | 0.87 | 65 | 56 | 0.87 | 1.17 | Example |
| 66 | 832 | 0.76 | 107 | 94 | 0.88 | 1.81 | Example |
| 67 | 841 | 0.77 | 82 | 73 | 0.89 | 1.52 | Example |
| 68 | 1227 | 0.97 | 33 | 30 | 0.90 | 0.68 | Comparative Example |
| 69 | 999 | 0.99 | 71 | 64 | 0.90 | 1.45 | Example |
| 70 | 867 | 0.76 | 78 | 68 | 0.88 | 1.30 | Example |
| 71 | 708 | 0.82 | 65 | 58 | 0.89 | 1.20 | Comparative Example |
| 72 | 934 | 0.90 | 86 | 76 | 0.88 | 1.45 | Example |
| 73 | 908 | 0.76 | 70 | 60 | 0.85 | 1.24 | Example |
| 74 | 1002 | 0.86 | 77 | 69 | 0.90 | 1.56 | Example |
| 75 | 905 | 0.75 | 94 | 83 | 0.89 | 2.37 | Example |

TABLE 5D

| | | | | Formability Tensile test | | | |
|---|---|---|---|---|---|---|---|
| Experiment Example | Chemical composition | Surface | Sheet thickness mm | 0.2% Proof stress YS MPa | Tensile strength TS MPa | Uniform elongation UEL % | Total elongation T-EL % | Left side of Expression (8) TS × UEL$^{0.667}$ MPa-% |
| 76 | AF | GA | 1.0 | 708 | 1135 | 5.7 | 8.8 | 3615 |
| 77 | AG | CR | 1.2 | 1019 | 1322 | 5.0 | 9.1 | 3884 |
| 78 | AH | GA | 0.8 | 826 | 1102 | 6.7 | 9.5 | 3897 |
| 79 | AI | Zinc alloy | 0.8 | 767 | 1048 | 7.5 | 11.4 | 4013 |
| 80 | AJ | GA | 1.6 | 975 | 1259 | 5.8 | 12.7 | 4057 |
| 81 | AK | GA | 1.4 | 785 | 1101 | 6.5 | 13.0 | 3835 |
| 82 | AL | GA | 1.6 | 763 | 1118 | 6.6 | 13.2 | 3920 |
| 83 | AL | CR | 1.6 | 952 | 1131 | 6.4 | 12.3 | 3892 |
| 84 | AM | CR | 1.4 | 762 | 1004 | 8.4 | 15.1 | 4143 |
| 85 | AM | GA | 1.0 | 725 | 1022 | 8.2 | 13.3 | 4156 |
| 86 | AM | GI | 1.2 | 659 | 1003 | 7.0 | 12.5 | 3654 |
| 87 | AN | GA | 1.2 | 549 | 972 | 10.3 | 18.8 | 4597 |
| 88 | AN | EG | 1.3 | 520 | 971 | 10.7 | 18.7 | 4717 |
| 89 | AN | CR | 1.5 | 605 | 976 | 7.8 | 14.3 | 3855 |
| 90 | AO | CR | 1.4 | 971 | 1263 | 5.4 | 10.5 | 3890 |
| 91 | AO | GA | 2.2 | 963 | 1164 | 6.3 | 16.0 | 3966 |
| 92 | AO | GA | 2.0 | 901 | 1166 | 5.6 | 14.8 | 3672 |

TABLE 5D-continued

| | | | | | | | | |
|---|---|---|---|---|---|---|---|---|
| 93 | BA | GA | 1.0 | 320 | 483 | 27.1 | 46.4 | 4356 |
| 94 | BB | CR | 1.0 | 1134 | 1418 | 6.7 | 7.5 | 5057 |
| 95 | BC | Zinc alloy | 1.0 | 964 | 1372 | 5.4 | 5.5 | 4228 |
| 96 | BD | GI | 1.0 | 545 | 846 | 11.1 | 18.5 | 4213 |
| 97 | BE | CR | 1.0 | 786 | 1139 | 6.3 | 9.2 | 3892 |
| 98 | BF | GA | 1.0 | 681 | 1006 | 8.5 | 10.9 | 4193 |
| 99 | BG | GA | 1.0 | 799 | 1129 | 6.5 | 10.2 | 3935 |
| 100 | BH | CR | 1.0 | 954 | 1312 | 4.2 | 5.0 | 3411 |

| | Impact resistance | | | | | | |
|---|---|---|---|---|---|---|---|
| | Notched tension test | | Bending test | | | | |
| Experiment Example | Maximum stress 1 MPa | Stress ratio 1 | Maximum bending angle (ordinary) degree | Maximum bending angle (pre-strain) degree | Maximum bending angle ratio | Expression (9) | Note |
| 76 | 1254 | 1.10 | 83.9 | 69 | 0.82 | 1.32 | Comparative Example |
| 77 | 1208 | 0.91 | 63 | 58 | 0.93 | 1.22 | Example |
| 78 | 1206 | 1.09 | 95 | 83 | 0.87 | 1.42 | Example |
| 79 | 847 | 0.81 | 104 | 87 | 0.84 | 1.49 | Example |
| 80 | 1164 | 0.92 | 76 | 67 | 0.88 | 1.61 | Example |
| 81 | 876 | 0.80 | 73 | 65 | 0.90 | 1.48 | Example |
| 82 | 1162 | 1.04 | 61 | 54 | 0.89 | 1.30 | Example |
| 83 | 625 | 0.55 | 78 | 56 | 0.72 | 1.35 | Comparative Example |
| 84 | 918 | 0.91 | 78 | 72 | 0.93 | 1.63 | Example |
| 85 | 1066 | 1.04 | 87 | 77 | 0.89 | 1.48 | Example |
| 86 | 879 | 0.88 | 88 | 73 | 0.82 | 1.52 | Comparative Example |
| 87 | 933 | 0.96 | 77 | 70 | 0.92 | 1.47 | Example |
| 88 | 943 | 0.97 | 74 | 67 | 0.91 | 1.46 | Example |
| 89 | 653 | 0.67 | 60 | 41 | 0.68 | 0.93 | Comparative Example |
| 90 | 1330 | 1.05 | 78 | 71 | 0.91 | 1.61 | Example |
| 91 | 1129 | 0.97 | 78 | 71 | 0.91 | 2.00 | Example |
| 92 | 1141 | 0.98 | 113 | 87 | 0.77 | 2.36 | Comparative Example |
| 93 | — | — | — | — | — | — | Comparative Example |
| 94 | 1210 | 0.85 | 54 | 48 | 0.90 | 0.91 | Comparative Example |
| 95 | 922 | 0.67 | — | — | — | — | Comparative Example |
| 96 | — | — | — | — | — | — | Comparative Example |
| 97 | 890 | 0.78 | 56 | 50 | 0.90 | 0.95 | Comparative Example |
| 98 | 632 | 0.63 | — | — | — | — | Comparative Example |
| 99 | 696 | 0.62 | — | — | — | — | Comparative Example |
| 100 | — | — | — | — | — | — | Comparative Example |

The steel sheets that pass both the notched tension test and the bending test are determined as being excellent in terms of impact resistance.

Experiment Examples 93 to 100 are comparative examples in which the chemical composition of the steel sheet deviates from the scope of the present invention.

Experiment Example 93 is an example in which the C content is small and a sufficient amount of martensite cannot be obtained. As a result, a sufficient tensile strength cannot be obtained.

Experiment Example 94 is an example in which the C content is excessive and retained austenite is excessively present. As a result, sufficient impact resistance cannot be obtained.

Experiment Example 95 is an example in which the Si content is excessive and the density of coarse inclusion is large. As a result, sufficient impact resistance cannot be obtained.

Experiment Example 96 is an example in which the Mn content is small and a sufficient amount of martensite cannot be obtained. As a result, a sufficient tensile strength cannot be obtained.

Experiment Example 97 is an example in which the Mn content is excessive and the macro homogeneity of the steel sheet is lacking. As a result, sufficient impact resistance cannot be obtained.

Experiment Example 98 is an example in which the Al content is excessive and the density of coarse inclusion is large. As a result, sufficient impact resistance cannot be obtained.

Experiment Example 99 is an example in which the Ti content is small and the density of coarse inclusion is large. As a result, sufficient impact resistance cannot be obtained.

Experiment Example 100 is an example in which the Ti content is excessive and the density of coarse inclusion is large. As a result, sufficient formability cannot be obtained.

In addition, in Experiment Example 28, the cooling rate of the cast piece in the casting process is slow, and the macro homogeneity of the steel sheet is lacking. As a result, sufficient impact resistance cannot be obtained.

In Experiment Example 57, the cooling rate of the cast piece in the casting process is fast, and the macro homogeneity of the steel sheet is lacking. As a result, sufficient impact resistance cannot be obtained.

In Experiment Example 83, the heating temperature of the cast piece in the hot rolling process is low, and the macro homogeneity of the steel sheet is lacking. As a result, sufficient impact resistance cannot be obtained.

In Experiment Example 60, the total rolling reduction at 1050° C. or higher in the hot rolling process is small, and the macro homogeneity of the steel sheet is lacking. As a result, sufficient impact resistance cannot be obtained.

In Experiment Example 89, the value of the left side of Expression (2) that is calculated using the rolling conditions in the hot rolling process is small, and the macro homogeneity of the steel sheet is lacking. As a result, sufficient impact resistance cannot be obtained.

In Experiment Example 92, the value of the left side of Expression (3) that is calculated using the rolling conditions in the hot rolling process is excessive, and the value of the middle portion of Expression (1) becomes too large due to the generation of a coarse inclusion. As a result, sufficient strength-formability balance cannot be obtained.

In Experiment Example 10, the cooling rate after the rolling in the hot rolling process is slow, and the value of the middle portion of Expression (1) becomes too large due to the generation of a coarse inclusion. As a result, sufficient strength-formability balance cannot be obtained.

In Experiment Example 19, the value that represents the cooling behavior after the rolling in the hot rolling process, $P_{13}$, becomes excessive and fails to satisfy Expression (4), and the value of the middle portion of Expression (1) becomes too large due to the generation of a coarse inclusion. As a result, sufficient strength-formability balance cannot be obtained.

In Experiment Example 39, the value that represents the cooling behavior after the rolling in the hot rolling process, $P_{13}$, becomes too small and fails to satisfy Expression (4), and recrystallization in the heat treatment after the cold rolling does not sufficiently progress. As a result, sufficient strength-formability balance and sufficient impact resistance cannot be obtained.

In Experiment Example 68, the total rolling reduction in the cold rolling process is small, and recrystallization in the heat treatment after the cold rolling does not sufficiently progress. As a result, sufficient strength-formability balance and sufficient impact resistance cannot be obtained.

In Experiment Example 6, the rolling completion temperature in the cold rolling process is high, and recrystallization in the heat treatment after the cold rolling does not sufficiently progress. As a result, sufficient strength-formability balance and sufficient impact resistance cannot be obtained.

In Experiment Example 31, the average heating rate from 400° C. to 550° C. in the heat treatment process is slow, and recrystallization during the heating does not sufficiently progress. As a result, sufficient strength-formability balance and sufficient impact resistance cannot be obtained.

In Experiment Example 76, the value of the middle portion of Expression (5) that represents the heating behavior in the heat treatment process is too large, and the value of the middle portion of Expression (1) becomes too large due to a coarse inclusion. As a result, sufficient strength-formability balance cannot be obtained.

In Experiment Example 25, the value of the middle portion of Expression (5) that represents the heating behavior in the heat treatment process is too small, and recrystallization during the heating does not sufficiently progress. As a result, sufficient strength-formability balance and sufficient impact resistance cannot be obtained.

In Experiment Example 50, the average heating rate from Ac1 to Ac1+20° C. in the heat treatment process is slow, and the macro homogeneity of the steel sheet is impaired. As a result, sufficient impact resistance cannot be obtained.

In Experiment Example 54, the heating temperature in the heat treatment process is high, and the macro homogeneity of the steel sheet is impaired. As a result, sufficient impact resistance cannot be obtained.

In Experiment Example 86, the heating temperature in the heat treatment process is low, and the value of the middle portion of Expression (1) becomes too large due to the generation of a coarse inclusion. As a result, sufficient strength-formability balance cannot be obtained.

In Experiment Example 71, the average cooling rate from 720° C. to 550° C. in the heat treatment process is slow, pearlite is formed during the cooling, and a sufficient amount of martensite cannot be obtained. As a result, the tensile strength is lacking.

In Experiment Example 36, the value of the middle portion of Expression (6) that represents the cooling behavior in the heat treatment process is too large, bainitic transformation excessively progresses, and a sufficient amount of martensite cannot be obtained. As a result, sufficient strength-formability balance cannot be obtained.

In Experiment Example 45, the value of the middle portion of Expression (6) that represents the cooling behavior in the heat treatment process is too small, the concentration of carbon into austenite in association with bainitic transformation progresses excessively, and a large amount of retained austenite is present. As a result, sufficient impact resistance cannot be obtained.

In Experiment Example 13, the cooling rate from Ms to Ms−25° C. in the heat treatment process is slow, and the value of the middle portion of Expression (1) becomes too large due to the generation of a coarse inclusion. As a result, sufficient strength-formability balance cannot be obtained.

In Experiment Example 7, the value of the middle portion of Expression (7) that represents the cooling behavior in the heat treatment process is too large, and the amount of the transition carbides in martensite is small. As a result, sufficient impact resistance cannot be obtained.

Experiment Example 16 is a comparative example in which the value of the middle portion of Expression (7) that represents the cooling behavior in the heat treatment process is too small and the amount of the transition carbides in martensite is small. As a result, sufficient impact resistance cannot be obtained.

Experiment Examples 1 to 5, 8, 9, 11, 12, 14, 15, 17, 18, 20 to 24, 26, 27, 29, 30, 32 to 35, 37, 38, 40 to 44, 46 to 49, 51 to 53, 55, 56, 58, 59, 61 to 67, 69, 70, 72 to 75, 77 to 82, 84, 85, 87, 88, 90, and 91 except the above-described comparative examples are steel sheets that are obtained by the present invention and have excellent strength-formability balance and excellent impact resistance.

Experiment Examples 2, 5, 14, 23, 34, 41, 43, 56, 59, 65, 69, 74, 77, 84, and 90 are examples from which the steel sheet of the present invention having no plated layer can be obtained. Experiment Examples 5 and 59 are examples in which the steel sheet after the hot rolling process is reheated up to 525° C. and then cooled before cold rolling and is cold-rolled after pickling.

Experiment Examples that are not described above are examples from which the steel sheet of the present invention having a plated layer can be obtained. Experiment Examples 75 and 85 are examples in which the steel sheet after the hot rolling process is reheated up to 550° C. and then cooled before cold rolling and is cold-rolled after pickling.

INDUSTRIAL APPLICABILITY

As described above, according to the present invention, it is possible to provide a high-strength steel sheet that is excellent in terms of formability and impact resistance. Since the steel sheet of the present invention is a steel sheet preferable for the significant weight reduction of automobiles and for the securing of the protection and safety of people on board, the present invention is highly available in steel sheet making industries and automobile industries.

The invention claimed is:

1. A steel sheet,
wherein a chemical composition contains, by mass %,
C: 0.050% to 0.180%,
Si: 0.01% to 1.20%,
Mn: 0.80% to 3.00%,
Al: 0.005% to 0.600%,
Ti: 0.005% to 0.120%,
P: 0.050% or less,
S: 0.0080% or less,
N: 0.0125% or less,
O: 0.0040% or less,
Nb: 0% to 0.075%,
V: 0% to 1.000%,
Cr: 0% to 1.50%,
Ni: 0% to 1.50%,
Cu: 0% to 1.50%,
Mo: 0% to 1.00%,
W: 0% to 1.000%,
B: 0% to 0.0060%,
Sn: 0% to 1.000%,
Sb: 0% to 0.200%, and
one or more of Ca, Ce, Mg, Zr, La, and REM in total: 0% to 0.0100%,
with a remainder of Fe and impurities,
a microstructure within a range from a position of ⅛ of a sheet thickness from a surface in a sheet thickness direction to a position of ⅜ of the sheet thickness from the surface in the sheet thickness direction contains, in terms of a volume fraction,
ferrite: 10% to 75%,
martensite: 20% to 90%,
retained austenite: 0% to 5%,
bainite and bainitic ferrite in total: 0% to 50%, and
pearlite: 0% to 5%,
a proportion of unrecrystallized ferrite in the ferrite is 0% to 25%,
cementite that is contained in the martensite satisfies Expression (1),
a density of transition carbide included in the martensite is $1.0 \times 10^{13}$ pieces/m³ or more,
a density of coarse inclusion having an equivalent circle diameter of 10 μm or more is 0.50 pieces/mm² or less,
in a surface parallel to the surface at a position of ¼ of the sheet thickness from the surface in the sheet thickness direction,
a ratio of a maximum value $Hv_{max}$ of Vickers hardness to a minimum value $Hv_{min}$ of the Vickers hardness is 1.40 or less, and
in a distribution map of the Vickers hardness, wherein the Vickers hardness is measured in the surface parallel to the surface at the position ¼ of the sheet thickness from the surface in the sheet thickness direction, an average value of minimum distances between peaks of the Vickers hardness is 1.00 mm or less,

[Math. 1]

$$1.00 \leq \Sigma_{i=1}^{5} d_i^{0.80} \cdot a_i^{1.30} \leq 10.00 \qquad \text{Expression (1)}$$

in the Expression (1), $d_i$ represents a particle diameter of a cementite particle having an $i^{th}$ largest equivalent circle diameter in unit μm in the cementite, and $a_i$ indicates an aspect ratio of the cementite particle having the $i^{th}$ largest equivalent circle diameter.

2. The steel sheet according to claim 1,
wherein the chemical composition contains, by mass %, one or more selected from
Nb: 0.005% to 0.075%,
V: 0.010% to 1.000%,
Cr: 0.05% to 1.50%,
Ni: 0.05% to 1.50%,
Cu: 0.05% to 1.50%,
Mo: 0.03% to 1.00%,
W: 0.030% to 1.000%,
B: 0.0005% to 0.0060%,
Sn: 0.010% to 1.000%,
Sb: 0.005% to 0.200%, and
one or more of Ca, Ce, Mg, Zr, La, and REM in total: 0.0001% to 0.0100%.

3. The steel sheet according to claim 1,
wherein, in the microstructure, an average grain diameter of prior austenite is 5.0 μm or less, and an average aspect ratio of the prior austenite is 2.50 or less.

4. The steel sheet according to claim 1,
wherein the martensite that is contained in the microstructure has $1.0 \times 10^{13}$/m² or more of dislocations.

5. The steel sheet according to claim 1,
wherein a zinc plated layer is formed on the surface.

6. The steel sheet according to claim 1,
wherein a zinc alloy plated layer is formed on the surface.

7. The steel sheet according to claim 5,
wherein an Fe content in the zinc plated layer or the zinc alloy plated layer is, by mass %, 7.0% or more and 13.0% or less.

8. A production method for the steel sheet according to claim 1, the method comprising:
a casting process of casting molten steel having the chemical composition according to claim 1 such that the average cooling rate within a surface temperature range of 700° C. to 550° C. is 10° C./hour to 75° C./hour to obtain a cast piece having a thickness of 100 mm to 500 mm or less;
a hot rolling process of heating the cast piece to 1200° C. to 1350° C. and hot rolling the heated cast piece to obtain a hot-rolled steel sheet;
a cooling process of cooling the hot-rolled steel sheet to 100° C. or lower;

a cold rolling process of cold-rolling the hot-rolled steel sheet such that a total rolling reduction is 30% to 90% and a cold rolling completion temperature is 250° C. or lower to obtain a cold-rolled steel sheet; and an annealing process of heating the cold-rolled steel sheet at an annealing temperature of 760° C. or higher and Ac3+20° C. or lower and cooling the cold-rolled steel sheet to 80° C. or lower, wherein, in the hot rolling process, during rolling that is carried out at 1050° C. or higher, Expression (2) is satisfied, and a total rolling reduction is set to 60% or more, rolling that is carried out at lower than 1050° C. is carried out under a condition that satisfies Expression (3), in the cooling process, an average cooling rate from a completion temperature of the hot rolling to 630° C. is set to 20° C./second or faster, within a temperature range of 630° C. to 500° C., Expression (4) is satisfied, in the annealing process, in a heating step to the annealing temperature, an average heating rate within a temperature range of 400° C. to 550° C. is 3.0° C./second or faster, within a temperature range of 550° C. to Ac1° C., Expression (5) is satisfied, an average heating rate within a temperature range of Ac1° C. to (Ac1+20° C.) is 1.0° C./second or faster, in a cooling step from the annealing temperature, an average cooling rate within a temperature range of 720° C. to 550° C. is 10° C./second or faster, within a temperature range of 550° C. to (Ms-80° C.), Expression (6) is satisfied, an average cooling rate within a temperature range of Ms° C. to (Ms-25° C.) is 10° C./second or faster, and within a temperature range of Ms° C. to 80° C., Expression (7) is satisfied,

[Math. 2]

$$\sum_{i=1}^{n} A_1 \cdot \left( \frac{1}{1+12.1[Nb]} + \frac{1}{1+4.8 \cdot ([Ti]-3.0[N])} + \frac{1}{1+93.3[B]} \right)^{-1} \cdot (T_i' - 1050)^{\frac{1}{6}} \cdot \frac{h_{i-1} - h_i}{h_{i-1}^{1.5}} \cdot t_i^{0.5} \cdot \exp\left( \frac{A_2}{T_i + 273} - \frac{A_3}{T_i' + 273} \right) \geq 1.00 \quad \text{Expression (2)}$$

$$R_{m+n} \leq 10.00 \quad \text{Expression (3)}$$

[Math. 4]

$$1.00 \times 10^{-7} \geq P_{12} \geq 1.00 \times 10^{-8} \quad \text{Expression (4)}$$

$$10.00 \geq \sum_{i=1}^{10} A_{18} \cdot \left\{ \ln\left(\frac{100}{100-r}\right) \right\}^{\frac{2}{3}} \cdot \quad \text{Expression (5)}$$

$$\exp\left( -\frac{A_{19}}{823 + (0.1i - 0.05) \cdot (Ac1 - 550)} \right) \cdot$$

$$\left( \frac{A_{20} \cdot E_4^{\frac{1}{3}}}{1 + 13[Nb] + 7[Ti] - 21[N]} \right)^{\frac{T_i}{275}} \cdot t_i \geq 1.00$$

$$-2.00 \leq \sum_{i=1}^{10} C_i \cdot D_i \leq 2.00 \quad \text{Expression (6)}$$

[Math. 7]

$$0.00 \leq \sum_{i=1}^{10} \{1 - \exp(-E_6 - A_{25})\} \cdot \quad \text{Expression (7)}$$

$$\left\{ 1 - \exp\left( -\frac{A_{26} \cdot [Ms - T_{i,\min}]}{1 + 0.5[Mn] + 0.2[Cr] + 0.4[Ni]} \right) \right\} \cdot$$

$$\left\{ A_{27} \cdot \exp\left( -\frac{A_{28}}{T_i + 273} \right) - \right.$$

$$A_{29} \cdot \exp(A_{30} \cdot [T_i - A_{31} - A_{32} \cdot \ln([Si] + 0.3[Al])]) \cdot$$

$$\left. (1 - \exp[E_6 - A_{25}])^{-0.5} \right\} \cdot dt^{0.5} \leq 3.00$$

in the Expression (2), [Nb], [Ti], and [B] indicate amounts of Nb, Ti, and B, respectively, $A_1$, $A_2$, and $A_3$ are constant terms, having values of $1.53 \times 10^2$, $1.60 \times 10^4$, and $2.31 \times 10^4$, respectively, $T_i$ is a temperature at which $i^{th}$ rolling is carried out in unit ° C., $T'_i$ is an average temperature of the temperature $T_i$ at which the $i^{th}$ rolling is carried out and a temperature $T_{i+1}$ at which (i+1)th rolling is carried out in unit ° C., and $h_i$ represents a thickness of a steel sheet that is obtained by carrying out the $i^{th}$ rolling in unit mm, in the Expression (3), $R_{m+n}$ is an index that indicates a refinement behavior of a structure via the hot rolling within a temperature range of lower than 1050° C. when the hot rolling at 1050° C. or higher is carried out in a total of n times and hot rolling at lower than 1050° C. is carried out in a total of m times, in the Expression (4), $P_{13}$ is an index that indicates a progress degree of precipitation within a temperature range from 630° C. to 500° C., in the Expression (5), $A_{18}$, $A_{19}$, and $A_{20}$ are all constants, [Nb], [Ti], and [N] indicate amounts of respective elements in unit mass %, $t_i$ indicates a staying time within an $i^{th}$ temperature range counted from 550° C. as a stat in unit seconds, and $E_4$ is a value that is obtained from the Expression (4), in the Expression (6), $C_i$ is an index that indicates a progress degree of bainitic transformation within an $i^{th}$ time range from beginning of calculation, and $D_i$ is an index that indicates easiness of generation of cementite in association with bainitic transformation within the $i^{th}$ time range from the beginning of calculation, and in the Expression (7), $E_6$ is a value of a middle portion of the Expression (6), $A_{25}$, $A_{26}$, $A_{27}$, $A_{28}$, $A_{29}$, $A_{30}$, $A_{31}$, and $A_{32}$ are constant terms, Ms is a martensitic transformation start temperature, and $T_i$ is an average temperature within the $i^{th}$ time range, $T_{i,\,min}$ is a minimum value of $T_i$ up to $i^{th}$ time ranges after a temperature reaches Ms, and, in addition, [element sign] indicates an amount of each element in unit mass %, and dt indicates a time that is divided an elapsed time from a temperature reaches the martensitic transformation start temperature to the temperature reaches 80° C. elongation ratio in unit seconds.

9. The production method for the steel sheet according to claim 8, wherein, in the annealing process, a retention time at the annealing temperature is 3.0 seconds or longer and 200 seconds or shorter.

10. The production method for the steel sheet according to claim 8, the method further comprising, after the annealing process:

a temper rolling process of carrying out temper rolling so that an elongation ratio is 3.00% or less.

11. The production method for the steel sheet according to claim 8,
wherein, in a cooling step of the annealing process, a hot-dip galvanizing treatment is carried out on the cold-rolled steel sheet.

12. The production method for the steel sheet according to claim 8,
wherein, in the cooling step of the annealing process, a hot-dip zinc alloy plating treatment is carried out on the cold-rolled steel sheet.

13. The production method for the steel sheet according to claim 11,
wherein, in the cooling step of the annealing process, an alloying treatment is carried out after the hot-dip galvanizing treatment or after the hot-dip zinc alloy plating treatment.

* * * * *